US010672000B1

(12) United States Patent
Bent, II et al.

(10) Patent No.: US 10,672,000 B1
(45) Date of Patent: Jun. 2, 2020

(54) BYPASS SYSTEM

(71) Applicant: Access Control Advantage, Inc., Manhasset, NY (US)

(72) Inventors: Bruce Bent, II, New York, NY (US); David Edgar Gareis, Carlsbad, CA (US); Thomas T. Makeever, Jacksonville, FL (US); Kenneth Simons, Jacksonville, FL (US)

(73) Assignee: Access Control Advantage, Inc., Manhasset, NY (US)

( * ) Notice: Subject to any disclaimer, the term of this patent is extended or adjusted under 35 U.S.C. 154(b) by 977 days.

(21) Appl. No.: 15/074,756

(22) Filed: Mar. 18, 2016

Related U.S. Application Data

(60) Provisional application No. 62/134,775, filed on Mar. 18, 2015.

(51) Int. Cl.
*G06Q 20/40* (2012.01)
*G06Q 40/02* (2012.01)

(52) U.S. Cl.
CPC ......... *G06Q 20/401* (2013.01); *G06Q 40/025* (2013.01)

(58) Field of Classification Search
CPC .............................. G06Q 40/00; G06Q 40/025
USPC .......................................................... 705/38
See application file for complete search history.

(56) References Cited

U.S. PATENT DOCUMENTS 4,114,027 A 9/1978 Slater et al.
4,194,242 A 3/1980 Robbins
4,346,442 A 8/1982 Musmanno
4,718,009 A 1/1988 Cuervo
4,739,478 A 4/1988 Roberts et al.
4,742,457 A 5/1988 Leon et al.
4,750,121 A 6/1988 Halley et al.
(Continued)

FOREIGN PATENT DOCUMENTS

WO 0049543 A2 8/2000

OTHER PUBLICATIONS

"Reserve Financial" trademark file history for U.S. Appl. No. 78/088,759, filed Oct. 17, 2001.
(Continued)

*Primary Examiner* — Robert R Niquette
*Assistant Examiner* — Liz P Nguyen
(74) *Attorney, Agent, or Firm* — Amster, Rothstein & Ebenstein LLP

(57) ABSTRACT

Computer bypass systems and methods using a customer portal of a core account computer system to bypass a core account provider computer system are disclosed. One method comprises receiving at a loan computer system a loan request from an electronic client device and obtaining core account access information comprising a core account provider identifier and core account authentication credentials of the client for a customer portal of the core account computer system. The loan computer system can use the core account authentication credentials to access the core account customer portal and obtain a core account balance and a maximum allowable loan limit. The loan computer system can provide machine readable instructions to render a graphical user interface indicating the maximum allowable loan limit and can receive a requested loan amount, which is used to transfer funds from the core fund to create a loan fund.

8 Claims, 33 Drawing Sheets

(56) References Cited

U.S. PATENT DOCUMENTS

| | | |
|---|---|---|
| 4,910,676 A | 3/1990 | Alldredge |
| 4,969,094 A | 11/1990 | Halley et al. |
| 5,025,138 A | 6/1991 | Cuervo |
| 5,083,270 A | 1/1992 | Gross et al. |
| 5,193,057 A | 3/1993 | Longfield |
| 5,206,803 A | 4/1993 | Vitagliano et al. |
| 5,214,579 A | 5/1993 | Wolfberg et al. |
| 5,323,315 A | 6/1994 | Highbloom |
| 5,631,828 A | 5/1997 | Hagan |
| 5,689,100 A | 11/1997 | Carrithers et al. |
| 5,724,523 A | 3/1998 | Longfield |
| 5,727,159 A | 3/1998 | Kikinis |
| 5,745,885 A | 4/1998 | Mottola et al. |
| 5,754,980 A | 5/1998 | Anderson et al. |
| 5,787,404 A | 7/1998 | Fernandez-Holmann |
| 5,809,484 A | 9/1998 | Mottola et al. |
| 5,852,811 A | 12/1998 | Atkins |
| 5,878,405 A | 3/1999 | Grant et al. |
| 5,884,285 A | 3/1999 | Atkins |
| 5,892,905 A | 4/1999 | Brandt et al. |
| 5,894,554 A | 4/1999 | Lowery et al. |
| 5,901,287 A | 5/1999 | Bull et al. |
| 5,903,881 A | 5/1999 | Schrader et al. |
| 5,933,815 A | 8/1999 | Golden |
| 5,933,817 A | 8/1999 | Hucal |
| 5,948,040 A | 9/1999 | DeLorme et al. |
| 5,950,179 A | 9/1999 | Buchanan et al. |
| 5,991,745 A | 11/1999 | Kiritz |
| 6,006,333 A | 12/1999 | Nielsen |
| 6,016,482 A | 1/2000 | Molinari et al. |
| 6,018,723 A | 1/2000 | Siegel et al. |
| 6,029,175 A | 2/2000 | Chow et al. |
| 6,041,362 A | 3/2000 | Mears et al. |
| 6,052,673 A | 4/2000 | Leon et al. |
| 6,105,007 A | 8/2000 | Norris |
| 6,112,188 A | 8/2000 | Hartnett |
| 6,122,625 A | 9/2000 | Rosen |
| 6,148,293 A | 11/2000 | King |
| 6,199,077 B1 | 3/2001 | Inala et al. |
| 6,208,978 B1 | 3/2001 | Walker et al. |
| 6,243,816 B1 | 6/2001 | Fang et al. |
| 6,278,449 B1 | 8/2001 | Sugiarto et al. |
| 6,317,783 B1 | 11/2001 | Freishtat et al. |
| 6,360,205 B1 | 3/2002 | Iyengar et al. |
| 6,401,118 B1 | 6/2002 | Thomas |
| 6,510,451 B2 | 1/2003 | Wu et al. |
| 6,625,582 B2 | 9/2003 | Richman et al. |
| 6,950,807 B2 | 9/2005 | Brock |
| 7,263,548 B2 | 8/2007 | Daswani et al. |
| 7,302,413 B1 | 11/2007 | Bent et al. |
| 7,324,970 B2 | 1/2008 | MacGruder et al. |
| 7,395,241 B1 | 7/2008 | Cook et al. |
| 7,398,245 B1 | 7/2008 | Bent et al. |
| 7,424,520 B2 | 9/2008 | Daswani et al. |
| 7,647,239 B2 | 1/2010 | MacDonald |
| 7,752,535 B2 | 7/2010 | Satyavolu |
| 7,873,571 B1 | 1/2011 | Wehmer |
| 8,266,515 B2 | 9/2012 | Satyavolu |
| 8,626,649 B1 | 1/2014 | Bent et al. |
| 2002/0013751 A1 | 1/2002 | Facciani et al. |
| 2002/0023051 A1 | 2/2002 | Kunzle et al. |
| 2002/0035530 A1 | 3/2002 | Ervolini et al. |
| 2002/0052836 A1 | 5/2002 | Galperin et al. |
| 2002/0062249 A1 | 5/2002 | Iannacci |
| 2002/0198825 A1 | 12/2002 | Jentoft |
| 2003/0004866 A1 | 1/2003 | Huennekens |
| 2003/0126072 A1 | 7/2003 | Brock |
| 2003/0135448 A1 | 7/2003 | Aguias et al. |
| 2003/0144934 A1 | 7/2003 | Totten |
| 2003/0149656 A1 | 8/2003 | Magruder et al. |
| 2003/0208438 A1 | 11/2003 | Rothman |
| 2004/0054613 A1 | 3/2004 | Dokken |
| 2004/0098329 A1 | 5/2004 | Tilton |
| 2004/0138972 A1 | 7/2004 | Mendelsohn |
| 2004/0153388 A1 | 8/2004 | Fisher et al. |
| 2005/0065871 A1 | 3/2005 | Gerhart et al. |
| 2005/0097033 A1 | 5/2005 | Pretell et al. |
| 2006/0015421 A1 | 1/2006 | Grimberg |
| 2006/0031158 A1 | 2/2006 | Orman |
| 2006/0031159 A1 | 2/2006 | Minot et al. |
| 2006/0224480 A1 | 10/2006 | Bent et al. |
| 2006/0271465 A1 | 11/2006 | McNamar et al. |
| 2006/0282356 A1 | 12/2006 | Andres et al. |
| 2007/0011083 A1 | 1/2007 | Bird et al. |
| 2008/0082459 A1 | 4/2008 | Bowser |
| 2008/0235061 A1* | 9/2008 | Innes .................. G06Q 20/102 705/4 |
| 2008/0294555 A1 | 11/2008 | Bromma |
| 2010/0030687 A1* | 2/2010 | Panthaki .............. G06Q 20/108 705/43 |
| 2010/0241584 A1 | 9/2010 | Kirkman et al. |
| 2011/0016061 A1 | 1/2011 | Mercier et al. |
| 2011/0107265 A1 | 5/2011 | Buchanan et al. |
| 2012/0116949 A1* | 5/2012 | East ...................... G06Q 40/00 705/38 |
| 2014/0068409 A1* | 3/2014 | Hicks .................. G06F 40/146 715/234 |

OTHER PUBLICATIONS

"Reserve Financial" trademark file history for U.S. Appl. No. 78/090,844, filed Oct. 30, 2001.

"Reserve Solutions" trademark file history for U.S. Appl. No. 78/444,650, filed Jul. 1, 2004.

"Reserveplus" trademark file history for U.S. Appl. No. 77/507,403, filed Jun. 25, 2008.

"Reserveplus" trademark file history for U.S. Appl. No. 78/445,264, filed Jul. 2, 2004.

Altieri, Mark P., "Nonqualified Deferred Compensation Plans," The CPA Journal Online, available at http://www.nysscpa.org/cpajournal/2005/205/essentials/p54.htm, last accessed Jun. 12, 2012, pp. 1-12.

Complaint, *Benefit Funding systems LLC et al.*, v. *U.S. Bancorp*, No. 1-12-cv-00803 (D. Del. Jun. 22, 2012), pp. 1-4.

Borleis et al., "Loan Administration in 401K Plans," Benefits Quarterly, vol. 11, No. 2, pp. 67-75 (Second Quarter 1995).

TM file for Reserveadvantage Program from USPTO, U.S. Appl. No. 78/444,717, filed Jul. 1, 2004, Word Mark: Reserveadvantage Program, 12 Sheets.

Declaration of Mr. Bruce Bent II, Vice Chairman and Registrant of Applicant. (3 Sheets) and Exhibits A, B, C, and D (6 Sheets), Feb. 27, 2007.

Downes et al., "Dictionary of Finance and Investment Terms," Fifth Ed., 2006, Barron's Educational Series, p. 136.

Exhibit A: 1913 Webster's Revised Unabridged Dictionary, definition of Novation, 1 page.

Hardy, David, et al., Anti-avoidance provisions; International Tax Review, Longon, Jul./Aug. 1994, 8 pages.

Harney, Kenneth R., Home Asset Management Accounts Link Mortgages, Equity Lines, The Washington Post, Oct. 5, 2002, p. H.06.

Iezman, Stanley L., "Operating Pension Funds in Compliance with ERISA Procedures: How to Avoid a Department of Labor Audit: A premier for Lawyers," webpage, 1999-00.

JP Morgan Chase Bank, Non-qualified Deferred Compensation Plan, available at https://www.chase.com/index.jsp?pg_name=ccpmapp/smallbusiness/retiring_investing/. . . , pp. 1-2.

Menkhoff, Lukas, et al., "Collateral-based lending in emerging markets: Evidence from Thailand," Journal of Banking & Finance 30 (2006), www.sciencedirect.com, available online Mar. 17, 2005, pp. 1-21.

Mirer, T.W., "The Optimal Time to File for Social Security Benefits," Public Finance Review, Nov. 1998, pp. 611-636, vol. 26, No. 6.

Novack, Janet, "How to Tap Retirement Funds Penalty-Free," Forbes, Apr. 7, 2009, 2 pages.

Postlewaite, Susan, "Medina Deeds $1 Million Home to Lender to Settle 1st of 2 Suits," Miami Review, Oct. 9, 1992, Sec. C, p. 1.

(56) References Cited

OTHER PUBLICATIONS

Reimers et al., "Responses to Social Security by Men and Women: Myopic and Far-Sighted Behavior," Journal of Human Resources, Spring 1996, p. 359 (24), vol. 31, No. 2.
Reserve Financial Web Site, Reserve Solutions Inc., Innovative Financial Products, Archive org Versions of equityloancard.com, 2000/2001, 7 Sheets (Internet Archive Wayback Machine).
Reserve Financial Web Site, Reserve Solutions Inc., Innovative Financial Products, Archive org Versions of reservesolutions.com 2003 to 2005, 14 Sheets (Internet Archive Wayback Machine).
Social Security Bulletin, Summer 1996, pp. 67-70, vol. 59, No. 2.
Tiaa Cref, "Section 457(b) Private Nonqualified Deferred Compensation Plans—Summary of Key Features," [online] Retrieved in Jun. 2012 from the Internet, 3 pages.
Womack, Anita, EFT '99 spawns methods for reaching the "unbanked," Bank Marketing v. 30 n. 6, pp. 8-11, Jun. 1998, 4 pages.
"Take your Miles to the Max with MaxMiles MileageMiner," Internet Archive, http://web.archive.org/web/19990128182211/http://www.maxmiles.com/MileageMiner/AbourMileMiner.html.
Business Wire Press Release, "VerticalOne Corporation to Offer Internet Users One-stop for Managing Online Personal Content and Account Information" (May 25, 1999).
Knoblock et al., "The Ariadne Approach to Web-based Information Integration," IEEE Intelligent Systems (Sep./Oct. 1998) ("Knoblock").
Schoenberg et al., "Internet based repository of medical records that retains patient confidentiality," 321 BMJ 1199 (2000), available at http://www.ncbi.nlm.nih.gov/pmc/articles/PMC1118958).
Certified Financial Planning Board, Financial Planning Practice Standards 200-2, available at http://www.cfp.net/forcfp-professionals/professional-standardsenforcement/standards-of-professional-conduct/financialplanning-practice-standards/practice-standards-200.
Zhao, "Technical Note, WebEntree: A Web service aggregator," IBM Systems Journal, vol. 37, No. 4 (1998), pp. 584-595.
McGuire, Kara, "Minnesotans getting hit by Wall Street Woe: Assets frozen after the Reserve Primary Fund 'broke the buck' are still in legal limbo", 2012, MCT Information Svc, 14/AA,An,AZ,AU,TI/2 (Item 2 from file: 608).
Walker, Tom, The Atlanta Journal—Constitution Wall Street column, 2012, MCT Information Svc 14/AA, AN, AZ, AU, TI/4 (Item 4 from file: 608).
Yan, Ellen, Depit card tied to 401(k) stirs debate, legislation, 2012, MCT Information Svc, 14/AA, AN, AZ, AU, TI/3 (Item 3 from file: 608).

\* cited by examiner

FIG. 5B

FUNDING LOAN REQUEST

ADMINISTRATOR CHECK REPAYMENTS

LOAN FULLY REPAID AND PARTICIPANT CLOSES ACCOUNT

LOAN FULLY REPAID AND PARTICIPANT REDUCES LOAN LINE

BYPASS SYSTEM

CROSS-REFERENCE TO RELATED APPLICATIONS

This application claims the benefit of and priority to U.S. Patent Application No. 62/134,775, filed on Mar. 18, 2015, the entire contents of which are incorporated by reference as if fully set forth herein. This application is further related to U.S. Provisional Patent Application No. 61/996,664, filed on May 14, 2014, and U.S. Patent Application No. 62/000,095, filed on May 19, 2014, the entire contents of each of which are incorporated by reference as if fully set forth herein.

FIELD OF THE INVENTION

The present invention generally relates to a bypass system.

BACKGROUND OF THE INVENTION

Prior art computer systems used in the provision of retirement accounts have required the cooperation and participation of account administrators with computer systems of ancillary service providers in order for the ancillary service provider systems to interact with such systems. Such cooperation entailed custom technological integration of the computer system, such as specialized data access points. For example, loan fund providers would need to have the cooperation of the administrators in order to integrate their computer systems to enable them to access and to obtain data used in the provision of such loans. The cooperation and/or participation of the administrators can be cumbersome and burdensome and is a technological barrier to efficient operation and/or implementation of the ancillary service provider systems without extensive customized integration with the existing administrator computer systems.

There is a need for computer systems, such as loan fund computer systems, that can bypass technological cooperation of an administrator computer system or record keeper computer system to obtain required data without the burden of custom integration with such preexisting computer systems.

SUMMARY OF THE INVENTION

The present invention generally relates to a bypass system that overcomes the above technological problems. The present invention provides a technological data access solution that seeks to address these obstacles in the prior art with a bypass system that can retrieve required data, such as data required for the provision of loan funds.

In embodiments, a system may comprise one or more processors and non-transitory computer-readable memory operatively connected to the one or more processors and having stored thereon machine-readable instructions to perform the following steps: receiving, by one or more computers from an electronic user device associated with a client, an electronic loan request for a loan to be provided from a core account of the client; obtaining, by the one or more computers, core account access information comprising a core account provider identifier indicating a provider of the core account and core account authentication credentials of the client for a core account customer portal of a core account computer system that manages the core account; and obtaining, by the one or more computers, core account information.

In embodiments, the one or more computers may obtain the core account information by accessing, by the one or more computers, the core account customer portal using the core account authentication credentials, wherein access to the core account customer portal does not require technological access beyond a level of technological access provided to the client, and obtaining, via the core account customer portal, a core account balance of the core account and a maximum allowable loan limit. In embodiments, the core account customer portal may comprise an application programming interface. In embodiments, the core account customer portal may comprise a website accessible at a URL via the Internet. Obtaining the core account balance of the core account and the maximum allowable loan limit may comprise screen scraping, such as parsing HTML data and/or parsing webpage text, to name a few.

In embodiments, the system may be further configured to perform the steps of generating, by the one or more computers, first machine-readable instructions to render a loan amount graphical user interface, wherein the loan amount graphical user interface comprises a graphical indication of the maximum allowable loan limit; providing, from the one or more computers to the electronic user device, the first machine-readable instructions to render the loan amount graphical user interface at the electronic user device; receiving, at the one or more computers via the loan amount graphical user interface, a requested loan amount; determining, by the one or more computers, that the requested loan amount does not exceed the maximum allowable loan limit; generating, by the one or more computers, second machine-readable instructions to execute a funds transfer of the requested loan amount to a designated loan fund account; providing, from the one or more computers to the core account computer system, the second machine-readable instructions; receiving, at the one or more computers, an electronic indication that the funds transfer was executed; generating, by the one or more computers, an electronic notification that the requested loan amount is available in the designated loan fund account; and transmitting, from the one or more computers, to the electronic user device, the electronic notification.

In embodiments, the core fund may be a retirement account. In embodiments, the designated loan fund account may be linked to a debit card. In embodiments, the designated loan fund account may be linked to a checking account.

In embodiments, one or more computers, which may comprise a loan computer system or administrator computer system, may received from an electronic user device associated with a client an electronic loan request for a loan to be provided from a core account of the client. The one or more computers may obtain core account access information comprising a core account provider identifier indicating a provider of the core account and core account authentication credentials of the client for a core account customer portal of a core account computer system that manages the core account. In embodiments, the core account provider identifier may comprise a provider name or other alphanumeric identifier, which may be input my a user into a graphical user interface (GUI) and/or selected from a list of predefined providers, to name a few. In embodiments, the core account authentication credentials may comprise a username and password and/or contact information (e.g., an email address), to name a few.

The one or more computers may obtain core account information by accessing the core account customer portal using the core account authentication credentials, wherein access to the core account customer portal does not require technological access beyond a level of technological access provided to the client and obtaining, via the core account customer portal, a core account balance of the core account and a maximum allowable loan limit. In embodiments, the core account customer portal may comprise an application programming interface. In embodiments, the core account customer portal may comprise a website accessible at a URL via the Internet. Obtaining the core account balance of the core account and the maximum allowable loan limit may comprise screen scraping, such as parsing HTML data and/or parsing webpage text, to name a few.

In embodiments, the one or more computer may generate first machine-readable instructions to render a loan amount graphical user interface, wherein the loan amount graphical user interface comprises a graphical indication of the maximum allowable loan limit. The one or more computers may provide to the electronic user device the first machine-readable instructions to render the loan amount graphical user interface at the electronic user device. The one or more computers may receive via the loan amount graphical user interface a requested loan amount. In embodiments, the one or more computers may determine that the requested loan amount does not exceed the maximum allowable loan limit; generate second machine-readable instructions to execute a funds transfer of the requested loan amount to a designated loan fund account; and provide to the core account computer system the second machine-readable instructions.

In embodiments, the one or more computers may receive an electronic indication that the funds transfer was executed. The one or more computers may generate an electronic notification that the requested loan amount is available in the designated loan fund account, and the one or more computers may transmit to the electronic user device the electronic notification.

In embodiments, the core fund may be a retirement account. The designated loan fund account may be linked to a debit card. In embodiments, the designated loan fund account may be linked to a checking account.

BRIEF DESCRIPTION OF THE DRAWINGS

The above and related objects, features and advantages of the present invention, will be more fully understood by reference to the following detailed description of the exemplary embodiments of the present invention, when taken in conjunction with the following exemplary figures, wherein:

FIGS. 5A-C are screenshot of electronic interfaces according to exemplary embodiments of the present invention.

DETAILED DESCRIPTION OF THE INVENTION

Figure 1A:
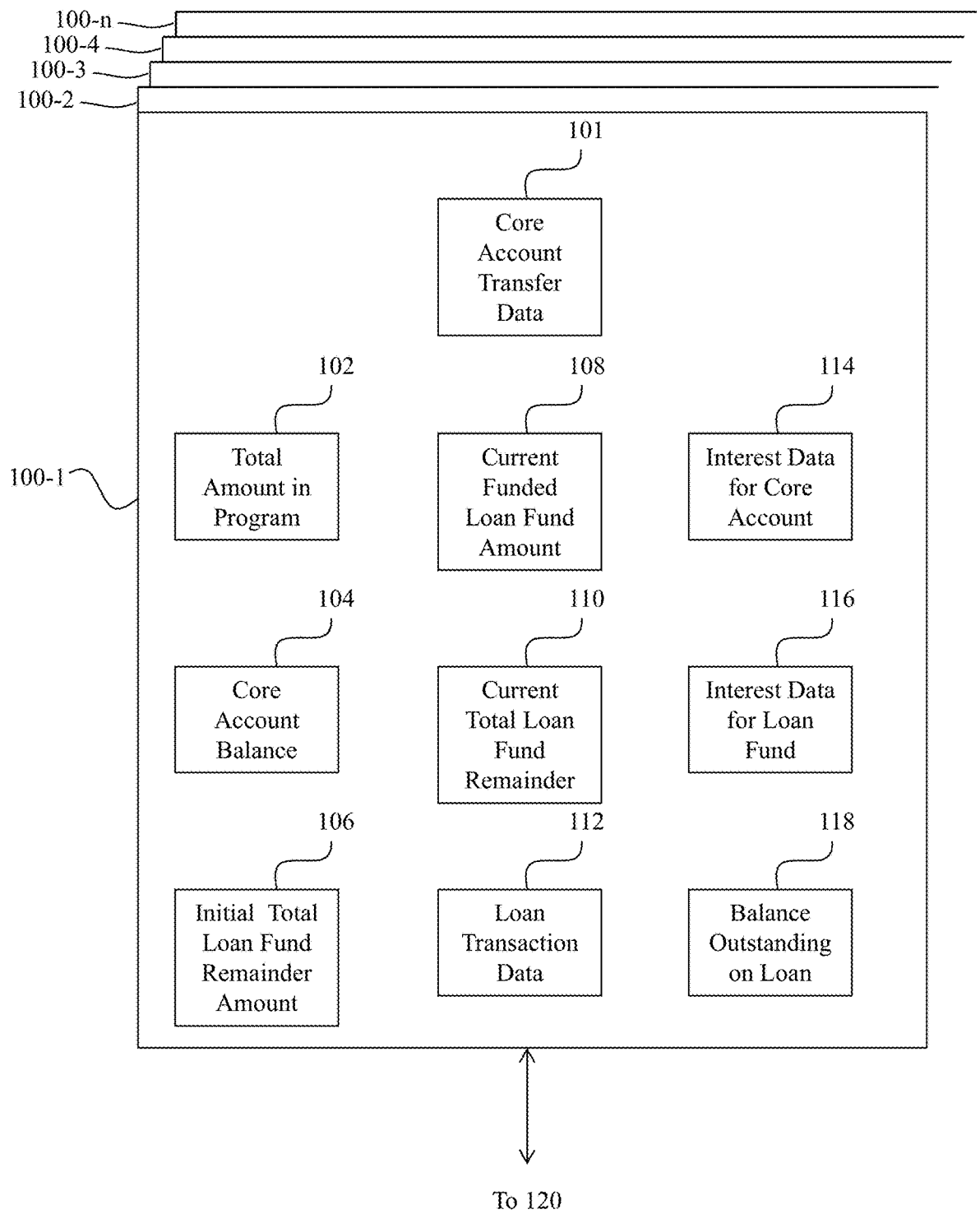
FIG. 1A is a schematic diagram of embodiments of one or more databases that may be used to implement embodiments of the present invention.

The present invention generally relates to systems, methods, and program products for using a customer portal of a core account computer system to bypass the core account provider to provide a loan fund. The present invention further relates to a particular application of a new and improved system for processing a loan fund account associated with a retirement plan, such as a defined benefits plan and/or a defined contribution plan.

Individuals (referred to as "contributors") may save money for retirement in various forms of retirement plans, such a defined benefit plan or a defined contribution plan. Such individuals are typically the beneficiaries of such retirement plans.

A defined benefit plan promises a specified monthly benefit at retirement. The plan may state this promised benefit as an exact dollar amount, such as $100 per month at retirement. Or, more commonly, it may calculate a benefit through a plan formula that considers such factors as salary and service—for example, 1 percent of average salary for the last 5 years of employment for every year of service with an employer.

A defined contribution plan, on the other hand, does not promise a specific amount of benefits at retirement. In these plans, the employee or the employer (or both) contribute to the employee's individual account under the plan, sometimes at a set rate, such as 5 percent of earnings annually. These contributions generally are invested on the employee's behalf. The employee will ultimately receive the balance in their account, which is based on contributions plus or minus investment gains or losses. The value of the account will fluctuate due to the changes in the value of the investments. Examples of defined contribution plans include 401(k) plans, 403(b) plans, employee stock ownership plans, and profit-sharing plans.

A Simplified Employee Pension Plan (SEP) is a relatively uncomplicated retirement savings vehicle. A SEP allows employees to make contributions on a favored basis to individual retirement accounts (IRAs) owned by the employees. SEPs are subject to minimal reporting and disclosure requirements. Under a SEP, an employee must set up an IRA to accept the employer's contributions. Employers may no longer set up Salary Reduction SEPs. However, employers are permitted to establish SIMPLE IRA plans with salary reduction contributions. If an employer had a salary reduction SEP, the employer may continue to allow salary reduction contributions to the plan.

A Profit Sharing Plan or Stock Bonus Plan is a defined contribution plan under which the plan may provide, or the employer may determine, annually, how much will be contributed to the plan (out of profits or otherwise). The plan contains a formula for allocating to each participant a portion of each annual contribution. In embodiments, a profit sharing plan or stock bonus plan may include a 401(k) plan.

A 401(k) Plan is a defined contribution plan that is a cash or deferred arrangement. Employees can elect to defer receiving a portion of their salary which is instead contributed on their behalf, to the 401(k) plan. Sometimes the employer may match these contributions. There are special rules governing the operation of a 401(k) plan. For example, there is a dollar limit on the amount an employee may elect to defer each year. An employer must advise employees of any limits that may apply. Employees who participate in 401(k) plans assume responsibility for their retirement income by contributing part of their salary and, in many instances, by directing their own investments.

An Employee Stock Ownership Plan (ESOP) is a form of defined contribution plan in which the investments are primarily in employer stock.

A Money Purchase Pension Plan is a plan that requires fixed annual contributions from the employer to the employee's individual account. Because a money purchase pension plan requires these regular contributions, the plan is subject to certain funding and other rules.

A Cash Balance Plan is a defined benefit plan that defines the benefit in terms that are more characteristic of a defined contribution plan. In other words, a cash balance plan defines the promised benefit in terms of a stated account balance. In a typical cash balance plan, a participant's account is credited each year with a "pay credit" (such as 5 percent of compensation from his or her employer) and an "interest credit" (either a fixed rate or a variable rate that is linked to an index such as the one-year Treasury bill rate). Increases and decreases in the value of the plan's investments do not directly affect the benefit amounts promised to participants. Thus, the investment risks and rewards on plan assets are borne solely by the employer. When a participant becomes entitled to receive benefits under a cash balance plan, the benefits that are received are defined in terms of an account balance.

Historically, contributors to such retirement plans would hold funds in one or more accounts made up of investments in one or more investment vehicles, such stocks, bonds, funds, to name a few. Some investment vehicles are more likely to fluctuate, and are referred to as variable rate investment vehicles. Other investment vehicles are more stable, but often offer a guaranteed but lower potential rate of return on the investment, and are referred to as stable investment vehicles. The main investments (or "core assets") of a given contributor are held in one or more core accounts. Historically, systems used to allow an individual who contributed to a defined benefits plan and/or a defined contribution plan to obtain a loan against core assets, but these were cumbersome and difficult to use. One way developed by the inventors and implemented in its Reserve Advantage Plus and Access Control Advantage products was for the system to set up and maintain a segregated loan fund that would segregate stable value, liquid, or substantially liquid assets that could be used to fund a loan to the contributor. The computer systems developed to implement such a system are described in U.S. Pat. Nos. 7,302,413, 7,398,245, and 8,626,649 (each of which is incorporated by reference as fully set forth herein). The computer systems and methods disclosed in those prior patents provided significant improvement over prior systems used to borrow funds from retirement plans, such as defined benefits plans or defined contribution plans.

Thus, while prior systems existed by which an individual who contributed to such retirement plans could borrow funds against his or her respective retirement plan, such systems would either require borrowing the entire amount from a core account in a single transaction or using a fully funded segregated loan account containing the entire authorized loan amount, which segregated account earned interest at a lower interest rate than assets in the core investment account. Any additional funds beyond the amount in the segregated loan fund required applying for a new loan via a new loan approval application. These limitations were dictated in large part by the processing complexity of the accounting algorithms used by such computer systems, making a technical solution difficult to develop and process. Thus, in the prior art, loans were taken either entirely from the core account, or entirely from a funded segregated loan fund.

In embodiments consistent with the invention, a new system and computerized method has been developed which offers a technical solution to the processing complexity presented in prior art solutions. In such embodiments, the system and computerized methods tracks, determines and transfers funds in a total loan fund (subsequently referred to also as an initial loan fund remainder amount) that has been set to a value that has been pre-approved to straddle funds held in a core investment account and funds held in a funded segregated loan fund account that holds liquid assets or substantially liquid assets. Thus, in embodiments, one or more particularly programmed computers may implement processes whereby an individual who contributed to a defined benefits plan may access loans electronically drawn down first from the funded segregated loan fund having the liquid assets or substantially liquid assets and then, with potentially some delay due to possible liquidation requirements, funds may be electronically drawn from assets in the core account, up to the full amount of the total loan fund. In embodiments, this operation may be coupled with an automated electronic replenishing of the funded segregated loan fund account from assets in the core account in advance of any subsequent repayment from the individual. When the individual makes repayment, then in embodiments there may be automatic replenishment of the core account.

Thus, the systems, methods, and program products in accordance with embodiments of the present invention, implement an automated process that retains as much funds as possible or desired in a core account with a desired feature (e.g., a high return, high safety, and/or other feature, to name a few) while providing pre-authorization to take loans up to a total initial loan fund amount, and without the need to make an application for a new loan. Accordingly, such a system enables an individual who contributed to a defined benefits plan to electronically access a plurality of loans less than the available loan fund limit from the funded segregated loan fund account, with the ability to access additional funds up to the pre-approved loan funds from the core account when needed, without having to apply for a new loan from the defined benefits plan. Accordingly, in embodiments, access to assets in the funded segregated loan fund account and the core account up to the amount of the total initial loan fund amount may be made without further loan approval. In embodiments, the technical solution of the present invention, which provides for, inter alia, automated tracking and automated accounting of assets across a core investment account and a funded segregated loan fund account, enables an individual who contributed to a defined benefits plan to obtain a loan from the plan while maximizing earnings from that core account of the plan in an unconventional computer process that significantly improves upon the basis process of obtaining a loan and obtains a different result from anything practiced manually or by computer in the art.

Figure 1B:
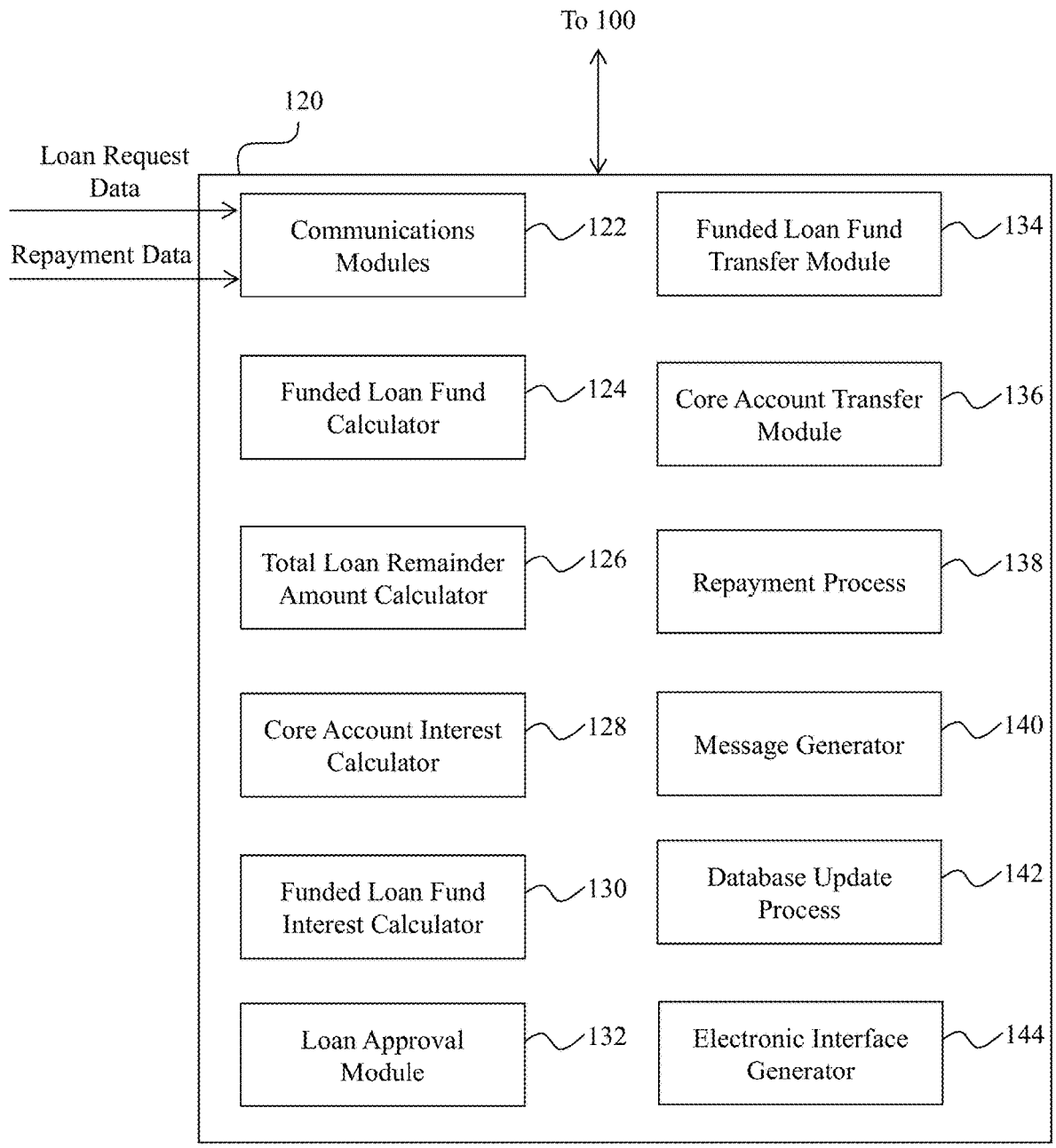
FIG. 1B is a continuation of the schematic diagram of FIGS. 1A and 1s a schematic diagram of computer modules that may be used to implement embodiments of the invention.

Referring to the figures, FIGS. 1A and 1B represent embodiments consistent with the invention. FIGS. 1A and 1B comprise one or more databases, e.g., 100-1, 100-2, 100-3, 100-4, and 100-n, that maintain records of loan data for individuals, and one or more computers 120 with multiple computing and transfer modules therein for implementing embodiments of the invention.

Referring to FIG. 1A, data that may be held in one or more databases 100, stored on one or more processor readable storage devices, which may be operatively connected to one or more computers 120, for a plurality of individuals or other entities 100-2, 100-3, 100-4, and 100-n, is illustrated. In embodiments, the one or more databases 100 may comprise core account transfer data 101, where the core transfer data 101 may comprise amounts, transfer dates, and/or other data related to transfers to and/or from the core accounts, a total amount in a program 102, a core account balance 104, where the core account may have funds in one or more non-liquid and liquid assets. In embodiments, the one or more databases may further comprise an approved loan fund amount 106, also referred to as an initial loan fund remainder amount. In embodiments, the one or more databases may further comprise a current funded loan fund amount 108, which, in embodiments, may comprise liquid assets, and which has an initial loan fund amount that is less than the approved loan fund amount, i.e., the initial loan fund remainder amount 106. In embodiments, the one or more databases 100 may further comprise a current loan fund remainder amount 110, comprising the initial loan fund remainder amount 106 less any loan transfers from the current funded loan fund amount 108 and the core account. In embodiments, the one or more databases 100 may further comprise loan transaction data 112, which may comprise loan fund requests and associated loan fund amounts, and repayment amounts. In embodiments, the one or more databases may further comprise interest data for the core account 114, interest data for the loan fund account 116, and/or a balance outstanding on one or more loans 118.

Referring to FIG. 1B, in embodiments, the one or more computers 120 for the system may comprise various modules, as described herein. In embodiments, the modules may be stored in non-transitory computer-readable memory operatively connected to the computers 120 and running or configured to run on one or more processors of the computers 120.

The one or more computers 120 may comprise a communications module 122 configured to communicate with a beneficiary interface, and the one or more databases 100. In embodiments, the communications module 122 may comprise a web server for communicating with the beneficiary. In embodiments, the communications module may receive electronic loan requests and repayment data from or on behalf of beneficiaries (e.g., from beneficiary electronic user devices, such as computers, tablet computers, mobile phones, smart phones, and/or PDAs, to name a few).

In embodiments, the one or more computers for the system may comprise a loan approval module 132. In embodiments the loan approval module 132 may be configured to receive beneficiary identification data and account data, and/or access data about one or more core accounts for the beneficiary, access a previously approved current loan fund remainder amount and a current funded loan fund amount. In embodiments, when a loan amount is received, the loan approval component may be configured to access the current loan remainder amount and determine whether the requested loan amount exceeds or does not exceed this current loan fund remainder amount, and approve or not approve the loan request based at least in part on this determination operation.

In embodiments, the one or more computers for the system may comprise a funded loan fund calculator module 124 configured to calculate a comparison, by the one or more computers executing machine-readable instructions on one or more processors, of the requested loan amount to the current loan fund remainder amount 110 of a beneficiary to determine if the amount of the electronic loan request exceeds or does not exceed the current loan fund remainder amount 110. In embodiments, the funded loan fund calculator module 124 may also be configured to calculate a difference between the requested loan amount and the current loan fund remainder amount 110. The one or more computers may be configured with logical processing rules to trigger, when the requested loan amount does not exceed the current loan fund remainder amount 110, the funded loan fund calculator module 124 to perform the operation of determining if the requested loan amount exceeds or does not exceed the current funded loan fund amount 108. In embodiments, if the funded loan fund calculator module 124 determines that the requested loan amount does exceed the current funded loan fund amount, then an operation may be triggered (e.g., by programmed processing rules) to determine, using the funded loan fund calculator module 124, a deficiency amount by which the requested loan amount exceeds the current funded loan fund amount 108. In embodiments, this determination operation may be performed by subtracting, in the calculator 124, the requested loan amount from the current funded loan fund amount. When the result of the subtraction operation is negative, then designating this negative amount as a deficiency amount by which the requested loan amount exceeds the current funded loan fund amount 108. In embodiments, a comparison of the amounts may be performed to determined first, and then the deficiency amount may be calculated in a subsequent operation.

In embodiments, the one or more computers for the system may comprise a funded loan fund transfer module 134 configured to transfer or have transferred funds from the funded loan fund account to service the loan request, when the requested loan amount does not exceed the current loan fund remainder amount 110. In embodiments, this operation may comprise generating or having generated machine-readable electronic instructions for the transfer of funds.

In embodiments, the one or more computers for the system may comprise a core account transfer module 136 configured to transfer or have transferred, when the requested loan amount does not exceed the current loan fund remainder amount 110 and the requested loan amount does exceed the current funded loan fund amount 108, by the one or more computers executing machine-readable instructions on one or more processors, the deficiency amount from a core account to service the loan request, but with the amount from the funded loan fund account and the core account transferred not to exceed the current loan fund remainder amount. In embodiments, these funds may be taken from one core account of the benefit plan. In embodiments, the funds may be taken from multiple core accounts of the benefit plan. In embodiments, this operation may comprise generating or having generated machine-readable electronic instructions for the liquidation of assets, or in embodiments, selected assets, in the one or more core accounts, and for the transfer of proceeds from the liquidation to service the loan request. In embodiments, the instructions may be executed and/or transmitted to one or more other computer systems for execution. In embodiments, as assets in the core account may need to be liquidated, the transfer time may vary with the one or more assets being liquidated.

In embodiments, the one or more computers for the system may comprise the core account transfer module 136 configured to transfer or have transferred, when the current loan fund remainder amount is greater than a predetermined amount (e.g., zero), replenishment funds from the core account to the funded loan fund account to replenish the funded loan fund account up to an initial funded loan fund amount, but with the replenishment amount transferred not to exceed the current loan fund remainder amount. In embodiments, performing such an operation may comprise generating, transmitting, and/or executing machine-readable electronic instructions. In embodiments, this operation may be implemented as an automatic replenishment operation, which may be executed according to machine-readable instructions stored in non-transitory computer-readable memory. In embodiments, as assets in the core account may need to be liquidated, the transfer time for the replenishment may vary with the one or more assets being liquidated.

In embodiments, the one or more computers for the system may comprise a remainder amount calculator 126 configured to update the current loan fund remainder amount 110. Such an operation may comprise subtracting or having subtracted, any amounts transferred from the funded loan fund account and from the core account to service the loan request, from the current loan fund remainder amount 110 held in the database 100 to produce a new current loan fund remainder amount 110. In embodiments, this may comprise a single subtraction operation. In embodiments, this operation may comprise multiple subtraction operations.

In embodiments, the one or more computers for the system may comprise a repayment process transfer module 138 configured to trigger a repayment transfer when repayment amount data for a repayment amount is received. The repayment process transfer module 138 may be configured to perform the operation of transferring or having transferred the repayment amount to the core account to replenish the one or more core accounts for loan transfers therefrom, and to replenish the funded loan fund account up to the initial funded loan fund amount when necessary and to trigger operation of the current loan fund remainder amount calculator to perform the increase to the current loan fund remainder amount. In embodiments, machine-readable electronic instructions may be generated to repurchase assets for the one or more core accounts. In embodiments, instructions may be generated to send an electronic message to the beneficiary to select assets to purchase for the one or more core accounts. Note that in most instances, the funded loan fund account will have been replenished from the core account. Thus, this funded loan fund account replenishment would occur where the current loan fund remainder amount had reached zero or some other predetermined amount.

In embodiments, the one or more computers for the system may comprise a loan fund remainder amount calculator 126 configured to perform the operation of updating the loan fund remainder amount 110 when repayment amount data for a repayment amount is received. This operation may comprise adding the repayment amount to the current loan fund remainder amount 110.

In embodiments, the one or more computers for the system may comprise a database update module 142 configured to update the core account transfer data 101, the current loan fund remainder amount 110, and the current funded loan fund amount 108 in the one or more databases based on the transfer operations of the funded loan fund transfer component and the core account transfer component and the operations of the repayment component of the computer system.

In embodiments, the one or more computers for the system may comprise a core account interest calculator 128 configured to perform the operation of calculating or having calculated an interest amount based at least in part on a first interest rate for funds held in the core account.

In embodiments, the one or more computers for the system may comprise a funded loan fund account interest calculator 130 configured to perform the operation of calculating or having calculated an interest amount based at least in part on a second interest rate for funds held in the funded loan fund account.

In embodiments, the one or more computers for the system may comprise a message generator 140 configured to generate messages such as loan approval messages, loan denial messages, messages containing amounts remaining in the loan fund remainder account, messages identifying delay periods that may be caused by asset liquidation delays, and/or messages containing outstanding loan amounts, to name a few.

Figure 2:
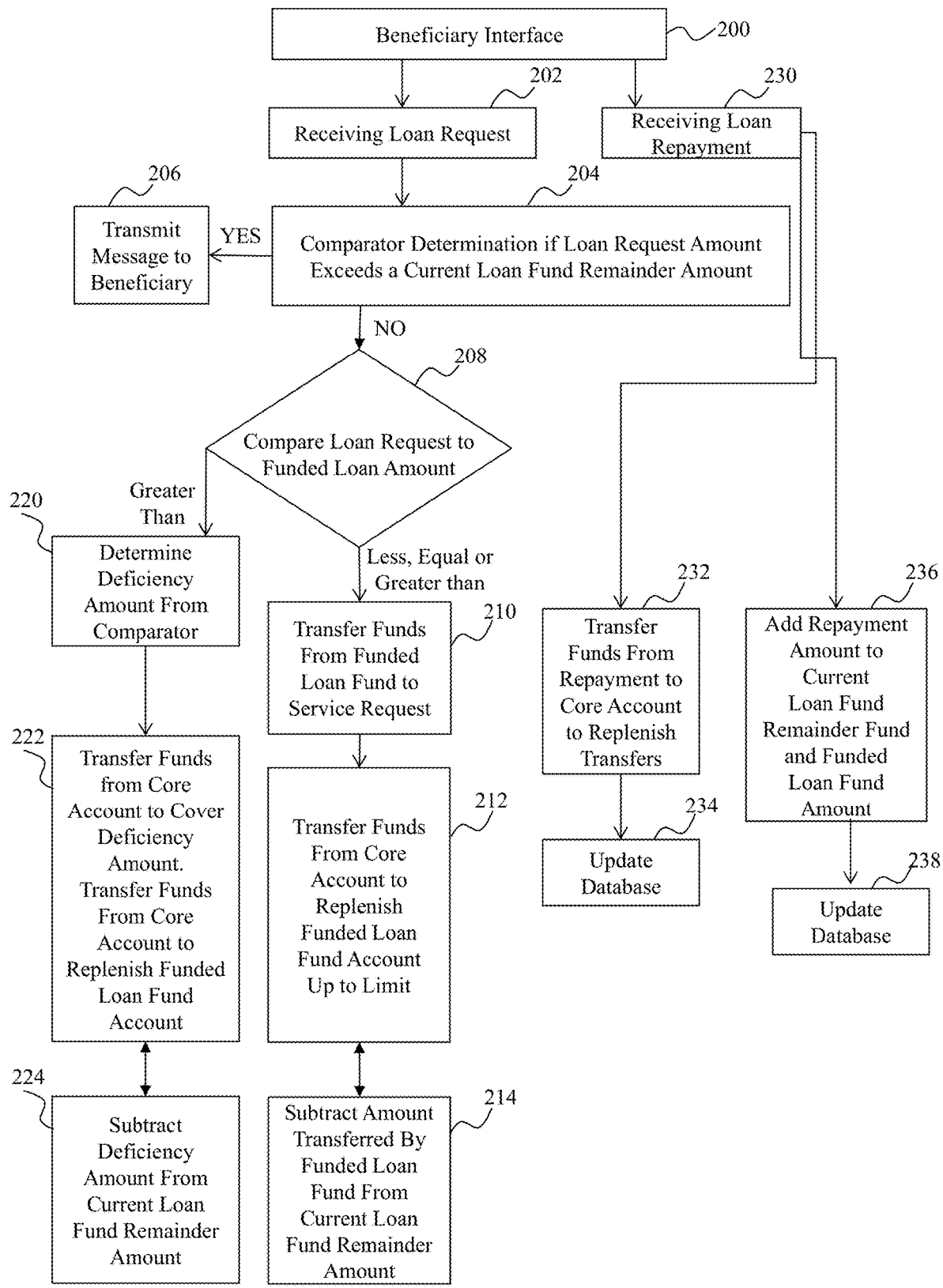
FIG. 2 is a flowchart of operation of embodiments consistent with the invention.

Referring to FIG. 2, embodiments of a flowchart consistent with the invention are illustrated. An exemplary embodiment of a beneficiary interface on a client computer is represented by block 200. In embodiments, the one or more computers implementing the invention may provide data for the beneficiary interface. The functions of the interface may be achieved by use of, but are not limited to, one or more computers or computer systems having at least one or more processors, computer-readable memory comprising one or more databases, one or more communications portals for communicating with one or more other computers or computer systems, one or more input devices, and/or software embodied in non-transitory computer readable media and configured to enable, facilitate, and/or otherwise provide the input and/or output of data in the one or more databases, e.g., via a user. In embodiments, the beneficiary interface 200 may be provided on one or more pages of a website via a Web server. Block 202 represents an exemplary embodiment of an operation of receiving or inputting a loan request comprising a loan request amount from the beneficiary interface 200. In embodiments, this loan request may be received from another authorized entity.

Various of the operations of the method, system and program product of the invention require accessing, by the one or more computers, a database stored on one or more non-transitory computer-readable media, with the data comprising: core account transfer data for a core account, an initial loan fund remainder amount; a current loan fund remainder amount; an initial funded loan fund amount in a funded loan fund account, and a current funded loan fund amount held in the funded loan fund account, wherein the initial loan fund remainder amount is greater than the initial funded loan fund amount. The initial loan fund remainder amount may be a maximum loan amount that may be taken from an account, such as a beneficiary plan account. The current loan fund remainder amount is the remainder after a current loan is subtracted from the initial loan fund remainder amount. The current funded loan fund amount is the amount held in the funded loan fund account that holds liquid assets that may be quickly accessed (e.g., cash, money market fund, to name a few).

Block 204 represents an exemplary embodiment of a computer operation of comparing, by the one or more computers executing machine-readable instructions on one or more processors, the requested loan amount to the current loan fund remainder amount 110 to determine if the amount exceeds or does not exceed the current loan fund remainder amount. When the requested loan amount exceeds the current loan fund remainder amount, then in embodiments, a message may be generated and transmitted to the beneficiary interface that the requested loan amount exceeds the current loan fund remainder amount and is not permitted. This operation is represented by block 206. In embodiments, the current loan fund remainder amount may be displayed with a designation that this is the maximum loan amount that may be obtained currently. In other embodiments, the loan may be approved, but for an amount which will bring the current loan fund remainder amount to zero or another predetermined amount.

When the one or more computers determine that the requested loan amount does not exceed the current loan fund remainder amount, then an operation may be performed of determining, by the one or more computers executing machine-readable instructions on one or more processors, if the requested loan amount exceeds or does not exceed the current funded loan fund amount 108. This operation is represented by block 208.

When the one or more computers determine that the requested loan amount does not exceed the current loan fund remainder amount, then an operation may be performed of transferring or having transferred, by the one or more computers executing machine-readable instructions on one or more processors, funds up to the current funded loan fund amount from the funded loan fund account to service the loan request. This operation is represented by block 210. In embodiments, this operation may comprise generating or having generated instructions for the transfer of funds.

When the one or more computers determine by the computer-implemented operation represented by block 208 that the requested loan amount does exceed the current funded loan fund amount, then an operation may be performed, by the one or more computers executing machine-readable instructions on one or more processors, of determining a deficiency amount by which the requested loan amount exceeds the current funded loan fund amount. In embodiments, this determination operation may be performed by subtracting, in the one or more computers, the requested loan amount from the current funded loan fund amount. When the result of the subtraction operation is negative, then designating this negative amount as a deficiency amount by which the requested loan amount exceeds the current funded loan fund amount. This operation is represented by block 220.

When the one or more computers determine that the requested loan amount does not exceed the current loan fund remainder amount 110 and the requested loan amount does exceed the current funded loan fund amount 108, then the one or more computers executing machine-readable instructions on one or more processors may transfer or have transferred the deficiency amount from the core account to service the loan request, but with the amount from the funded loan fund account and the core account transferred not to exceed the current loan fund remainder amount. This operation is represented by block 222. In embodiments, those funds may be taken from one core account. In embodiments, those funds may be taken from multiple core accounts of the benefit plan. In embodiments, this operation may comprise generating or having generated instructions for the liquidation of assets and the transfer of the proceeds. Note that in embodiments, this operation may be performed only up to the amount in the funded loan fund account when the loan request exceeds the current loan fund remainder amount.

In embodiments, an operation may then be performed of subtracting or having subtracted, by the one or more computers executing machine-readable instructions on one or more processors, the amounts transferred from the funded loan fund account and the core account to service the loan request from the current loan fund remainder amount 110 held in the database. This operation is represented by blocks 214 and 224. In embodiments, this may comprise a single subtraction operation. In embodiments, this operation may comprise multiple subtraction operations.

When the one or more computers determine that the current loan fund remainder amount 110 after this transfer is greater than or equal to a predetermined amount, then the one or more computers executing machine-readable instructions on one or more processors may transfer or have transferred replenishment funds from the core account to the funded loan fund account to replenish the funded loan fund up to the initial funded loan fund amount but with the replenishment amount transferred not to exceed the current loan fund remainder amount. This operation is represented by block 212. In embodiments, this may be implemented as an automatic replenishment operation. In embodiments, as assets in the core account may need to be liquidated, this operation may comprise generating instructions to liquidate assets in one or more of the core accounts. Thus, the transfer time for the replenishment may vary when asset liquidation is required. In embodiments, the predetermined amount may be zero.

When repayment amount data for a repayment amount is received, as represented by block 230, then an operation may be performed of transferring or having transferred, by the one or more computers executing machine-readable instructions on one or more processors, the repayment amount to the core account to replenish the core account for loan transfers therefrom, and in some instances, to replenish the funded loan fund account up to the initial funded loan fund amount when it is below the initial funded loan fund amount. This operation is represented by block 232.

When repayment amount data for a repayment amount is received, then an operation represented by block 236 may be performed of adding, by the one or more computers executing machine-readable instructions on one or more processors, the repayment amount to the current loan fund remainder amount 110, and updating the funded loan fund amount when necessary.

Then an operation may be performed in embodiments of updating, by the one or more computers executing machine-readable instructions on one or more processors, core account information and the current loan fund remainder amount 110 in the database based on the transfer step and the adding step. These operations are represented by blocks 234 and 238.

In embodiments, a further operation may be performed of calculating or having calculated, by the one or more computers executing machine-readable instructions on one or more processors, an interest amount based on a first interest rate for funds held in the core account, and based on a second lower interest rate for funds held in the funded loan account.

In embodiments, when the one or more computers determine that the requested loan amount exceeds the current loan fund remainder amount, then the one or more computers executing machine-readable instructions on one or more processors may transfer or have transferred, by the one or more computers executing machine-readable instructions on one or more processors, funds from funded loan fund and/or the core account only up to an amount that will reduce the loan fund remainder amount to zero.

Tables 1 and 2 illustrate examples of fund movement and interest earnings consistent with embodiments of the invention. Referring to Table 1, columns are provided for a core account amount, a core account interest (e.g., 10%, a remainder amount), a funded loan fund amount, a funded loan fund interest (e.g., 1%), and loan request data. A first example consistent with embodiments of the invention is shown at the top of Table 1 above the horizontal line. In the first row the core account is shown as having $100,000. A pre-approved loan amount of $10,000 is set out in the remainder amount column. The segregated loan fund is not yet funded. In the second row, the segregated loan fund is funded to $1,000 from the core account, and the core account is decreased to $99,000. In the third row, a $100 loan request is serviced, so that the funded loan fund is decreased to $900, and the loan fund remainder amount is decreased by $100 to $9,900. The fourth row indicates that the funded loan fund has been replenished by $100 back to $1000 from the core account, and the core account amount has been decreased to $98,900. The fifth row illustrates interest accrued after one year. For the core account, the interest accrued at 10% is $9,890. For the funded loan fund, the interest accrued at 1% is $10. The sixth row illustrates the interest from the core account and the funded loan fund added to the core account amount. The seventh row shows the status of a repayment of the $100 loan plus interest for a year at 5%. After the repayment, the core account amount is $108,905.

The lower part of Table 1 below the horizontal line represents operations of the funded segregated loan of U.S. Pat. No. 7,302,413, assuming the same amount of $100,000 in the core account, and a pre-approved loan fund of $10,000. The third row indicates the status of the accounts after a $100 loan from the segregated loan fund. The fourth row indicates the interest earned after one year. The fifth row indicates the earned interest added to the core account. The sixth row indicates the status after a repayment.

A comparison can be made by adding the core account amount and the funded loan amount. Thus, in accordance with embodiments of the invention, a total is obtained of $109,905, compared to a total of $109,104 for the '413 patent. As the numbers grow larger, this difference will grow proportionately larger.

Referring to Table 2, a comparable set of rows and columns are shown for further operations consistent with the invention. However, in this instance, the loan request is $2,000, e.g., it exceeds the amount in the funded loan fund account. The third row shows the core account reduced by $2,000 to $98,000 and the funded loan fund account reduced to zero. The fourth row show the status after an automatic replenishment of the funded loan fund account via a transfer from the core account. In this instance, the core account has been further reduced by $1,000 to $97,000, and the funded loan fund has been replenished back to $1,000. The fifth row shows the interest accrued after one year. The sixth row shows the earned interest added to the core account amount, e.g., $106,710. The seventh row shows the core amount after repayment of the $2,000 loan with interest at 5%, e.g., $108,810. A similar interest difference advantage is obtained over to the prior art.

TABLE 1

| Core Account | Core Account Interest (e.g. 10%) | Remainder Amount | Funded Loan Fund | Funded Loan Fund Interest (e.g. 1%) | Loan Request (Subject to 5% on Repayment) |
|---|---|---|---|---|---|
| 100,000 | | 10,000 | 0 | | |
| 99,000 (After Funding Loan Fund) | | 10,000 | $1,000 | | 0 |
| 99,000 (After Loan) | | 9,900 | $900 | | $100 |
| 98,900 (After Replenishment from core) | | 9,900 | $1000 | | $100 |
| 98,900 (After 1 Yr) | 9,890 | 9,900 | 1,000 | 10 | $105 |
| 108,800 (Interest added to core) | 0 | 9,900 | 1,000 | 0 | $105 |

TABLE 1-continued

| Core Account | Core Account Interest (e.g. 10%) | Remainder Amount | Funded Loan Fund | Funded Loan Fund Interest (e.g. 1%) | Loan Request (Subject to 5% on Repayment) |
|---|---|---|---|---|---|
| 108,905 (After Repayment $105) | | 10,000 | 1,000 | | 0 |
| 100,000 | | | | | 0 |
| 90,000 | | | 10,000 | | |
| 90,000 (After a Loan) | | | 9,900 | | $100 |
| 90,000 (After 1 Yr) | 9,000 | | 9,900 | 99 | $105 |
| 99,099 (Interest added to core) | | | 9,900 | | $105 |
| 99,104 (After Repayment, $105) | | | 10,000 | | |

TABLE 2

(Loan Request Exceeds Funded Loan Fund Amount)

| Core Account | Core Account Interest (e.g. 10%) | Remainder Amount | Funded Loan Fund | Fund Loan Fund Interest (e.g. 1%) | Loan Request (Subject to 5% on Repayment) |
|---|---|---|---|---|---|
| 100,000 | | 10,000 | 0 | | 0 |
| 99,000 (After funding Loan Fund) | | 10,000 | 1,000 | | 0 |
| 98,000 (After Large Loan) | | 8,000 | 0 | | 2,000 |
| 97,000 (After Replenishment from Core) | | 8,000 | 1,000 | | 2,000 |
| 97,000 (After 1 Yr) | 9,700 | 8,000 | 1,000 | 10 | 2,100 |
| 106,710 (Interest Added to Core) | | 10,000 | 1,000 | | 2,100 |
| 108,810 (After Repayment + Interest, e.g. $2,100) | | 10,000 | 1,000 | | |

Figure 3:
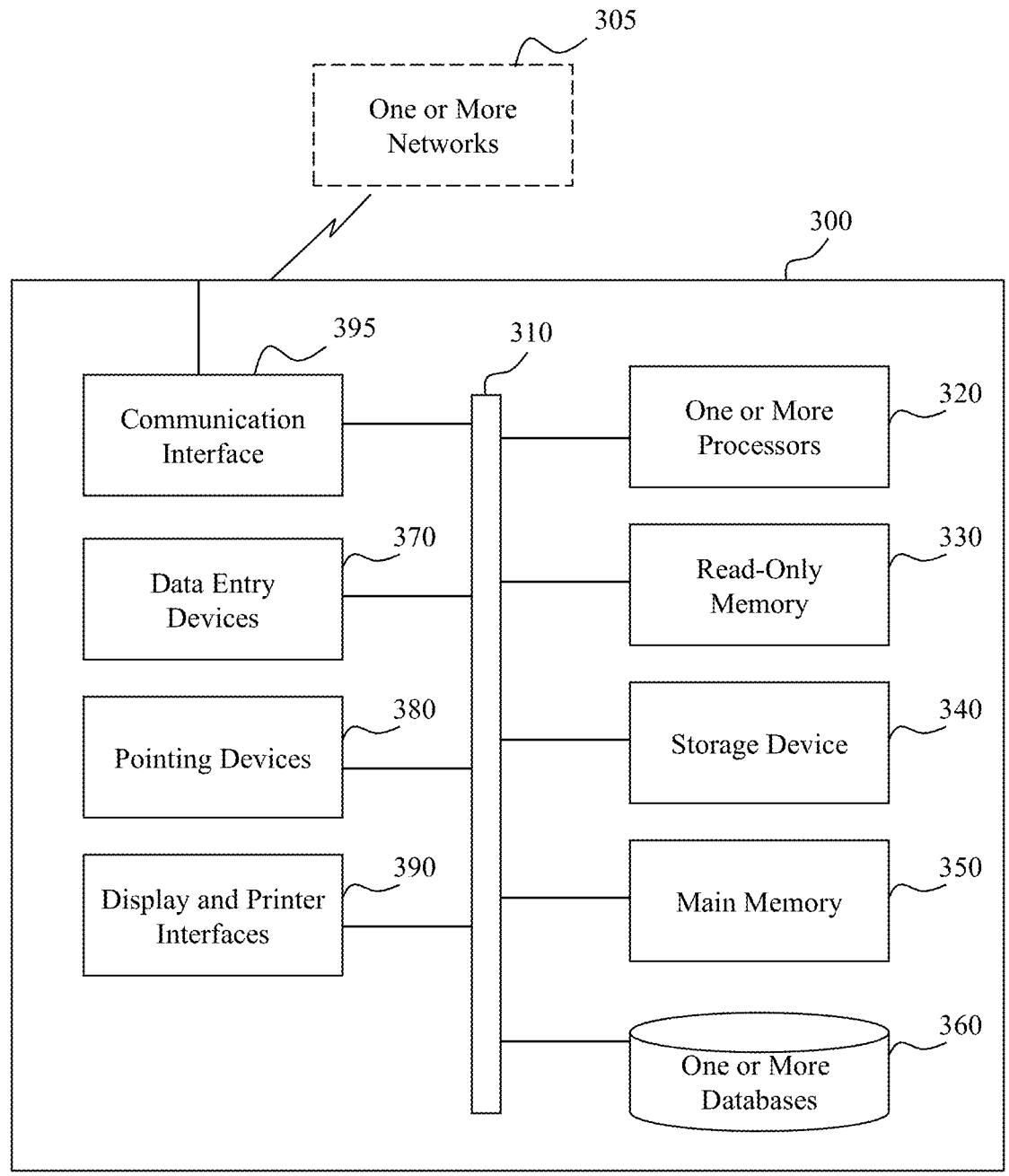
FIG. 3 is a schematic block diagram of a computer system that may be used to implement the present invention.

FIG. 3 is a block diagram illustrating embodiments of the system of FIG. 1, generally designated by reference number 300 in FIG. 3. In embodiments, the system 300 according to the present invention may be communicatively coupled to one or more networks 305 via a communication interface 395. The one or more networks 305 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 395 may be implemented accordingly. The network 305 serves the purpose of delivering information between connected parties.

The system 300 may comprise in embodiments, a computing platform for performing, controlling, and/or initiating computer-implemented operations by software and/or computer code executing computing steps on one or more processors, for example, via a server and the one or more networks 305. The computer platform may comprise system computers and other party computers. An exemplary system 300 may operate under the control of computer-executable instructions to carry out the process steps described herein. Computer-executable instructions comprise, for example, instructions and data which cause a general or special purpose computer system or processing device to perform a certain function or group of functions. Computer software for the system 300 may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system 300 may include one or more personal computers, workstations, notebook computers, servers, mobile computing devices, handheld devices such as mobile telephones and PDA's, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The system 300 may comprise, in embodiments, a bus 310 or other communication component that couples the various system elements 320-395, and is configured to communicate information between the various system elements 320-395.

As shown in FIG. 3, one or more computer processors 320 may be coupled with the bus 310 and may be configured to process and handle information and execute instructions. The system 300 may include a main memory 350, such as a Random Access Memory (RAM) or other dynamic storage device, coupled to the bus 300, for storing information and instructions to be executed by the one or more processors 320. The main memory 350 also may be used for storing temporary variables or other intermediate information during execution of instructions by the one or more processors 320.

The system 300 further may include a Read-Only Memory (ROM) 330 or other static storage device (e.g., EPROM, EAROM, EEPROM, PROM, flash, and the like) coupled to the bus 310 for storing static information and instructions for the one or more processors 320. Furthermore, a storage device 340, such as a magnetic disk or optical disk, such as a CD-ROM or other optical media may be provided and coupled to the bus 310 for storing information and instructions.

In addition to the ROM 330, one or more databases 360 may be coupled to the bus 310 for storing static information and software instructions. Information stored in or maintained in the database 360 may be provided in conformance with a database system format such as, but not limited to, the Structured Query Language (SQL) format. Database query and access instructions, for example, in the form of one or more scripts, may be used which, when executed by a processor such as the processor 320, serve to access, store and retrieve data maintained in the database 360 according to the instructions contained in the script.

Furthermore, the system 300 may comprise application software instructions which may implement a user interface portion for generating interactive pages or display screens by which a user/participant may provide data to and receive information from the system 300 and the database 360 using a human-machine interface. In embodiments, interactive pages may include user dialog boxes for accepting user entered information. In embodiments, the human-machine interface may comprise a Graphical User Interface (GUI) portion for prompting the user to enter data by providing an interactive dialog box or message box instructing the user to enter particular data, or to select from among a multitude of options provided using a pull-down menu. In embodiments, a user may interact with the system 300 via the graphical user interface by using a pointing device and/or data entry device. The GUI portion may place the output of the system 300 in a format for presentation to a user via the display. In embodiments, the GUI may be implemented as a sequence of Java instructions.

A data entry device 370, including alphanumeric and other keys, or a pointing device such as a mouse or trackball, or a scanner, to name a few, may be coupled to the bus 310 for communicating information and command selections to the processor 320. The data entry device 370 may be coupled to the bus 310 via an interface (not shown), wherein the interface may be, for example, a serial port, an RS-232 port, or the like. In addition, the interface may be a wireless interface and provide connection-less communication via, for example, Bluetooth communication.

The system 300 may be coupled via the bus 310 to a display or printer 390 for outputting information to a computer user. In addition, a user may use the display (e.g., touch screen) or a scanner to provide information to the system 300.

In embodiments of the present invention, the various program operations as described herein may be provided by the system 300 in response to the one or more processors 320 executing one or more sequences of computer-readable instructions contained in the main memory 350. Such instructions may be read into the main memory 350 from another computer-readable medium, such as the ROM 330, the storage device 340, or the database 360. Execution of the sequences of instructions contained in the main memory 350 may cause the one or more processors 320 to perform the process steps described herein. It should be appreciated that embodiments of the system 300 may perform fewer or additional processes as compared to those described herein. As noted, the one or more processors 320 may be arranged in a multi-processing arrangement. In embodiments, hard-wired circuitry may be used in place of or in combination with software instructions to implement the invention. Thus, embodiments of the invention are not limited to any specific combination of hardware circuitry and software.

The term "computer-readable medium" or "computer-readable storage medium," as used herein refers to any non-transitory medium that is computer-readable and participates in storing and providing instructions to the processor 320 for execution. Such a medium may be removable or non-removable and may take many forms, including, but not limited to, non-volatile media and volatile media. Non-volatile media include, for example, optical or magnetic disks, such as the storage device 340. Volatile media include dynamic memory, such as the main memory 350. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other tangible medium from which a computer can read computer instructions. Combinations of the above are also included within the scope of machine-readable media. Machine-executable instructions comprise, for example, instructions and data which cause a general purpose computer, special purpose computer, or a special purpose processing machine to perform a certain function or group of functions.

As previously noted, the system 300 also comprises a communication interface 395 coupled to the bus 310 for providing one-way, two-way or multi-way data communication with the network 305, and/or communication directly with other devices. In embodiments, the communication interface 395 may comprise a modem, a transceiver Integrated Services Digital Network (ISDN) card, a WAN card, an Ethernet interface, or the like, to provide a data communication connection to a corresponding type of communication medium. As another example, the communication interface 395 may comprise a LAN card to provide a data communication connection to a compatible LAN. Wireless links may also be implemented. In such wireless links, the communication interface 395 may communicate with a base station communicatively coupled to a network server. In any such implementation, the communication interface 395 sends and receives electrical, electromagnetic, radio, infra-red, laser, or optical signals that carry digital data streams representing various types of information. Any combination of the above interfaces may also be implemented.

In embodiments, the communication interface 395 may be communicatively coupled to a web server configured in the one or more processors 320 to generate and output web content that is suitable for display using a web browser at a computing device. In embodiments, the server may generate and transmit requested information through the communication interface 395 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from clients' terminals, access and process data from various sources, and output computer-executable instructions and data using the network 305. Interactive pages transmitted and received using the network 305 may conform to necessary protocols.

The web server configured in the one or more processors 320, in embodiments, may correspond to a secure web application server behind a web server program that a service provider employs to run one or more web based application programs (e.g., an application program to carry out the methods described above) in a secure fashion. Such a secure web application server may be configured to execute one or more web based application programs, responsive to commands and data received from the clients (via a web page supported by the web server), and providing data and results to the clients. The web server and the web application server may be implemented using a single computing platform. Alternatively, it may also be implemented using multiple separate and distributed computing platforms.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols.

Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Turning now to FIGS. 4A-4H, screenshots of graphical user interfaces (GUIs) generated by a system, e.g., system 300 (FIG. 3), according to exemplary embodiments of the present invention are illustrated. GUIs described herein may be provided as electronic data by one or more processors of a computer system for display on an electronic device such as a laptop computer, desktop computer, tablet computer, or mobile device, to name a few. Such data may comprise machine-readable instructions that cause an electronic device to render graphic elements on a display. As described herein, GUIs can be used to present information to a user and/or receive inputs from a user.

Figure 4A:
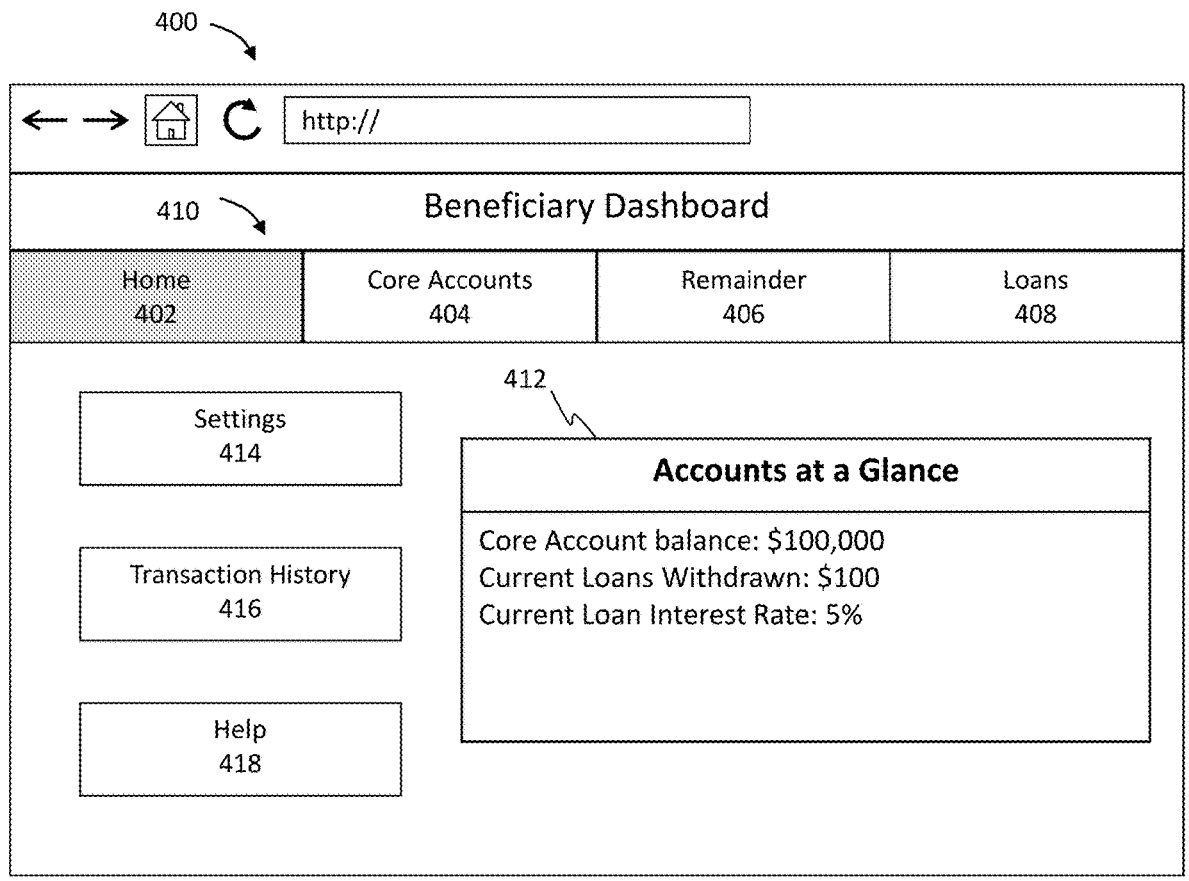
FIG. 4A is a screenshot of a graphic user interface according to an exemplary embodiment of the present invention.

Turning to FIG. 4A, a screenshot of a GUI for use with a system according to embodiments of the present invention described herein is illustrated, and generally designated 400. GUI 400 may comprise a number of graphic elements, e.g., text, numbers, shapes, tables, charts, widgets, fields and/or icons, to name a few.

As shown, GUI 400 may include a menu bar 410 that can allow a user to navigate through different portions of GUI 400. For example, menu bar 410 may include tabs 402, 404, 406, 408 which cause different portions of GUI 400 to display upon selection by a user, e.g., through clicking, key entry, touch (in the case of capacitive touchscreens), voice activation, and/or motion activation, to name a few.

Tab 402 may correspond to a home display portion of GUI 400, for example, a control panel or dashboard. Various information relating to a user's accounts, transactions, and pertinent information with regard to a system can be presented, for example, a table 412 as shown. Table 412 may be preconfigured by a system or a user to display specific information, such as account balances, outstanding loan amounts, and current interest rates, to name a few.

The home display portion of GUI 400 may also include sub-menus for navigation to further specific portions of GUI 400 when selected by a user. In the exemplary embodiment shown, the home display portion of GUI 400 includes a button 414 for navigation to a system settings portion of GUI 400, a button 416 for navigation to an account history portion of GUI 400, and a button 418 for navigation to a help portion of GUI 400.

Figure 4B:
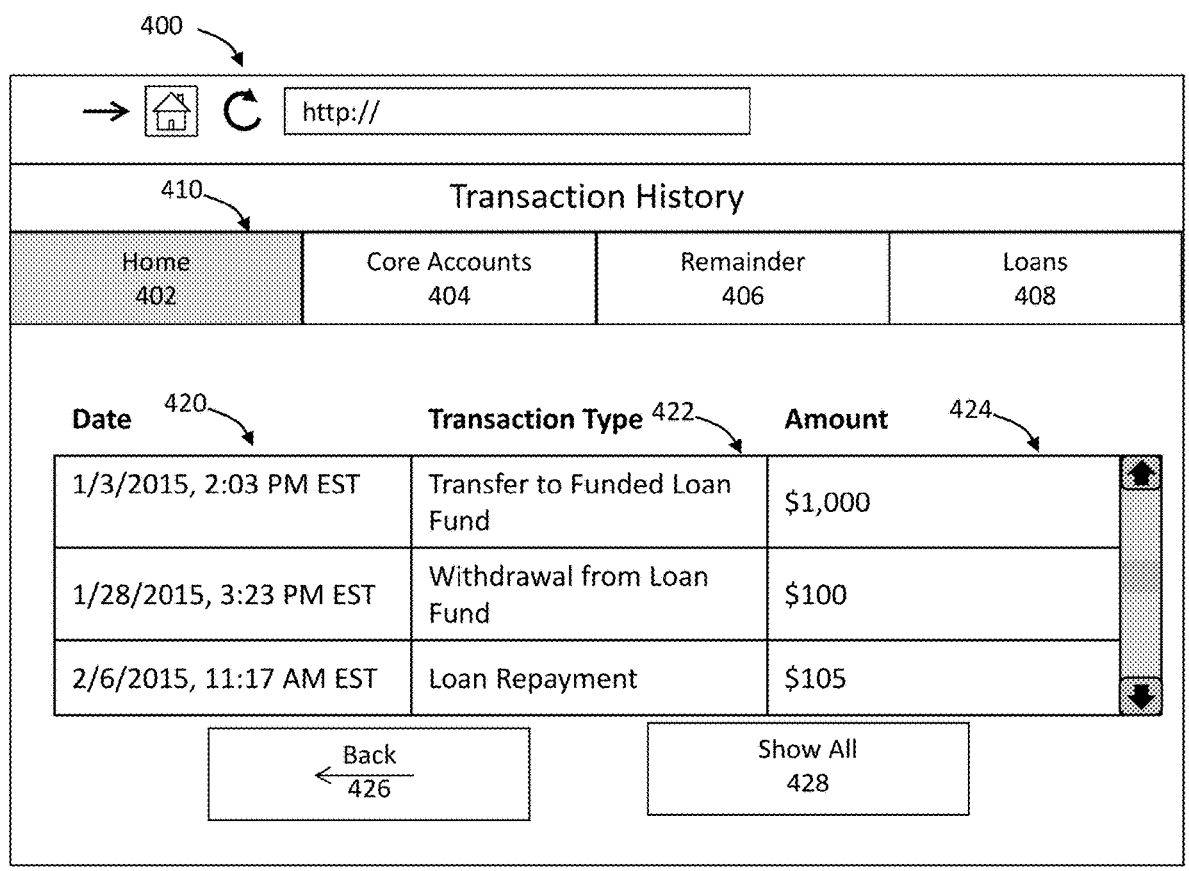
FIG. 4B is a screenshot of a graphic user interface according to another exemplary embodiment of the present invention.

Referring to FIG. 4B, selection of button 416 (FIG. 4A) on the home display portion of GUI 400 may navigate a user to a transactions history portion of GUI 400. As shown, the transactions history portion of GUI 400 may include tabulated data associated with a user's past actions on the system. For example, a data column 420 may list dates and times that past actions were taken on the system, a transaction type data column 422 may provide a brief description of a past action that was taken on the system, and a transaction amount data column 424 may provide data indicating a monetary amount associated with a past action taken on the system. As shown, a back button 426 may be provided for navigation to the previous portion of GUI 400, and a expansion button 428 may cause the display of additional tabulated information related to past actions taken on the system.

Figure 4C:
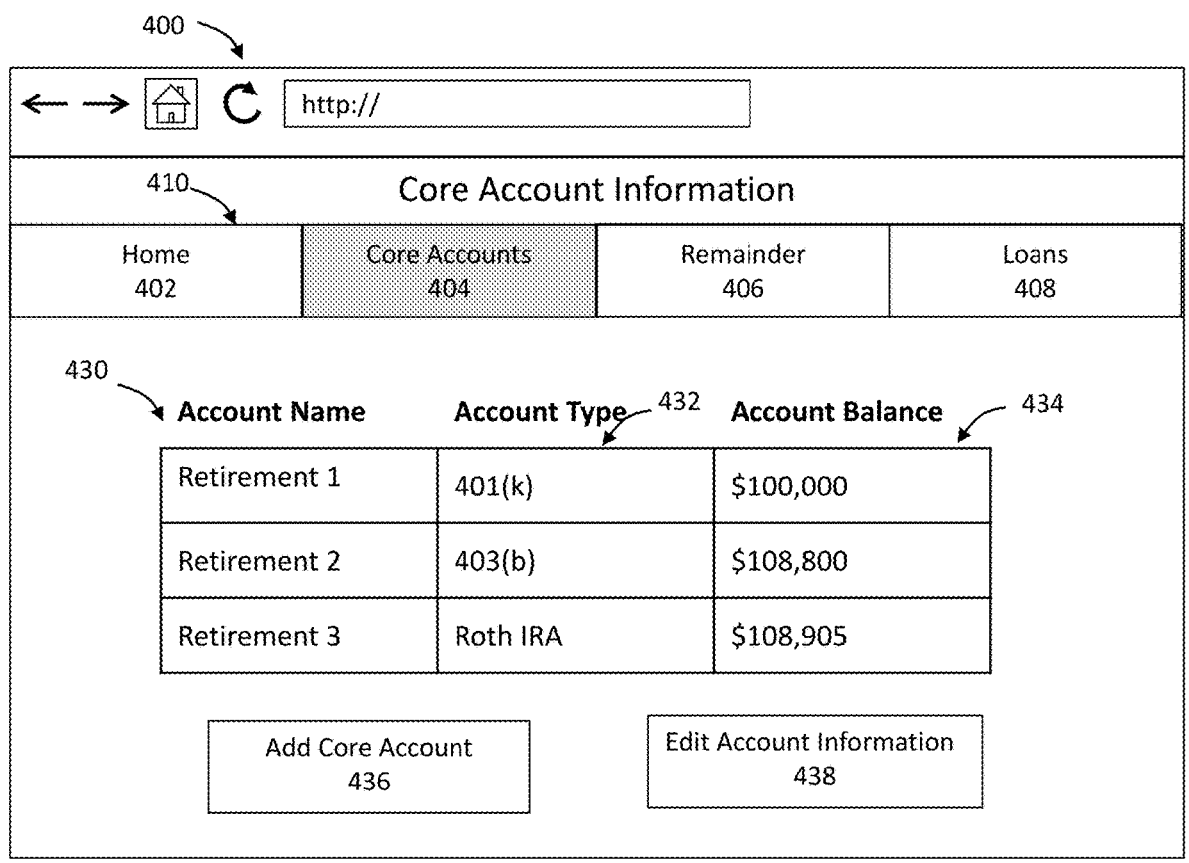
FIG. 4C is a screenshot of a graphic user interface according to another exemplary embodiment of the present invention.

Turning to FIG. 4C, selection of the core accounts tab 404 by a user may cause a core accounts portion of GUI 400 to be displayed. The core accounts portion of GUI 400 displays information relating to a user's core accounts, for example, account type and account assets. As shown, the core accounts portion of GUI 400 may present such information in tabulated form, and can include an account name data column 430 for displaying names or labels assigned to an account by a user, an account type data column 432 indicating the nature of particular accounts, and an account balance data column 436 listing the monetary amounts associated with a user's various accounts. An add core account button 436 can be provided to prompt a user to add a new core account, and an edit account button 438 can be provided to allow a user to change descriptive information associated with one or more core accounts.

Figure 4D:
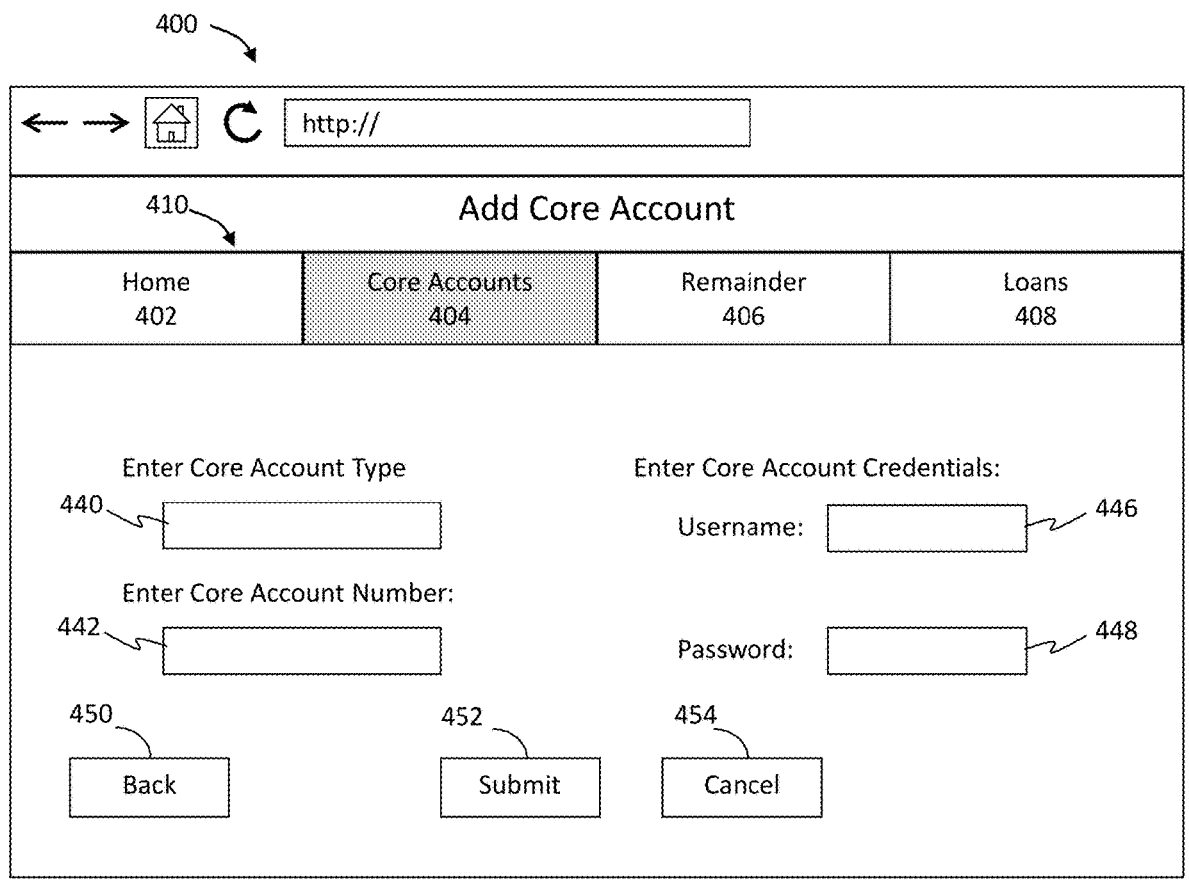
FIG. 4D is a screenshot of a graphic user interface according to another exemplary embodiment of the present invention.

Referring additionally to FIG. 4D, selection of the add core account button 436 by a user may cause a portion of GUI 400 to be displayed that allows the user to input information relating to a retirement account. As shown, a core account type field 440 may be provided so that a user may enter text and/or numbers describing an account (e.g., 401(k), 403(b), or Roth IRA, to name a few) and a core account number field 442 may be provided so that a user can enter an account number associated with a retirement account. Additional fields may be provided if further credentials or information are needed to access a retirement account, for example, a username field 446 may be provided so that a user can enter a username associated with a retirement account, and a password field 448 can be provided so that a user can enter a password corresponding to the username and/or to the account.

Buttons may be provided to allow a user to take additional actions, for example, a back button 450 to return to a previous portion of GUI 400, a submit button 452 to submit the currently-displayed account information to the systems for processing, and a cancel button 454 to discard the account creation currently in progress.

Figure 4E:
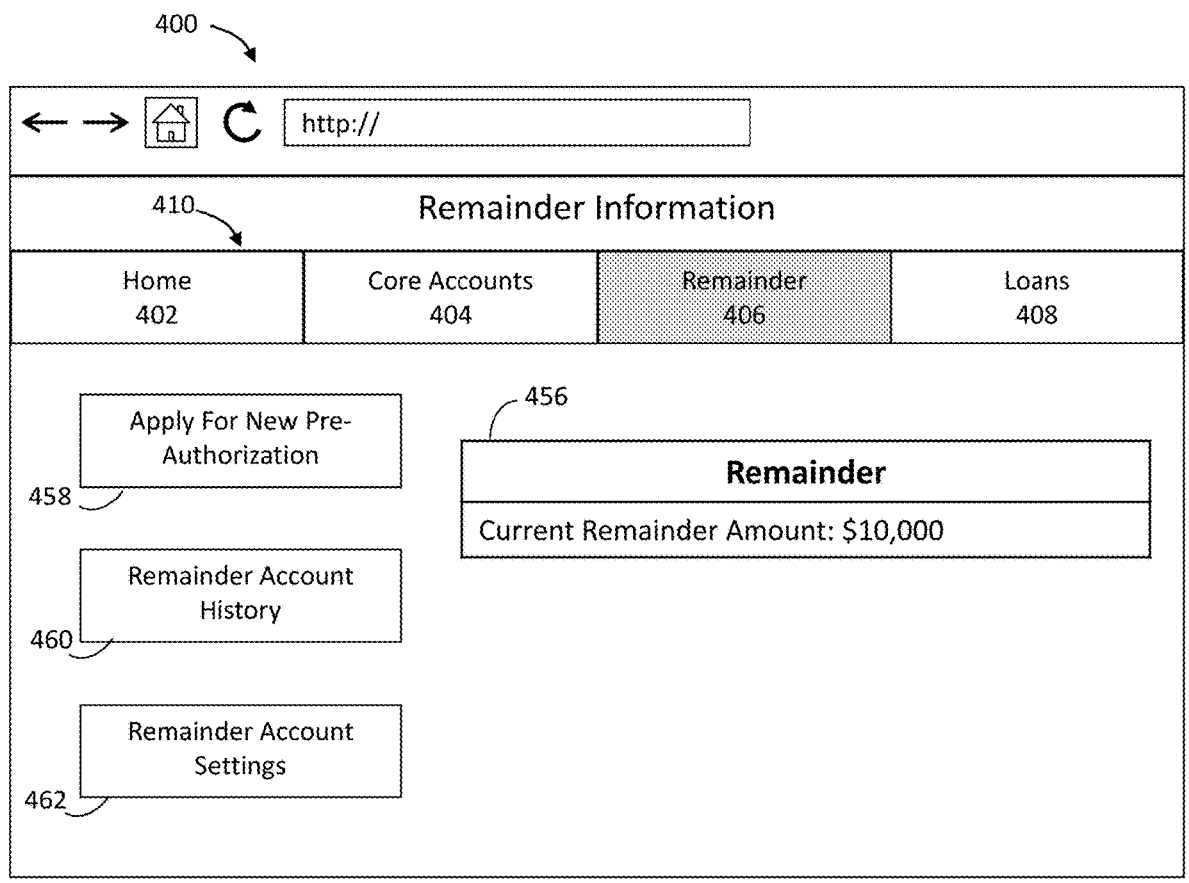
FIG. 4E is a screenshot of a graphic user interface according to another exemplary embodiment of the present invention.

Referring to FIG. 4E, selection of remainder tab 406 by a user may cause navigation to a remainder portion of GUI 400. The remainder portion of GUI 400 may provide status information associated with a remainder, e.g., pre-authorized loan amount, associated with one or more of a user's core accounts. Accordingly, the remainder portion of GUI 400 may include a display field 456 that provides a current amount of a remainder associated with one or more of a user's core accounts. Buttons may be provided for selection by a user to take further actions relating to a remainder of one or more core accounts, for example, an apply for new pre-authorization button 458, a remainder account history button 460, and a remainder account settings button 462.

Figure 4F:
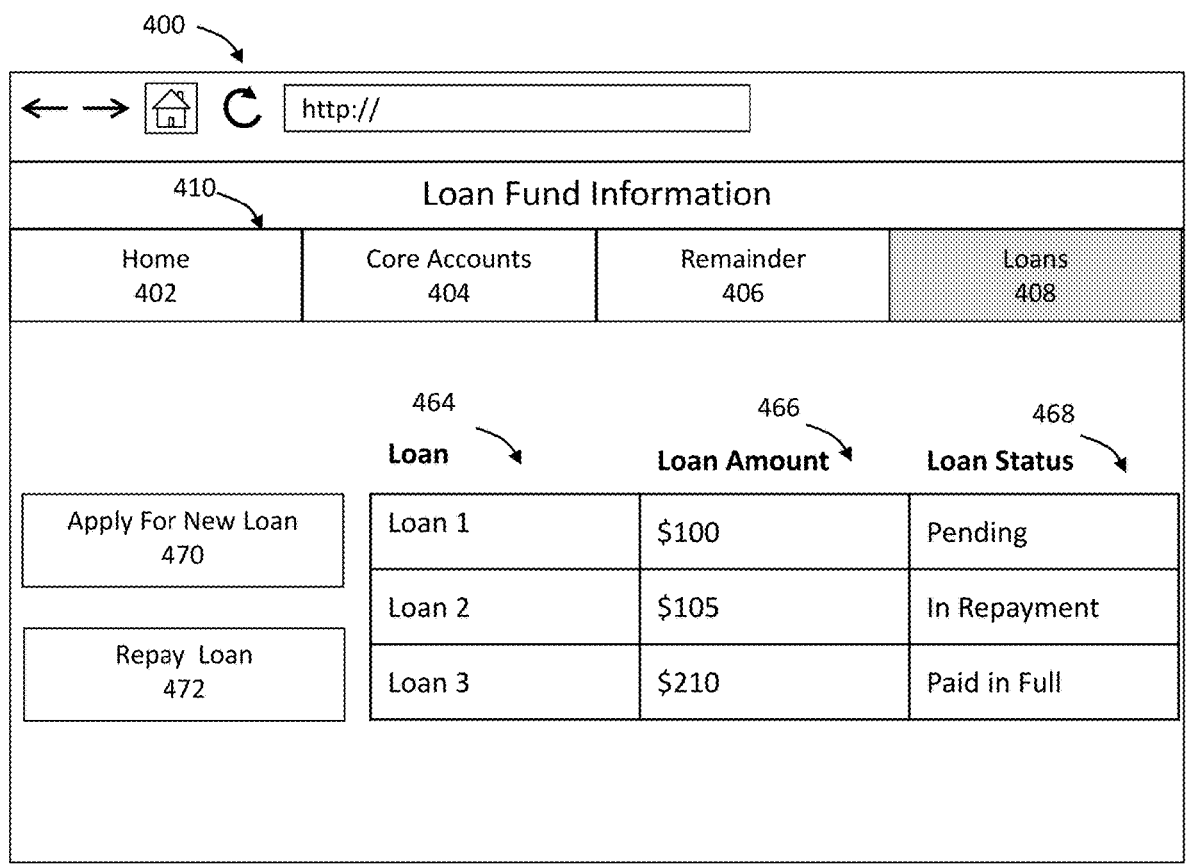
FIG. 4F is a screenshot of a graphic user interface according to another exemplary embodiment of the present invention.

Referring to FIG. 4F, selection of loan tab 408 by a user may cause navigation to a loan portion of GUI 400. Loan portion of GUI 400 may provide information on one or more loans taken with respect to one or more core accounts. Accordingly, the loan portion of GUI 400 may include tabulated information related to one or more loans, for example, a loan name data column 464, a loan amount data column 466, and a loan status data column 468. The loan portion of GUI 400 may include additional buttons for selection by a user to take further actions with respect to loans. As shown, loan portion of GUI 400 may include a new loan application button 470 and a loan repayment button 472.

Figure 4G:
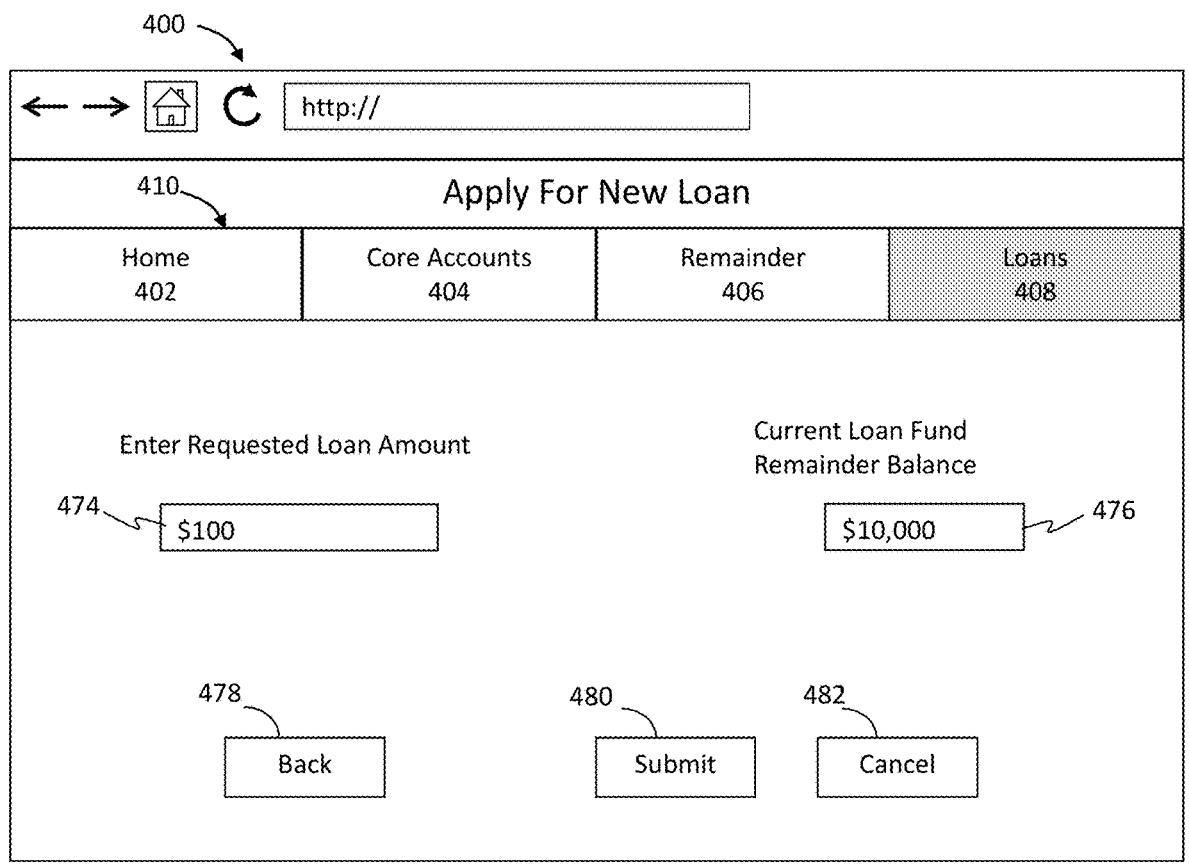
FIG. 4G is a screenshot of a graphic user interface according to another exemplary embodiment of the present invention.

Referring additionally to FIG. 4G, selection of new loan application button 470 may cause navigation to a portion of GUI 400 that allows a user to input information pertaining to a new loan request. As shown, a field 474 may be provided to allow a user to input a monetary amount of a new loan request, and display field 476 may be provided to allow a user to view a current balance of funds available in a loan fund account. Buttons may be provided to allow a user to take additional actions, for example, a back button 478 to return to a previous portion of GUI 400, a submit button 480 to submit the currently-displayed loan request details for processing, and a cancel button 482 to discard the loan request currently in progress.

Figure 4H:
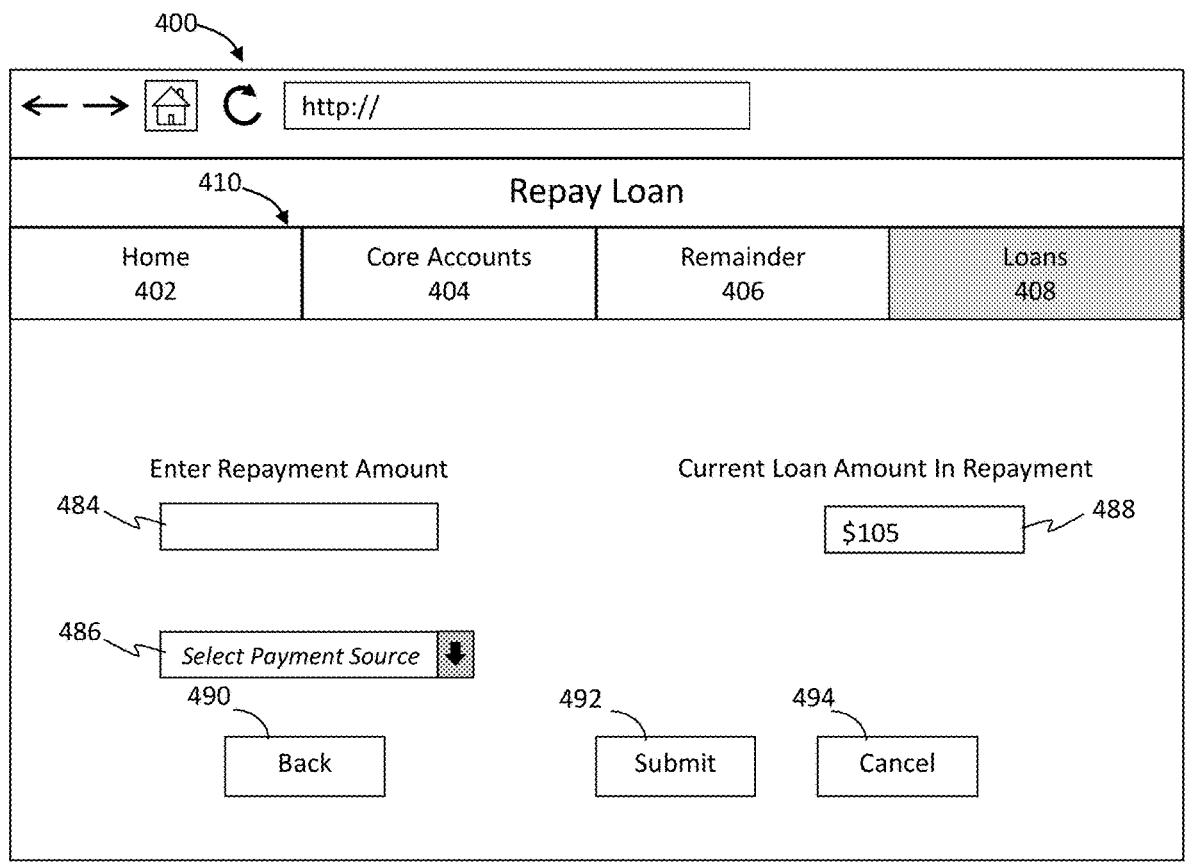
FIG. 4H is a screenshot of a graphic user interface according to another exemplary embodiment of the present invention.

Still referring to FIG. 4F, and referring additionally to FIG. 4H, selection of repay loan button 480 on the loan portion of GUI 400 may cause navigation to a loan repayment portion of GUI 400. As shown, the loan repayment portion of GUI 400 can allow a user to take actions with respect to one or more outstanding loans against one or more core accounts. A repayment amount field 484 may be provided for a user to enter a monetary amount to be repaid with respect to a given loan, up to the full amount of the loan. A payment source menu 486, e.g., a drop down menu, may be provided for a user to select a payment method for a loan repayment, e.g., a bank account or credit card. Such payment methods may be pre-populated by a user, e.g., through a home portion of GUI 400. A current loan balance field 488 may also be provided so that a user can view the current amount owed on a particular loan. Buttons may be provided to allow a user to take additional actions, for example, a back button 490 to return to a previous portion of GUI 400, a submit button 492 to submit the currently-displayed loan repayment details for processing, and a cancel button 494 to discard the loan request currently in progress.

It will be understood that information displayed across various exemplary embodiments of GUIs described herein may be displayed in the form of text and/or graphical representations.

Such displayed information may be manipulated to a desired configuration by a user, for example, through scaling (such as minimization and maximization), highlighting, and/or rearrangement, to name a few.

Figure 5A:
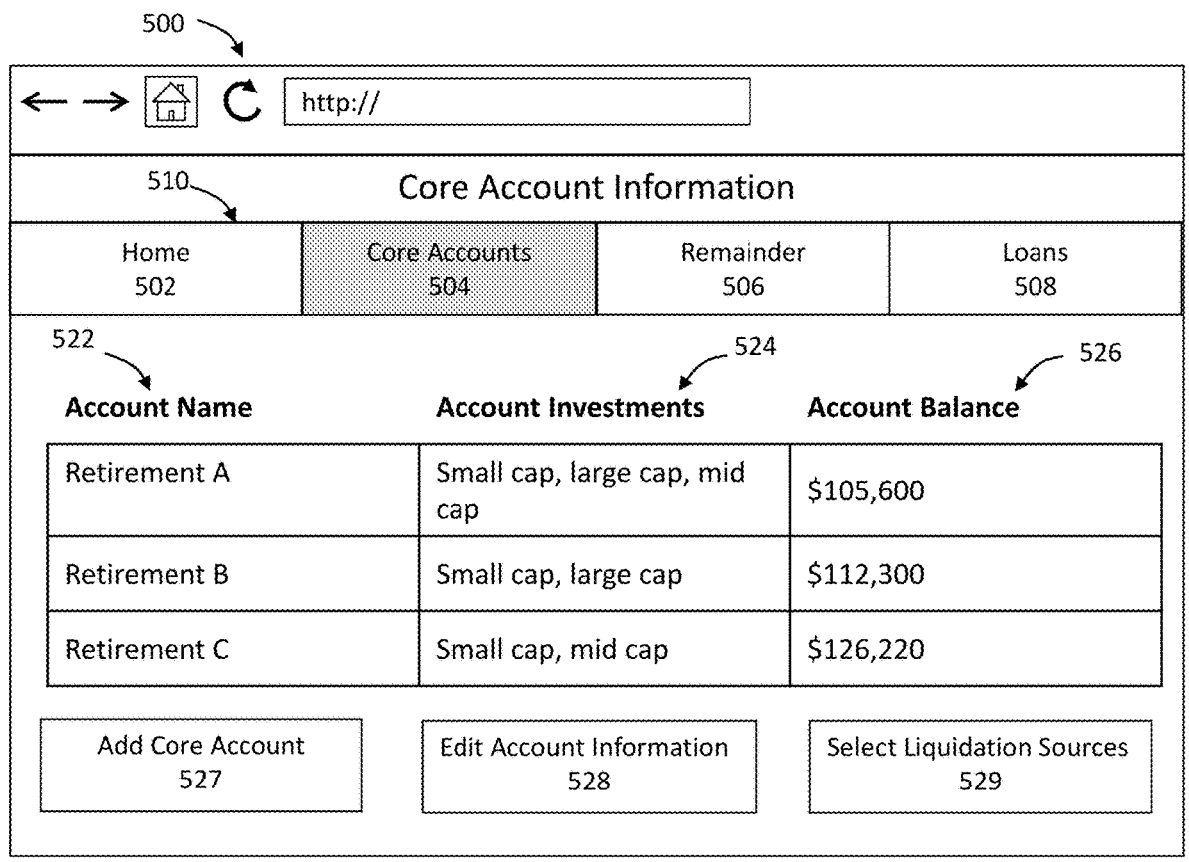

Referring to FIG. 5A, in embodiments the one or more computers (120 in FIG. 1B) may be further configured to provide an electronic interface generator (144 in FIG. 1B) for providing an electronic interface 500 e.g., a GUI, as shown, accessible over the one or more networks (305 in FIG. 3 via the network communications module 122). Electronic interface 500 may comprise a number of graphic elements, e.g., text, numbers, shapes, tables, charts, widgets, fields and/or icons, to name a few. In embodiments, the electronic interface may be configured to allow the client to designate which one or more investments in the benefit plan core account may be used to make lump sum loans and/or to fund and replenish a loan account. Accordingly, in embodiments, the electronic interface generator may be configured to provide one or more investment designation fields for receiving a designation of one or more investments to be liquidated in part in the core account to fund a lump sum loan and/or to fund and replenish a funded loan fund account.

In embodiments, electronic interface 500 may include a menu bar 510 that can allow a user to navigate through different portions of electronic interface 500. For example, menu bar 510 could include tabs 502, 504, 506, 508 which cause different portions of electronic interface 500 to display upon selection by a user.

Still referring to FIG. 5A, in embodiments, selection of the core accounts tab 504 by a user may cause a core accounts portion of electronic interface 500 to be displayed. The core accounts portion of electronic interface 500 provides an interface through which a user can view and/or input information relating to one or more of his or her core accounts. As shown, the core accounts portion of electronic interface 500 may present such information in tabulated form, and can include an account name data column 522 for displaying names or labels assigned to an account by a user, an account type data column 524 indicating the types of investments associated with particular accounts (e.g., large market capitalization, mid-size market capitalization, and/or small market capitalization, to name a few), and an account balance data column 526 listing the monetary amounts associated with a user's various accounts. An add core account button 527 can be provided to allow a user to add a new core account, and an edit account button 528 can be provided to allow a user to change descriptive information associated with one or more core accounts. A liquidation settings button 529 may also be provided, for example, to allow the client to designate which one or more investments in one or more benefit plan core accounts may be used to make lump sum loans and/or to fund and replenish a loan account.

Figure 5B:
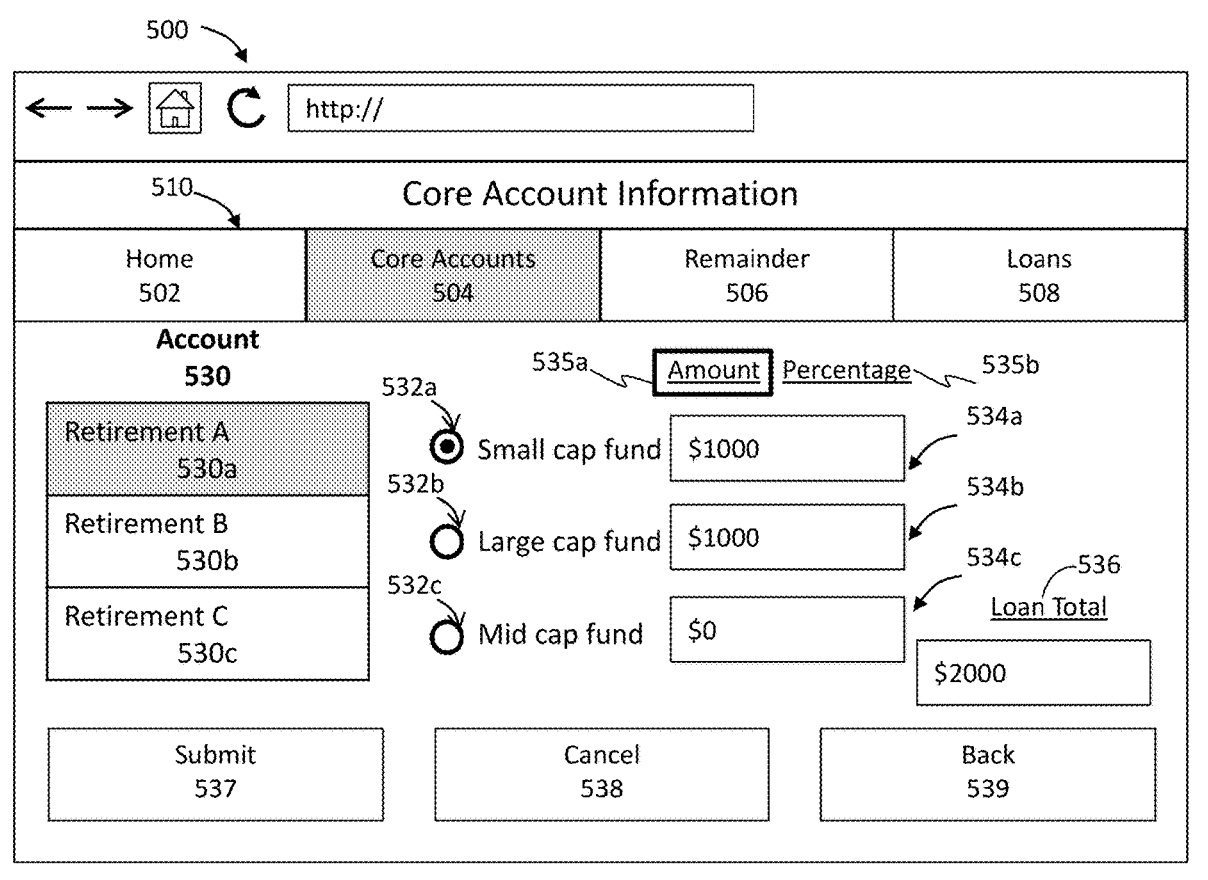

Turning to FIG. 5B, upon selection of the liquidation settings button 529 (FIG. 5A), the user selects one of his or her core accounts displayed in viewing fields 530a, 530b, 530c of an accounts list 530 from which to take funds. Then the user may be prompted to enter relevant information pertaining to specific investments to be liquidated to fund a lump sum loan and/or to fund and replenish a funded loan fund account. In embodiments, the user may designate one or more of the core accounts as investment sources by selecting from investment designation fields 532a, 532b, 532c, which may be radio buttons, as shown.

In embodiments, the electronic interface generator (144 in FIG. 1B) may be further configured to provide fields 534a, 534b, 534c, each associated with a respective investment designation field for designating a monetary amount or a loan fund percentage to be funded by the investment designated in the respective investment designation field from that core account, e.g., the Retirement A core account in FIG. 5B. Selector tabs 535a and 535b may be provided so that a user can toggle between amount-based entries or percentage-based entries.

Accordingly, in embodiments, this designation of a particular investment, and/or a percentage or monetary amount may be provided when making a lump sum loan, or when first establishing the loan account, and in embodiments, may be updated for specific loans. In embodiments, multiple funded loan fund accounts may be set up, with each different loan fund account designating a different investment or set of investments to fulfill lump sum loans and to funds and replenish loan funds. In embodiments, the funded loan fund accounts may be associated with the same core account, or may be associated with different core accounts.

Still referring to FIG. 5B, in the exemplary embodiment shown, a user has designated core account 530a as the fund source via the button 532a, and has designated $1000 to be taken from a small cap growth core investment, and $1000 to be taken from a large cap value core investment, to provide $2000 of funding for a loan line for a given one of the funded loan fund accounts as shown in field 536.

Figure 5C:
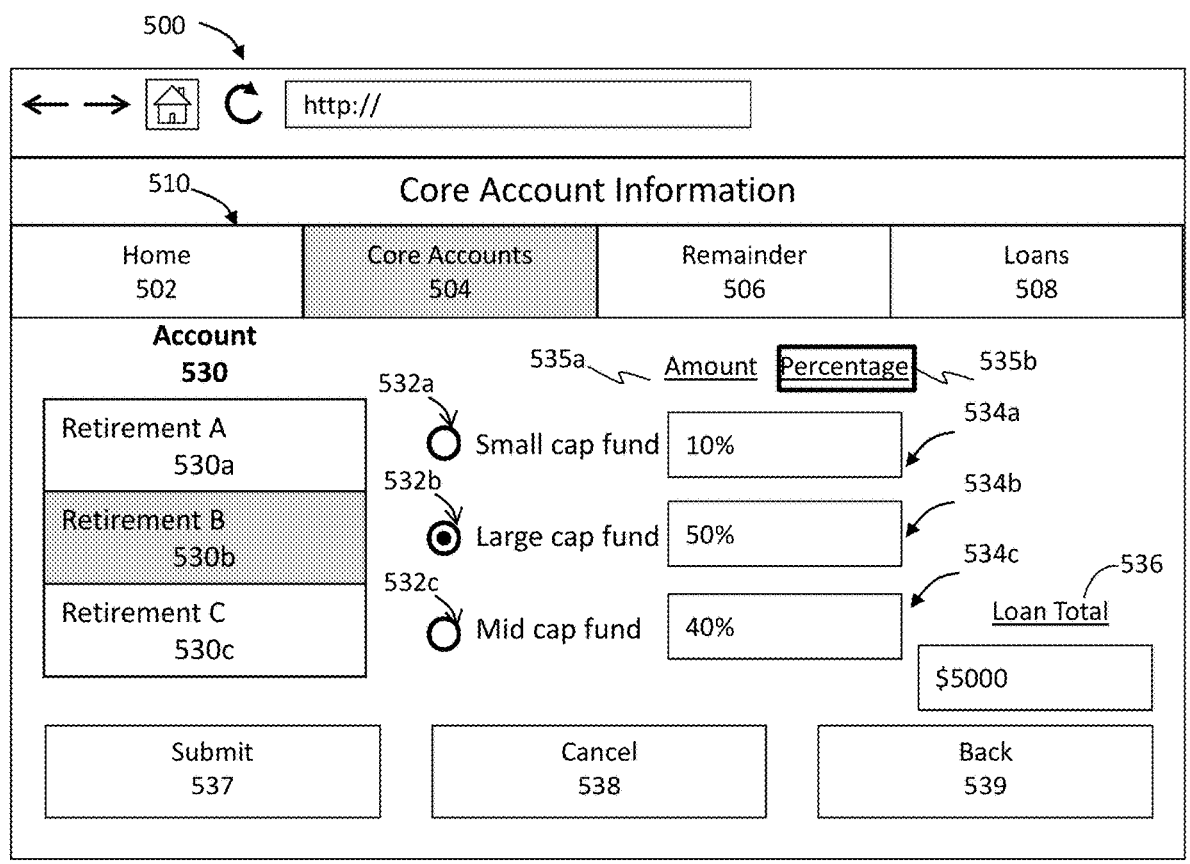

Turning to FIG. 5C, an exemplary embodiment of electronic interface 500 is shown in which a user has designated core account 530*b* as the fund source via the button 532*b*. The user has further selected tab 535*b* so that percentage-based entries for investment sources may be made to fund a lump sum loan and/or to fund and to replenish a different funded loan fund account. Field 536 is provided so that a user can designate a total monetary amount to be funded using the specific percentages to be entered in fields 534*a*, 534*b*, 534*c*. In the exemplary embodiment shown, a user could designate in the electronic interface 500 that for a $5000 loan line for another of the funded loan fund accounts, 10% may be taken from a small cap core investment, 40% from a mid-cap core investment, and 50% from a large cap core investment of the Retirement B core account.

Accordingly, in embodiments to facilitate the above, the electronic interface generator may be configured to provide a GUI listing the different core investments in each account, e.g., 401K account, demand account, savings account, to name a few, of the beneficiary, and the total amount available to be borrowed/funded. In embodiments, the GUI may include a field adjacent to or otherwise associated with the respective listed investment for entering a monetary amount or a percentage of the loan to be taken from the respective investment. These adjacent or associated fields would allow the user to specify for each account the amount or the percentage that the user wants from the particular investments in the account. In embodiments, as a monetary amount is entered or as a percentage is entered in a given field for an investment, a remaining amount of the lump sum loan to be funded or a remaining amount of the loan fund still to be funded is reduced by the amount or percentage entered in the field.

In embodiments, to facilitate the process of payback, the electronic interface generator may be configured to provide a comparable GUI listing the different core investments in each account of the beneficiary, and the total amount that is to be paid back. Accordingly, in embodiments, the GUI may include a field adjacent to or otherwise associated with one or more of the respective investments in one or more of the accounts of the beneficiary for entering a monetary amount or a percentage of the payback amount to go to/purchase the respective investment. Thus, in embodiments these adjacent or associated fields would allow the user to specify for each account the amount or the percentage that the user wants to go back to/purchase the particular investment in the account. In embodiments, as a monetary amount is entered or as a percentage is entered in the given field for an investment, a remaining amount or percentage of the paid back funds is reduced by the amount or percentage entered in the field.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flow charts provided herein and the claims show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments disclosed herein to form further embodiments with this added element or step.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

Figure 6:
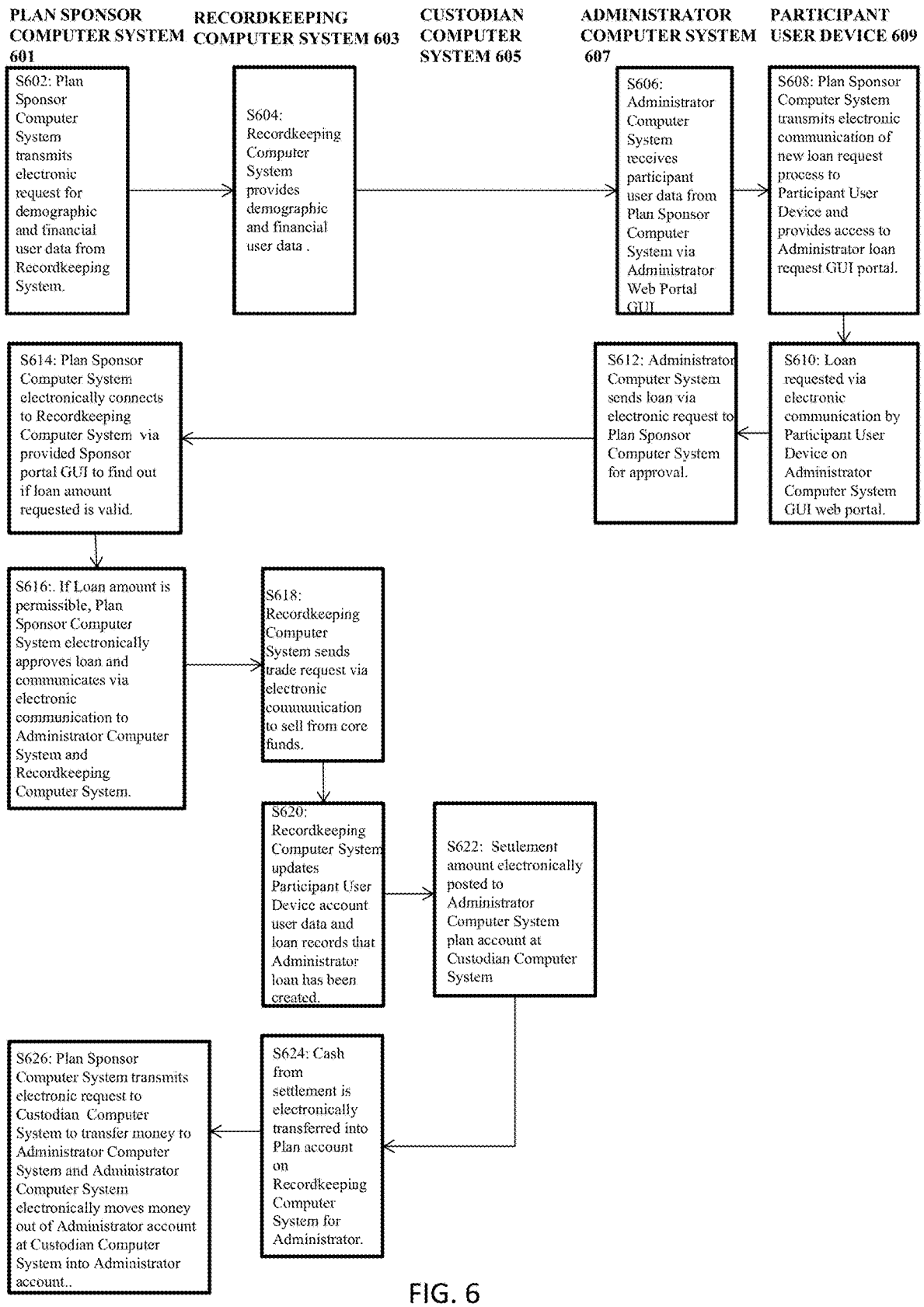
FIG. 6 is a flowchart of the loan creation method according to exemplary embodiments of the present invention.

As described in FIG. 6, the method consists of Step S602, the Plan Sponsor Computer System 601 requesting participant demographic and financial user data in a computer readable format from a Recordkeeping Computer System 603. Then in Step S604, the Plan Sponsor Computer System 601 obtains the financial file from Recordkeeping Computer System 603. Step S606 consists of the Plan Sponsor Computer System 601 uploading the financial file to the Administrator Computer System's 607 web portal. Step S608 consists of the Plan Sponsor Computer System 601 notifies the Participant User Device 609 of the new loan request process and provides access to Administrator Computer System 607 loan request portal. In Step 610, the Participant User Device 609 requests the loan on the web portal. Step 612 consists of the Plan Sponsor Computer System 601 receiving the loan request from the Administrator Computer System 607. In Step S614, the Plan Sponsor Computer System 601 contacts the Recordkeeping Computer System 603 to check the provided portal system to ascertain if requested loan amount is valid. Step S616 the Plan Sponsor Computer System 601 approves the loan if amount is permissible and communicates that to the Administrator Computer System 607 and Record Keeping Computer System 603. Step S618 consists of the Recordkeeping Computer System 603 sending the trade request to sell from core funds. Step S620 consists of the Recordkeeping Computer System 603. Step S622 consists of the settlement amount being posted to the Administrator Computer System 607 plan account at Custodian Computer System 605. Step S624 consists of placing the cash from the settlement into the plan account on the Recordkeeping Computer System 603 for Administrator Computer System 607. Step S626 consists of the Plan Sponsor Computer System 601 requesting the Custodian Computer System 605 transfer money to the Administrator Computer System 607 and the Administrator Computer System 607 moves money from the account at the Custodian Computer System 605 into Administrator Computer System 607 account. This method assumes that the Plan Sponsor Computer system will have already asked the Recordkeeping Computer System to set up Administrator loan fund on Recordkeeping Computer System and create same loan account at custodial level. An agreement needs to be established between Plan Sponsor Computer System and Custodian Computer System to transfer funds to Administrator bank.

Figure 7:
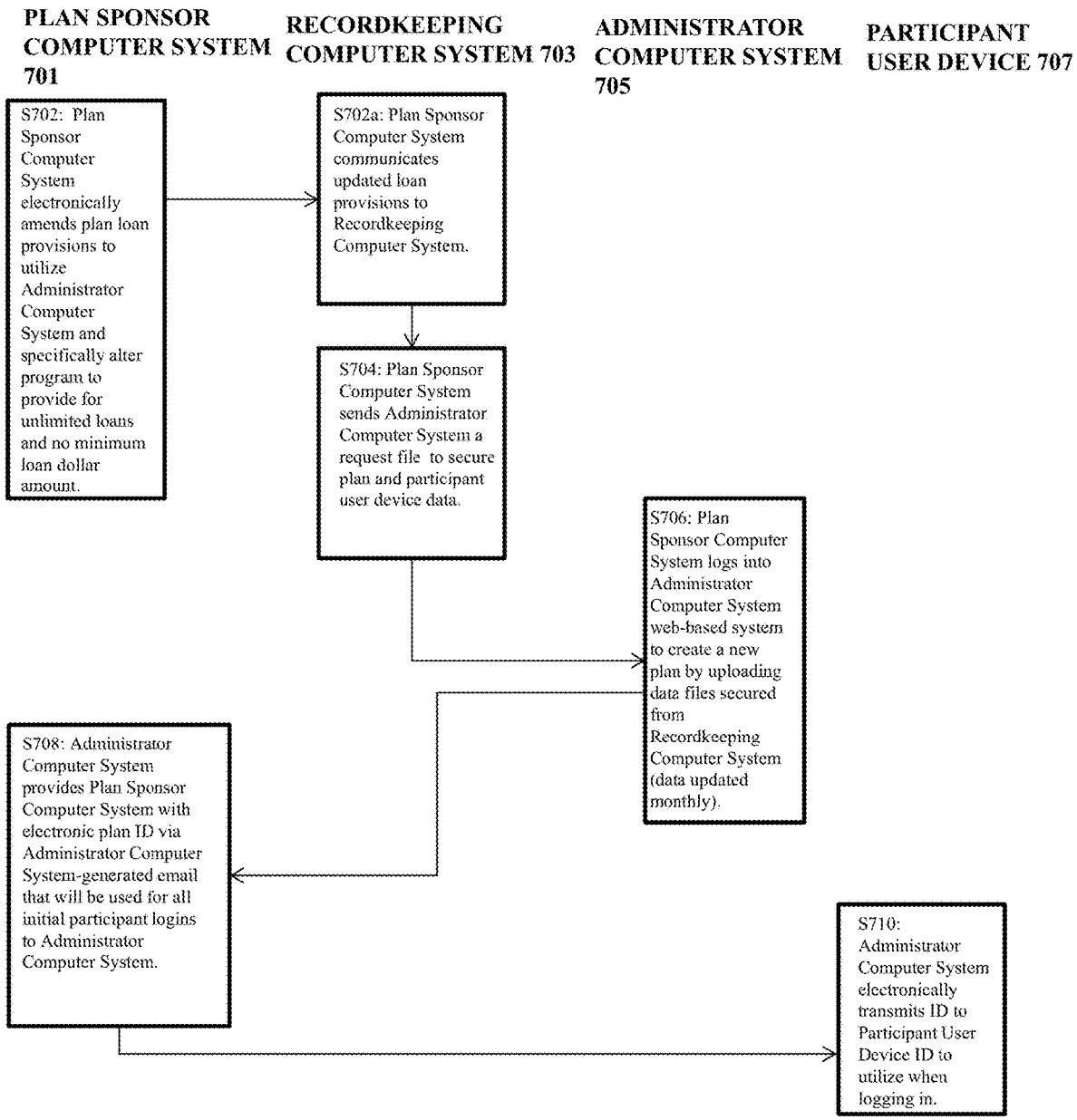
FIG. 7 is a flowchart of the initial plan setup according to exemplary embodiments of the present invention.

The initial plan setup is described in FIG. 7. The method consists of Step S702 in which the Plan Sponsor Computer System 701 electronically amends plan loan provisions to utilize Administrator Computer System 705 and specifically alter program to provide for unlimited loans and no minimum loan dollar amount. In Step S702*a* the Plan Sponsor Computer System 701 communicates updated loan provisions to Recordkeeping Computer System 703. In Step S704, the Plan Sponsor Computer System 701 sends Administrator Computer System 705 a request file to secure plan and participant user device data. In Step S706, the Plan Sponsor Computer System 701 logs into Administrator Computer System 705 web-based system to create a new plan by uploading data files secured from Recordkeeping Computer System 703 (data updated monthly). In Step S708, the Administrator Computer System 705 provides Plan Sponsor Computer System 701 with electronic plan ID via Administrator Computer System 705—generated email that will be used for all initial participant logins to Administrator Computer System 705. In Step S710, the Administrator Computer System 705 electronically transmits ID to Participant User Device 707 ID to utilize when logging in. This method assumes that request files will be either ASCII (fixed, variable, or CSV) or XML, format (depending on capability of Recordkeeping System) and will contain data fields that will be used to populate Administrator database with Plan and participant parameters. (Format to be defined). Data files secured from Recordkeeping Computer System 703 will contain plan and loan parameters and participant demographic data and financial account data. File formats to be determined but, ideally participant demographic information would include participant account balance at time of setup, vested percent of money by source, status/information about outstanding loans and loan balances as applicable, maximum allowable loan. Participants User Devices 707 need to be informed of this ID to utilize when they login to Administrator loan system as they will not be accessing their specific information on a Recordkeeping Computer System participant web portal and therefore need to access the plan they are enrolled in via the Administrator Computer System to begin the loan request process.

Figure 8:
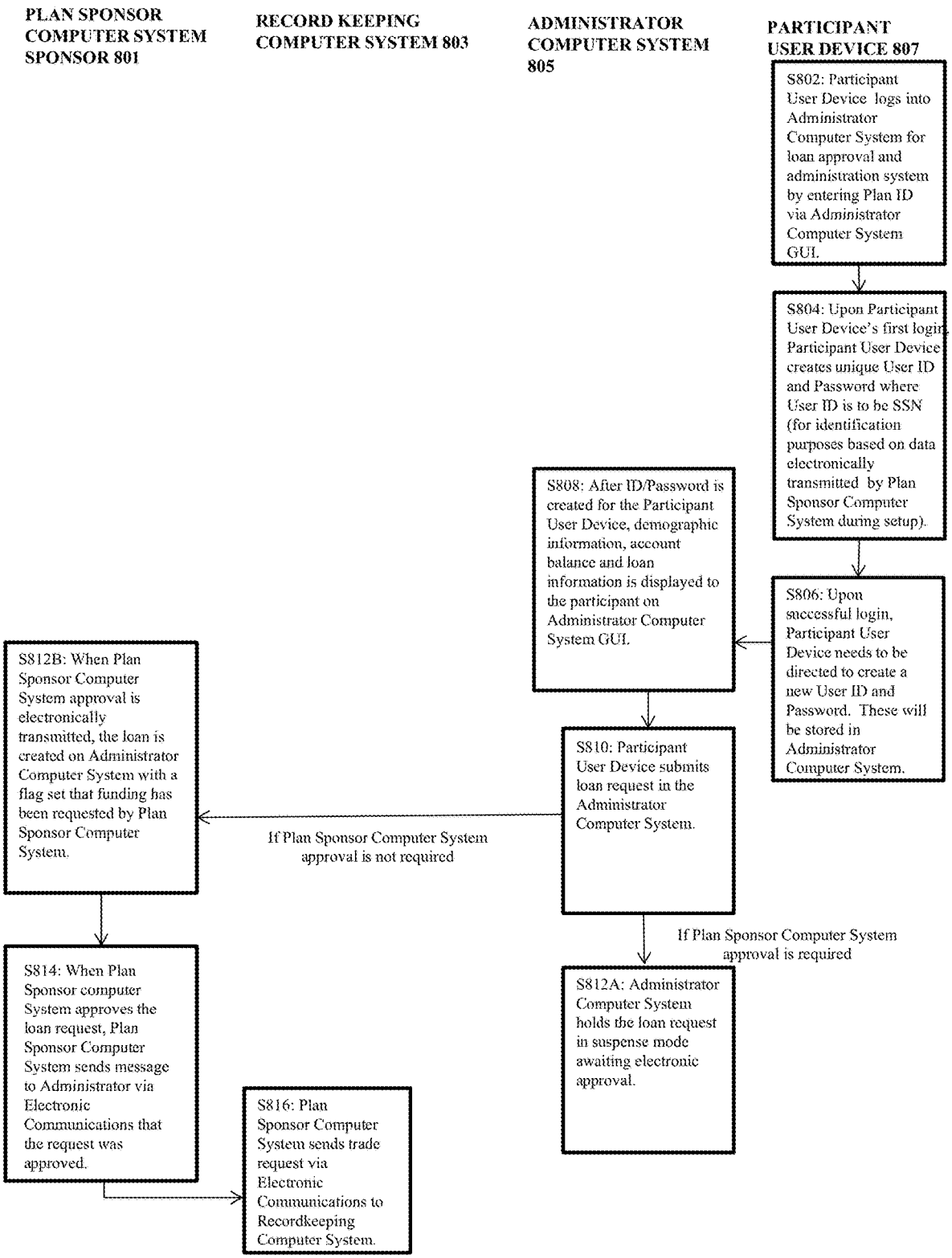
FIG. 8 is a flowchart of the participant request process according to exemplary embodiments of the present invention.

The participant request process is described in FIG. 8. The method consists of S802 in which the Participant User Device 807 logs into Administrator Computer System 805 for loan approval and administration system by entering Plan ID via Administrator Computer System 805 GUI. In Step S804 upon Participant User Device's 807 first login, Participant User Device 807 creates unique User ID and Password where User ID is to be SSN (for identification purposes based on data electronically transmitted by Plan Sponsor Computer System 801 during setup). In Step S806, upon successful login, Participant User Device 807 needs to be directed to create a new User ID and Password. These will be stored in Administrator Computer System 805. In Step S808 After ID/Password is created for the Participant User Device 807, demographic information, account balance and loan information is displayed to the participant on Administrator Computer System 805 GUI. In Step S810, Participant User Device 807 submits loan request in the Administrator Computer System 801. If Plan Sponsor Computer System 801 approval is required then the method goes to Step S812A, in which Administrator Computer System 805 holds the loan request in suspense mode awaiting electronic approval. If Plan Sponsor Computer System 801 approval is not required, then the method goes to Step S812B in which the Plan Sponsor Computer System 801 approval is electronically transmitted, the loan is created on Administrator Computer System 805 with a flag set that funding has been requested by Plan Sponsor Computer System 801. In Step S814, when Plan Sponsor Computer System 801 approves the loan request, Plan Sponsor Computer System 801 sends message to Administrator Computer System 805 via Electronic Communications that the request was approved. In Step S816, the Plan Sponsor Computer System 801 sends trade request via Electronic Communications to Recordkeeping Computer System 803. Participants User Devices should be allowed to edit this information (possibly offered a suggestion to do so) based on updated information they may have secured from the retirement plan participant website.

Figure 9:
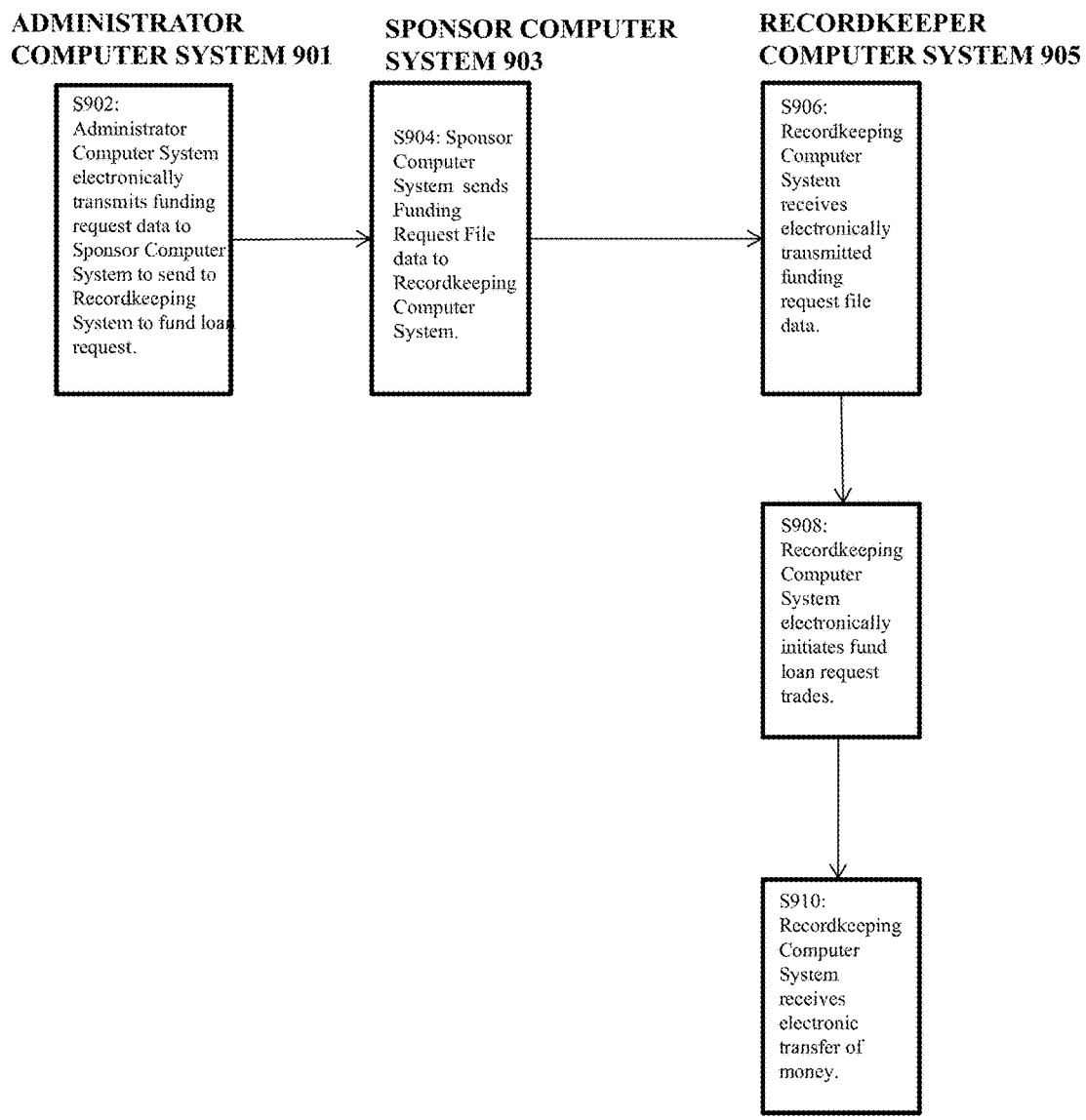
FIG. 9 is a flowchart of the funding loan request according to exemplary embodiments of the present invention.

The funding loan request process is described in FIG. 9. The method consists of Step S902 in which Administrator Computer System electronically transmits funding request data to Sponsor Computer System 903 to send to Recordkeeping Computer System 905 to fund loan request. In Step S904, the Sponsor Computer System 903 sends Funding Request File data to Recordkeeping Computer System 905. In Step S906, Recordkeeping Computer System 905 receives electronically transmitted funding request file data. In Step S908, the Recordkeeping Computer System 905 electronically initiates fund loan request trades. In Step S910, the Recordkeeping Computer System 905 receives electronic transfer of money. The funding request file contains Plan ID, Participant ID, Transaction Type (initial loan), Buy/Sell indicator, Funding Instructions, Dollar ($) amount of request. The process above needs to be repeated as loan payments are processed to ensure balance on Recordkeeping Computer System 905 is correct.

Figure 10:
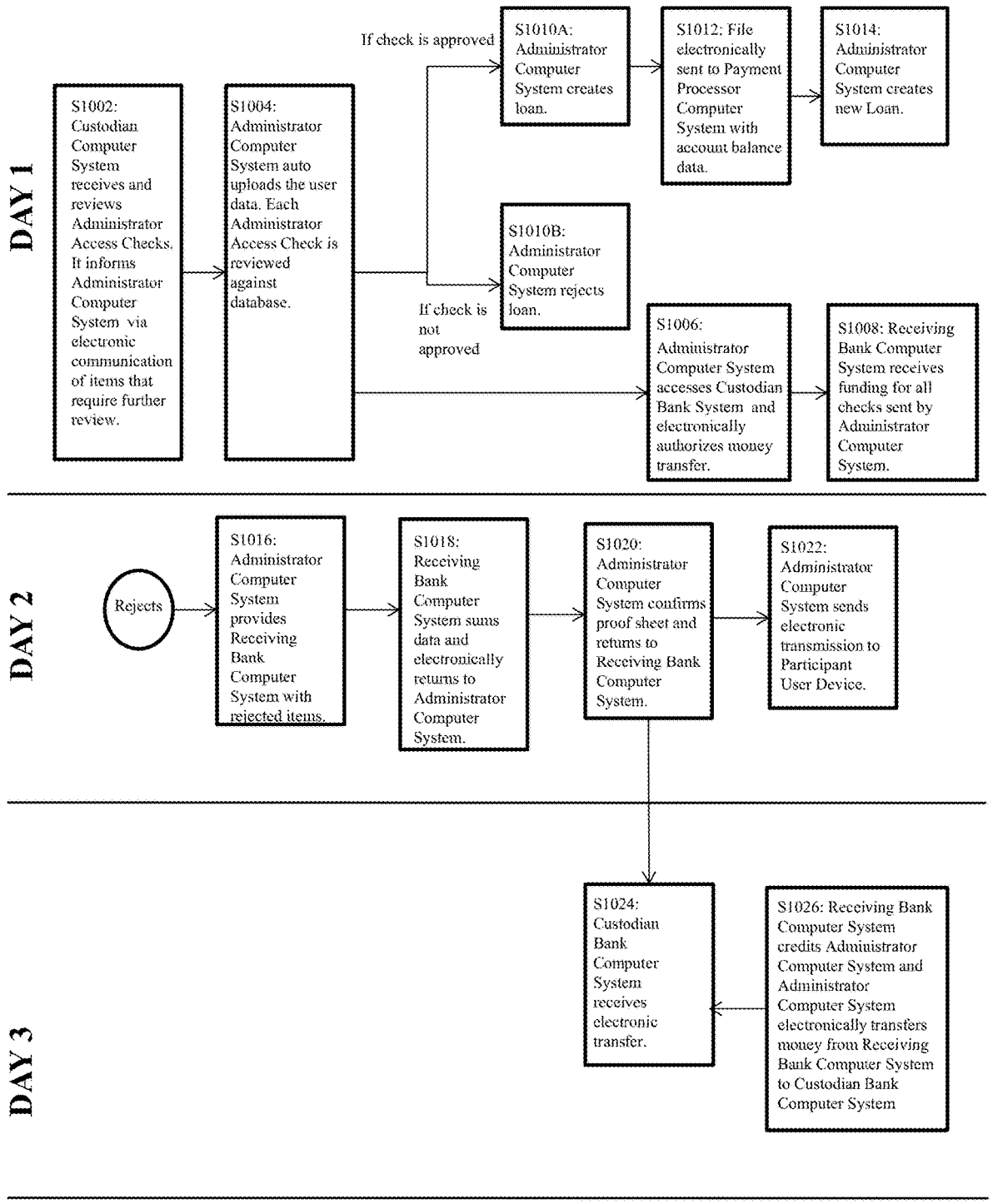
FIG. 10 is a flowchart of the administrator check settlement process according to exemplary embodiments of the present invention.

The administrator check settlement process is described in FIG. 10, which is prior art. The method consists of, on Day 1, Step S1002, in which Custodian Computer System receives and reviews Administrator Access Checks. It informs Administrator Computer System via electronic communication of items that require further review. In Step S1004 the Administrator Computer System automatically uploads the user data. Each Administrator Access Check is reviewed against database. If the check is not approved, in Step S1010B the Administrator Computer System rejects the loan. If it is approved, then in Step S1010A, the Administrator Computer System creates loan. In Step S1012 a file is electronically sent to Payment Processor Computer System with account balance data. In Step S1014, the Administrator Computer System creates new loan. Also after Step S1004 is Step S1006, in which the Administrator Computer System accesses Custodian Bank System and electronically authorizes money transfer. In Step S1008, the Receiving Bank Computer System receives funding for all checks sent by Administrator Computer System. On Day 2, any rejected loans continue to Step S1016, in which the Administrator Computer System provides Receiving Bank Computer System with rejected items. Then in Step S1018, the Receiving Bank Computer System sums data and electronically returns to Administrator Computer System. In Step S1020, Administrator Computer System confirms proof sheet and returns to Receiving Bank Computer System. In Step S1022, the Administrator Computer System sends electronic transmission to Participant User Device. On Day 3, in Step S1024 which follows both Steps S1020 and S1026, the Custodian Bank Computer System receives electronic transfer. In Step S1026, the Receiving Bank Computer System credits Administrator Computer System and Administrator Computer System electronically transfers money from Receiving Bank Computer System to Custodian Bank Computer System.

Figure 11:
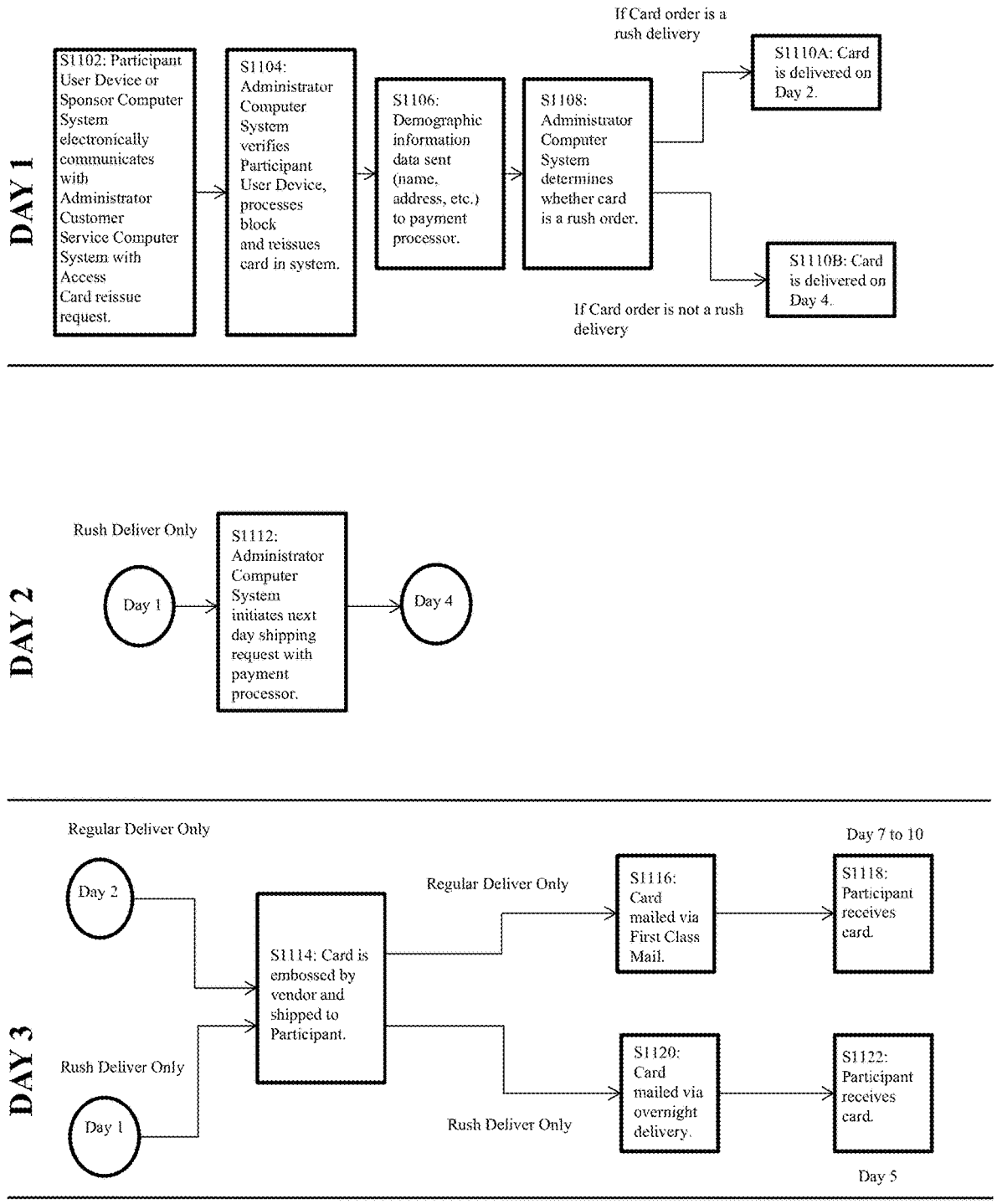
FIG. 11 is a flowchart of the administrator participant initiated card reissue according to exemplary embodiments of the present invention.

The administrator participant initiated card reissue is described in FIG. 11. The card is linked to the Administrator Account. In Step S1102, the Participant User Device or Sponsor Computer System electronically communicates with Administrator Customer Service Computer System with Access Card reissue request. In Step S1104, the Administrator Computer System verifies Participant User Device, processes block and reissues card in system. In Step S1106, the Demographic information data sent (name, address, etc.) to payment processor. In Step S1108, the Administrator Computer System determines whether card is a rush order. Then, if the card order is a rush delivery, it goes to Step 1110A, and is delivered on Day 2. If it is not a rush delivery, it goes to Step S1110B and is delivered on Day 4. On Day 2, if it is a rush delivery, Step S1112 consists of the Administrator Computer System initiating next day shipping request with payment processor. On Day 3, Step S1114 consists of the Card being embossed by the vendor and shipped to the Participant User Device. For a regular delivery, the method goes to Step S1116, in which the card is mailed via first class mail. Then in Step S1118, the Participant receives the card. If the card is set for rush delivery, after Step S1114, the method goes to Step S1120, in which the card mailed via overnight delivery and then in Step S1122, the participant receives the card.

Figure 12:
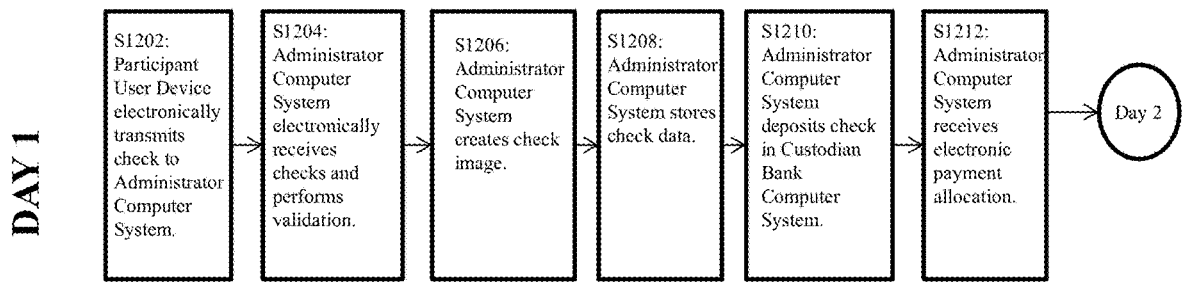
FIG. 12 is a flowchart of the administrator check repayment according to exemplary embodiments of the present invention.
Figure 12:
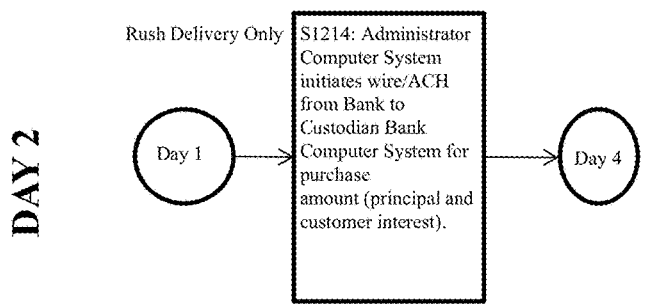
Figure 12:
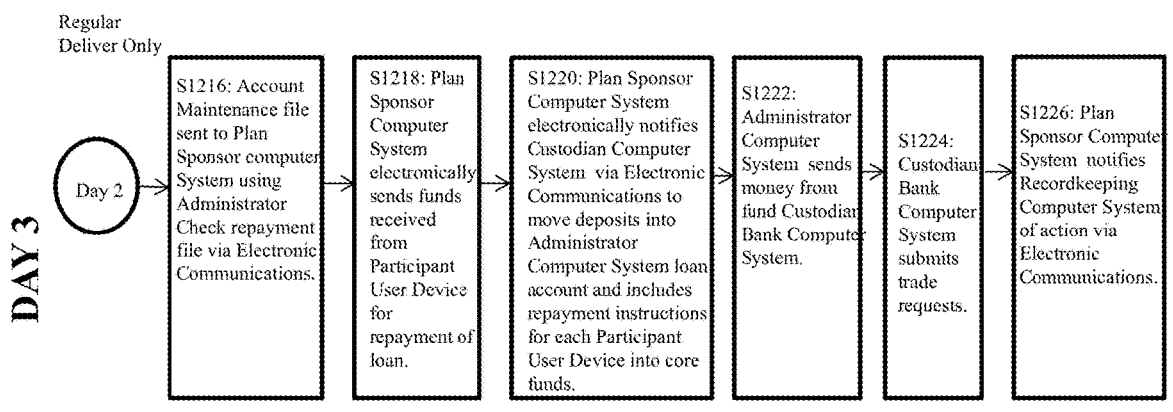

The administrator check repayment method is shown on FIG. 12. In Step S1202, the Participant User Device electronically transmits check to Administrator Computer System. In Step S1204, the Administrator Computer System electronically receives checks and performs validation. In Step S1206, the Administrator Computer System creates check image. In Step S1208, the Administrator Computer System stores check data. In Step S1210, the Administrator Computer System deposits check in Custodian Bank Computer System. In Step S1212, the Administrator Computer System receives electronic payment allocation. On Day 2, if there is a rush delivery, Step S1214 consists of the Administrator Computer System initiating a wire/ACH from Bank to Custodian Bank Computer System for purchase amount (principal and customer interest). If there is a regular delivery, on Day 3, Step S1216 consists of the Account Maintenance file being sent to Plan Sponsor computer System using Administrator Check repayment file via Electronic Communications. In Step S1218, the Plan Sponsor Computer System electronically sends funds received from Participant User Device for repayment of loan. In Step 1220, the Plan Sponsor Computer System electronically notifies Custodian Computer System via Electronic Communications to move deposits into Administrator Computer System loan account and includes repayment instructions for each Participant User Device into core funds. In Step S1222, the Administrator Computer System sends money from fund Custodian Bank Computer System. In Step S1224, the Custodian Bank Computer System submits trade requests. In Step S1226, the Plan Sponsor Computer System notifies Recordkeeping Computer System of action via Electronic Communications.

Figure 13:
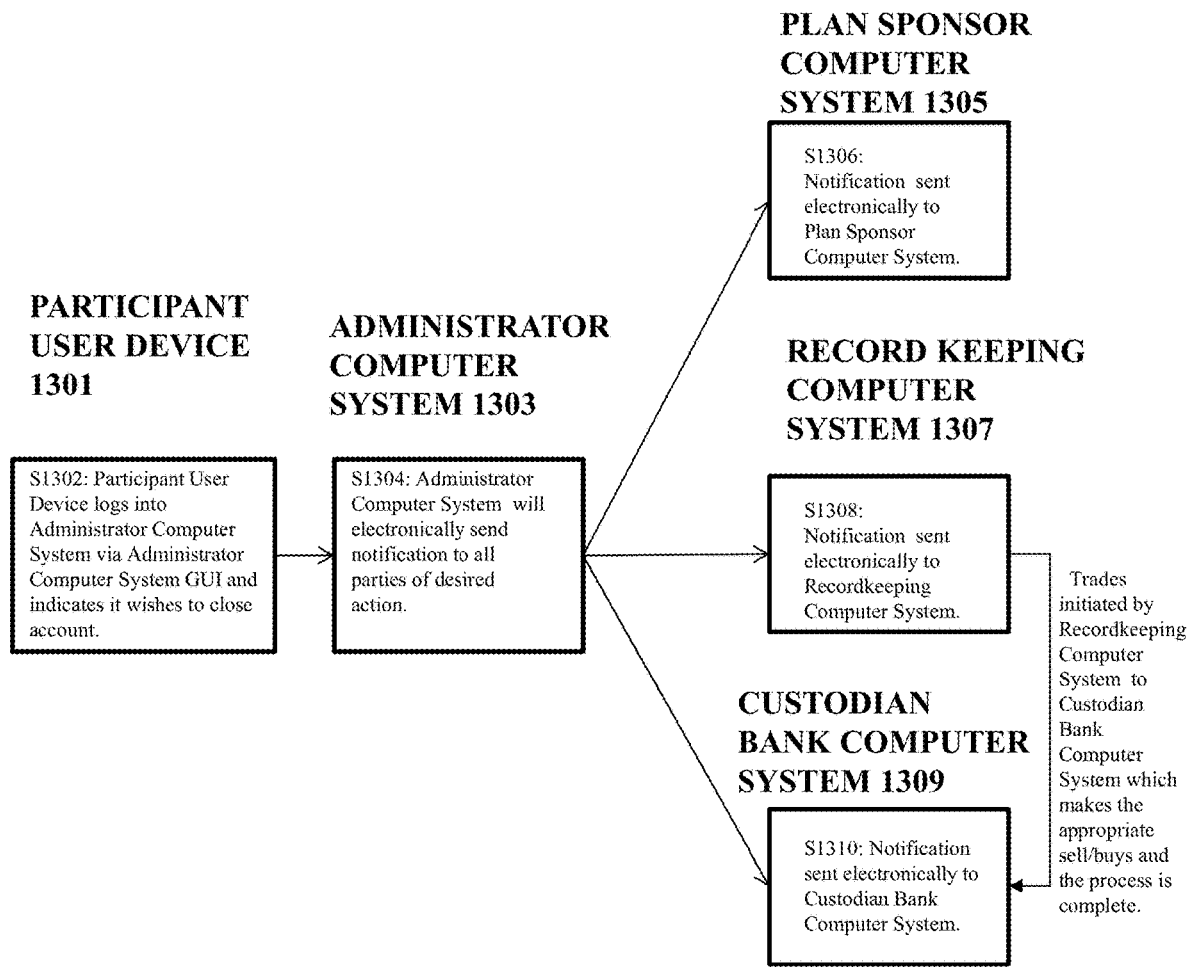
FIG. 13 is a flowchart of the loan fully repaid and participant closes account process according to exemplary embodiments of the present invention.

The loan fully repaid and participant closes account method is shown in FIG. 13. In Step S1302, the Participant User Device 1301 logs into Administrator Computer System 1303 via Administrator Computer System GUI and indicates it wishes to close account. In Step S1304, the Administrator Computer System 1303 will electronically send notification to all parties of desired action. In Step S1306, the notification sent electronically to Plan Sponsor Computer System 1305. In Step S1308, a notification is sent electronically to Recordkeeping Computer System 1307. In Step 1310, a notification is sent electronically to Custodian Bank Computer System 1309. The trades are initiated by Recordkeeping Computer System 1307 to Custodian Bank Computer System 1309 which makes the appropriate sell/buys and the process is complete. The Administrator Computer System 1303 will send notification to all parties (Plan Sponsor Computer System 1305, Recordkeeping Computer System 1307, Custodian Bank Computer System 1309) via Electronic Communications of this desired action. File(s) contained in the Electronic Communication will include instruction to sell designated loan line amount out of the loan fund and allocate to core funds based on Participant User Device 1301 current investment elections.

Figure 14:
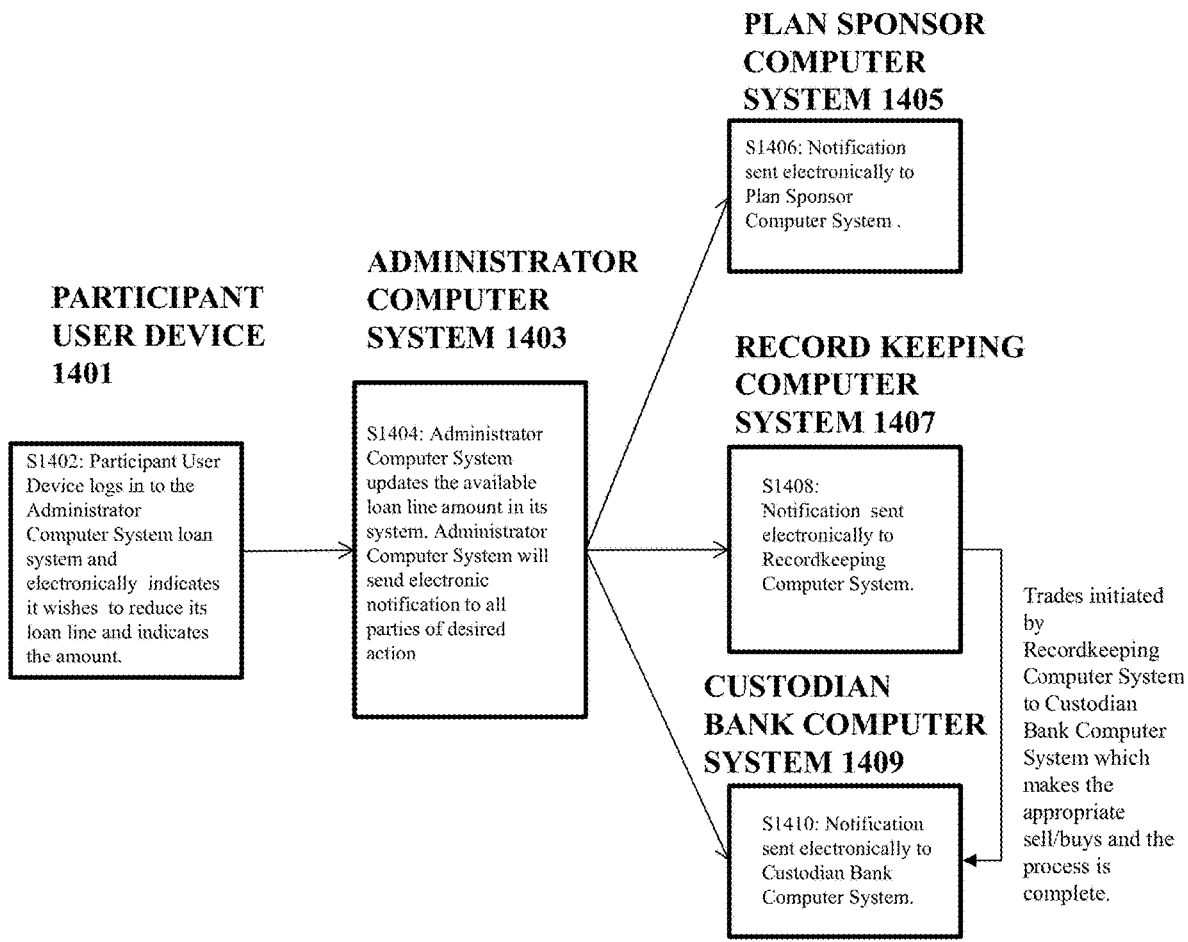
FIG. 14 is a flowchart of the loan fully repaid and participant reduces loan line process according to exemplary embodiments of the present invention.

Loan Fully Repaid and Participant Reduces Loan Line is shown in FIG. 14. In Step S1402, the Participant User Device 1401 logs in to the Administrator Computer System 1403 loan system and electronically indicates it wishes to reduce its loan line and indicates the amount. In Step S1404, the Administrator Computer System 1403 updates the available loan line amount in its system. The Administrator Computer System 1403 will send electronic notification to all parties of desired action. In Step S1406, a notification is sent electronically to Plan Sponsor Computer System 1405. In Step S1408, a notification is sent electronically to Recordkeeping Computer System 1407. In Step S1410, a notification is sent electronically to Custodian Bank Computer System 1409. Trades are initiated by Recordkeeping Computer System 1407 to Custodian Bank Computer System 1409 which makes the appropriate sell/buys and the process is complete. The Administrator Computer System 1403 will send notification to all parties (Plan Sponsor Computer System 1405, Recordkeeping Computer System 1407, Custodian Bank Computer System 1409) via Electronic Communications of this desired action. File(s) contained in the Electronic Communication will include instruction to sell designated loan line amount out of the loan fund and allocate to core funds based on participant's current investment elections.

Figure 15:
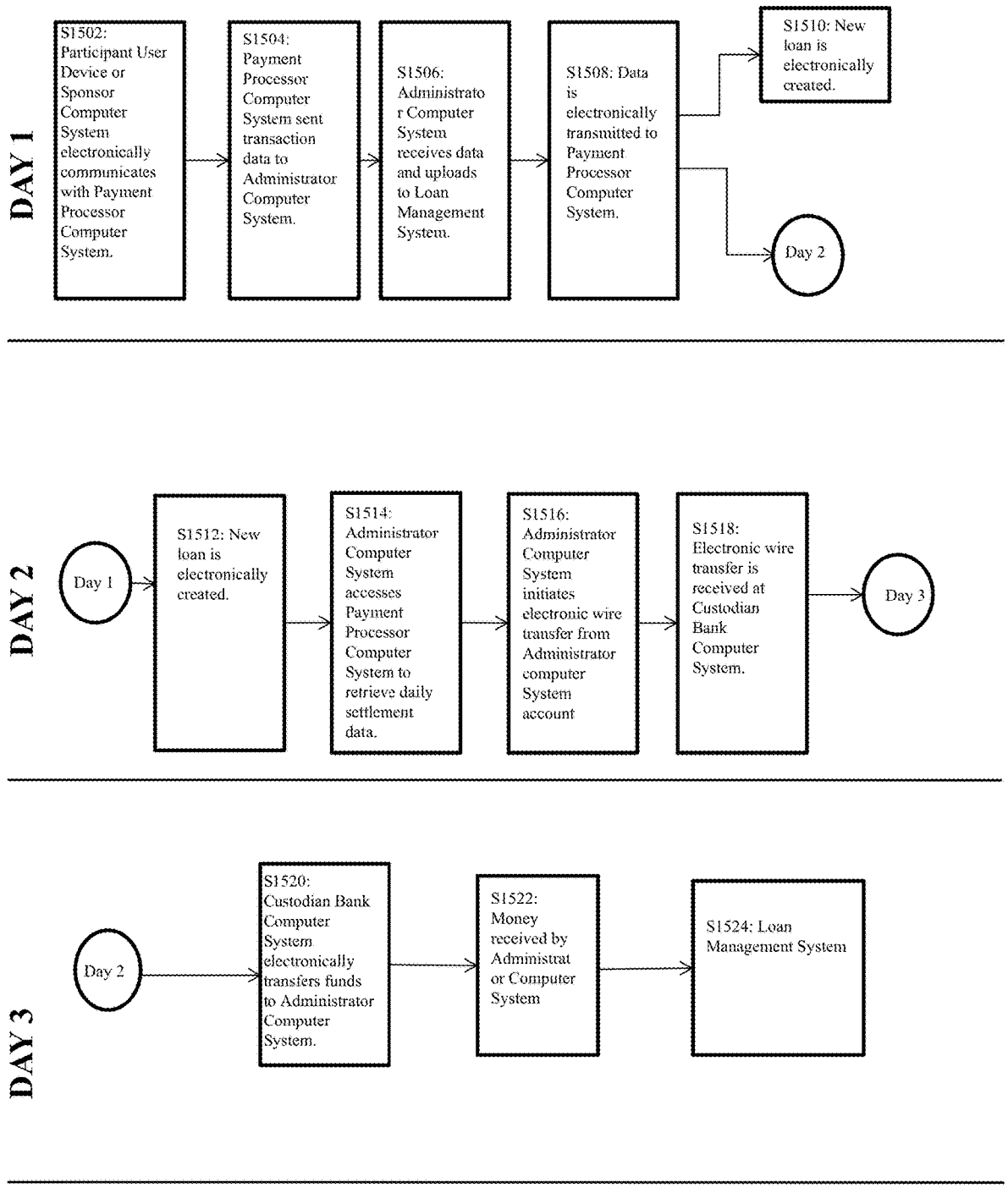
FIG. 15 is a flowchart of the Visa settlement according to exemplary embodiments of the present invention.

The Visa settlement method is shown in FIG. 15, which is prior art. On Day 1, in Step S1502, the Participant User Device or Sponsor Computer System electronically communicates with Payment Processor Computer System. In Step S1504, the Payment Processor Computer System sent transaction data to Administrator Computer System. In S1506 the Administrator Computer System receives data and uploads to the Loan Management System. In Step S1508, the Data is electronically transmitted to Payment Processor Computer System. In Step S1510, the new loan is electronically created. On Day 2, if it was not created in Day 1 in Step S1512, the new loan is electronically created. In Step S1514, the Administrator Computer System accesses Payment Processor Computer System to retrieve daily settlement data. In Step S1516, the Administrator Computer System initiates electronic wire transfer from Administrator Computer System account. In Step S1518, the electronic wire transfer is received at Custodian Bank Computer System. On Day 3, in Step S1520, the Custodian Bank Computer System electronically transfers funds to Administrator Computer System. In Step S1522, the money is received by the Administrator Computer System. In Step S1524, the money enters the Loan Management System. Unlike in a Recordkeeping integration models, this model assumes that the Recordkeeping Computer System does not track each discrete loan created due to a card swipe, nor the individual repayments to each discrete loan. Instead, Recordkeeping Computer System holds a loan account where the amount is equal to the initial participant loan amount requested. As discrete loans are created due to card swipes and participant makes loan repayments to Administrator Computer System, Administrator Computer System will periodically (monthly) provide participant level outstanding loan balance updates to Plan Sponsor Computer System (and Recordkeeping Computer System as applicable/appropriate for each client situation) via Electronic Communications. For each of these periodic updates created, the Third Party Account and Record Keeping Computer System insure account balances are updated. This creates the necessity to make sure that as funds are repaid to the loan account and loan balance is decremented, that core funds are update with new purchases.

Figure 16:
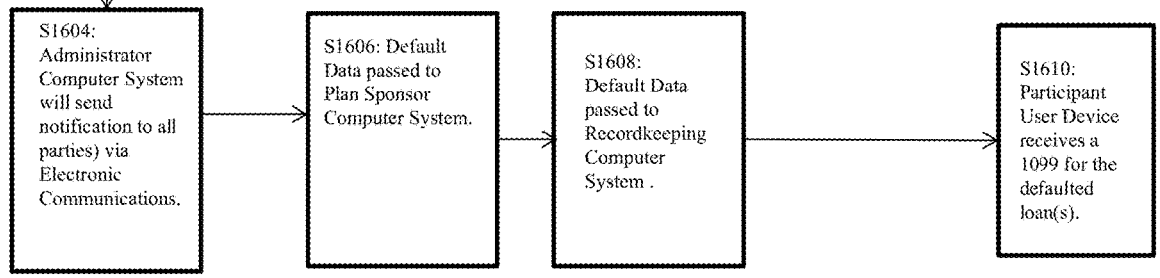
FIG. 16 is a flowchart of an exemplary process in the event of default according to exemplary embodiments of the present invention.

The Process in the Event of default method is shown on FIG. 16. In Step S1602, the Administrator Computer System 1601 will electronically monitor Participant User Device 1607 loan(s) amortization schedules and tracks repayment status. If the Participant User Device 1607 defaults on a loan or loans, then in Step S1604, the Administrator Computer System will send notification to all parties) via Electronic Communications. In Step S1606, the Default Data is passed to Plan Sponsor Computer System 1603. In Step S1608, the Default Data is passed to the Recordkeeping Computer System 1605. In Step S1610, the Participant User Device 1607 receives a 1099 for the defaulted loan(s). The Administrator Computer System 1601 will send notification to all parties (Plan Sponsor Computer System 1603, Record Keeping Computer System 1605, Custodian Bank Computer System) via Electronic Communications containing the following data Participant identification, Loan ID, Outstanding Loan Amount, Date of Default, Updated Amortization Schedule as if Date of Default. There may be regulations that govern and restrict the ability for a participant to initiate a new loan once they have defaulted on a loan. This needs to be verified. If such rules exists, this process section will be expanded to cover the necessary Administrator actions needed.

Figure 17:
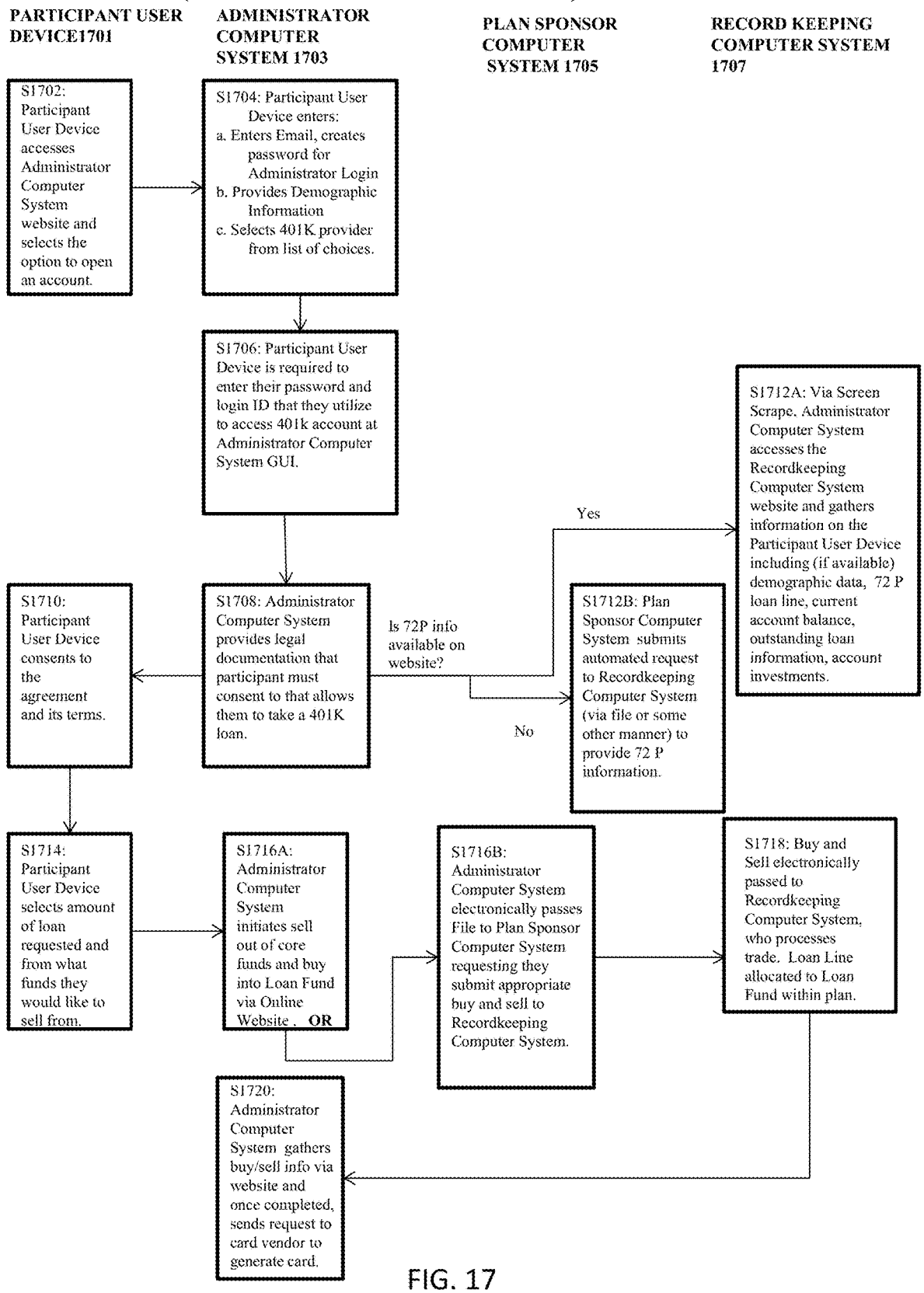
FIG. 17 is a flowchart of the process of administrator screen scrape account setup according to exemplary embodiments of the present invention.

The Administrator Screen Scrape account setup method is shown on FIG. 17. In Step S1702, Participant User Device 1701 accesses Administrator Computer System 1703 website and selects the option to open an account. The Administrator Computer System 1703 may be a loan computer system In Step S1704, the Participant User Device 1701 enters: a) Enters Email, creates password for Administrator Login b) Provides Demographic Information c) Selects 401K provider from list of choices. In Step S1706 the Participant User Device 1701 is required to enter their password and login ID that they utilize to access 401k account at Administrator Computer System 1703 GUI. In Step S1708, the Administrator Computer System 1703 provides legal documentation that participant must consent to that allows them to take a 401K loan. If there is 72P information available on website, then Step S1712A follows in which via Screen Scrape, Administrator Computer System 1703 accesses the Recordkeeping Computer System 1707 website and gathers information on the Participant User Device 1701 including (if available) demographic data, 72P loan line, current account balance, outstanding loan information, account investments. In embodiments, one or more application programming interfaces ("APIs") may be used to access data from the Recordkeeping Computer System 1707. In embodiments, a screen scraping process may be used, whereby the Administrator Computer System 1703 may access a Recordkeeping Computer System 1707 customer portal (e.g., a website and/or webpage), obtain the corresponding website data (e.g., by accessing the website page source information), and/or parse the website data to determine the relevant source account balance information. In embodiments, scraping can comprise accessing webpage data, parsing the webpage data, searching webpage data (e.g., GUI data and/or underlying front end webpage code, such as HTML) for one or more data items (e.g., words and/or characters such as "account", "balance", "$"), and/or performing regular expression matching to find particular expressions.

If there is no 72P information available on the website, the Plan Sponsor Computer System 1705 submits automated request to Recordkeeping Computer System 1707 (via file or some other manner) to provide 72P information. Also after Step S1708, is S1710, in which the Participant User Device 1701 consents to the agreement and its terms. In Step S1714, the Participant User Device 1701 selects amount of loan requested and from what funds they would like to sell from. After Step S1714, is either Step S1716A or Step S1716B. In Step S1716A, the Administrator Computer System 1703 initiates sell out of core funds and buy into Loan Fund via Online Website. In Step S1716B, the Administrator Computer System 1703 electronically passes File to Plan Sponsor Computer System 1705 requesting they submit appropriate buy and sell to Recordkeeping Computer System 1707. In Step S1718, Buy and Sell is electronically passed to Recordkeeping Computer System 1707, who processes trade. Loan Line allocated to Loan Fund within plan. Then in Step S1720, the Administrator Computer System 1703 gathers buy/sell info via website and once completed, sends request to card vendor to generate card. Administrator Computer System 1703 has made sale to the Plan Sponsor Computer System 1705, meaning where possible, information will be passed to sponsor for submission to the Record Keeping Computer System 1707 or information will be gathered from sponsor and provided to Administrator Computer System 1703.

Figure 18:
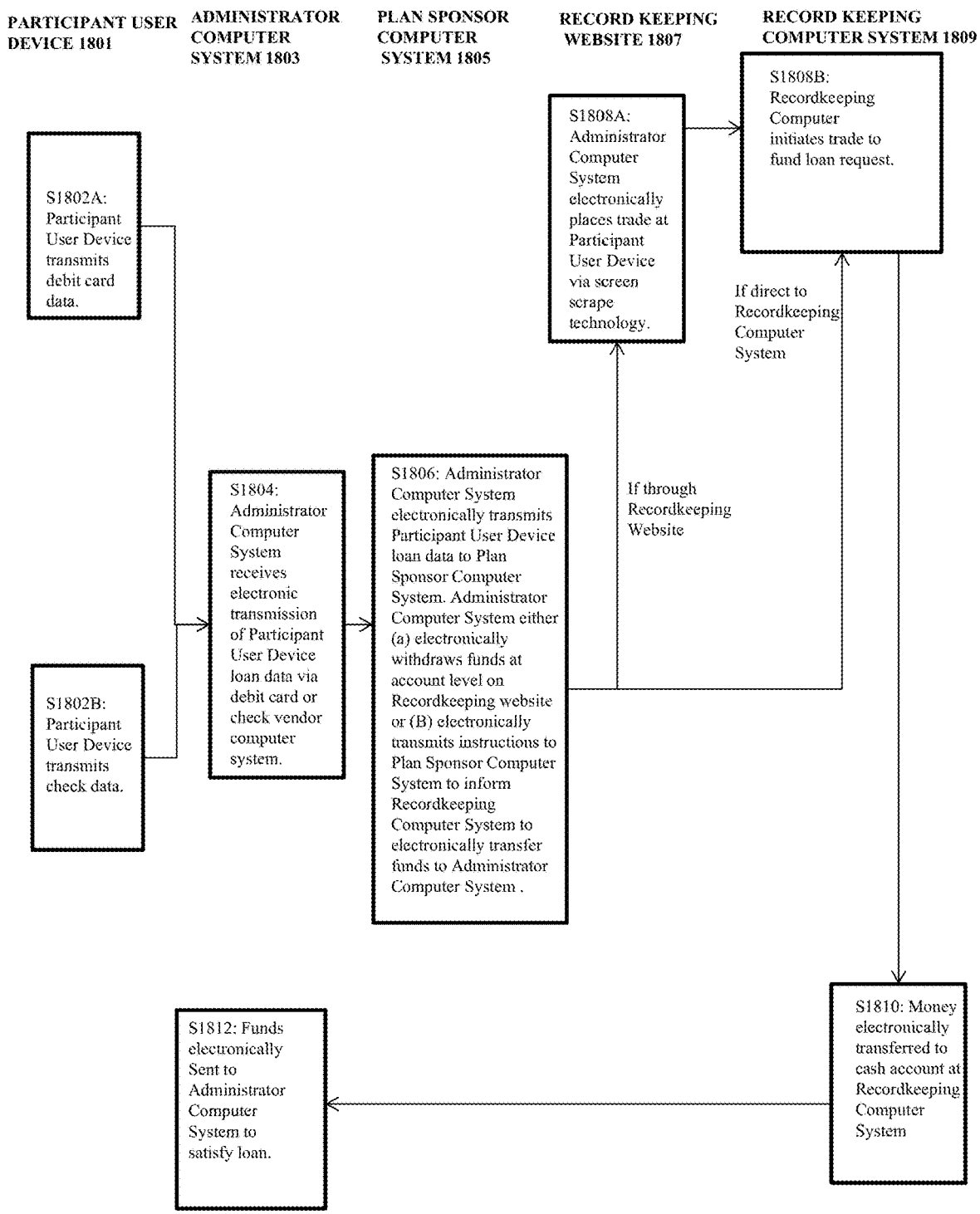
FIG. 18 is a flowchart of the process of funding loan request according to exemplary embodiments of the present invention.

The funding loan request method is described in FIG. 18. It begins with either Step S1802A or 51802B. In Step 1802A, the Participant User Device 1801 transmits debit card data. In Step 1802B, the Participant User Device 1801 transmits check data. In Step S1804, the Administrator Computer System 1803 receives electronic transmission of Participant User Device 1805 loan data via debit card or check vendor computer system. In Step S1806, the Administrator Computer System 1803 electronically transmits Participant User Device 1801 loan data to Plan Sponsor Computer System 1805. Administrator Computer System 1803 either (a) electronically withdraws funds at account level on Recordkeeping website 1807 or (B) electronically transmits instructions to Plan Sponsor Computer System 1805 to inform Recordkeeping Computer System 1809 to electronically transfer funds to Administrator Computer System 1803. Step S1806 is followed by either Step S1808A or 51808B. If through the Recordkeeping Website 1807, then the method goes to Step S1808A, in which the Administrator Computer System 1807 electronically places trade at Participant User Device 1801 via screen scrape technology. If through the Recordkeeping Computer System 1809, the method goes to Step S1808B, the Recordkeeping Computer 1809 initiates a trade to fund loan request. In Step S1810, the money is electronically transferred to cash account at Recordkeeping Computer System 1809. In Step S1812, the funds are electronically sent to Administrator Computer System 1803 to satisfy loan.

Figure 19:
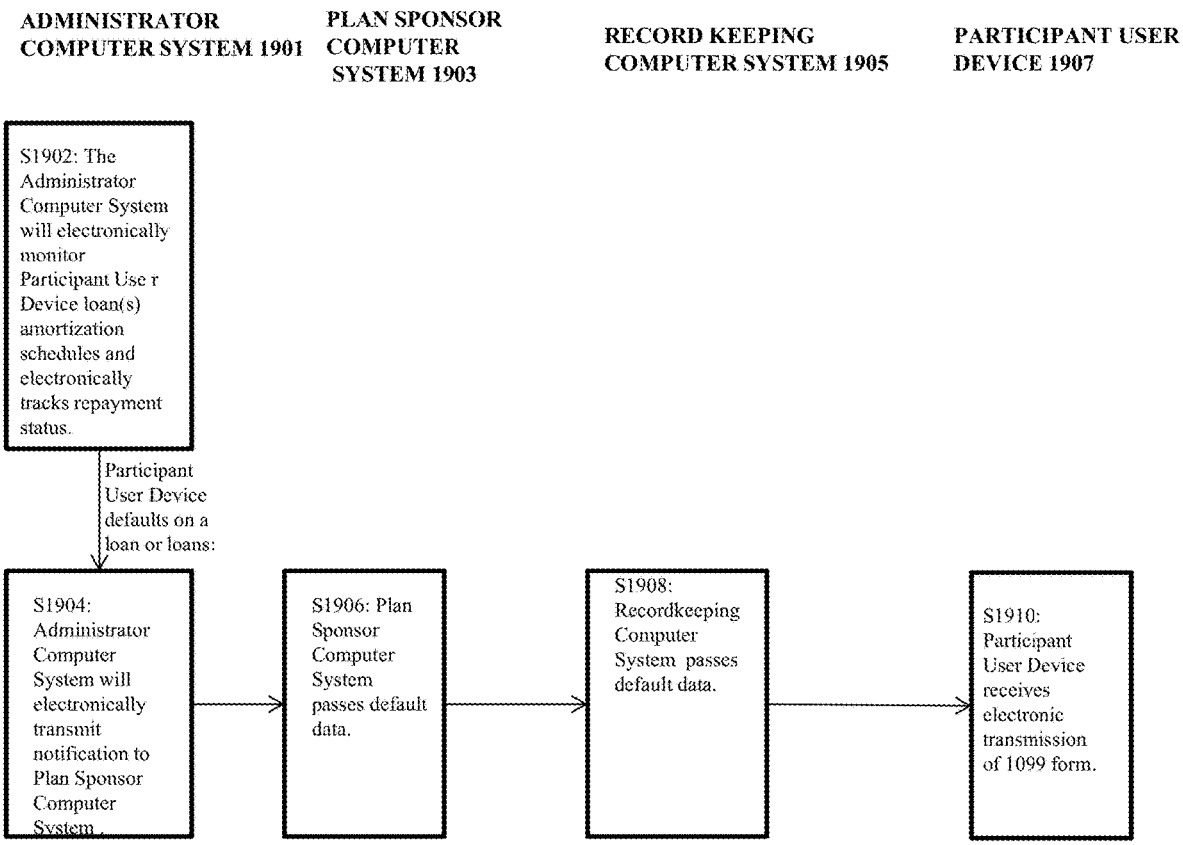
FIG. 19 is a flowchart of the process in the event of default according to exemplary embodiments of the present invention.

The Process in the event of default is described in FIG. 19. In Step S1902, The Administrator Computer System 1901 will electronically monitor Participant User Device 1907 loan(s) amortization schedules and electronically tracks repayment status. If the Participant User Device 1907 defaults on a loan or loans, then the process constitutes to Step S1904. In Step S1904, the Administrator Computer System 1901 will electronically transmit notification to Plan Sponsor Computer System 1903. In Step S1906, the Plan Sponsor Computer System 1903 passes default data. In Step S1908, the Recordkeeping Computer System 1905 passes default data. In Step S1910, the Participant User Device 1907 receives electronic transmission of 1099 form.

Figure 20:
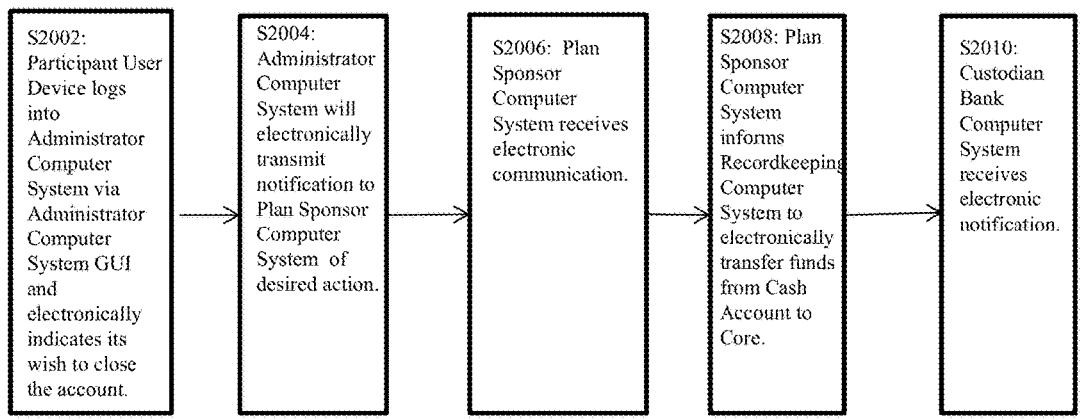
FIG. 20 is a flowchart of the process of the screen scrape in the event the participant closes the account according to exemplary embodiments of the present invention.

The process for the Screen Scrape in which the participant closes the account is described in FIG. 20. In Step S2002, the Participant User Device 2001 logs into Administrator Computer System 2003 via Administrator Computer System 2003 GUI and electronically indicates its wish to close the account. In Step S2004, Administrator Computer System 2003 will electronically transmit notification to Plan Sponsor Computer System 2005 of desired action. In Step S2006, the Plan Sponsor Computer System 2005 receives electronic communication. In Step S2008, the Plan Sponsor Computer System 2005 informs Recordkeeping Computer System 2007 to electronically transfer funds from Cash Account to Core. In Step S2010, the Custodian Bank Computer System 2009 receives electronic notification.

Figure 21A:
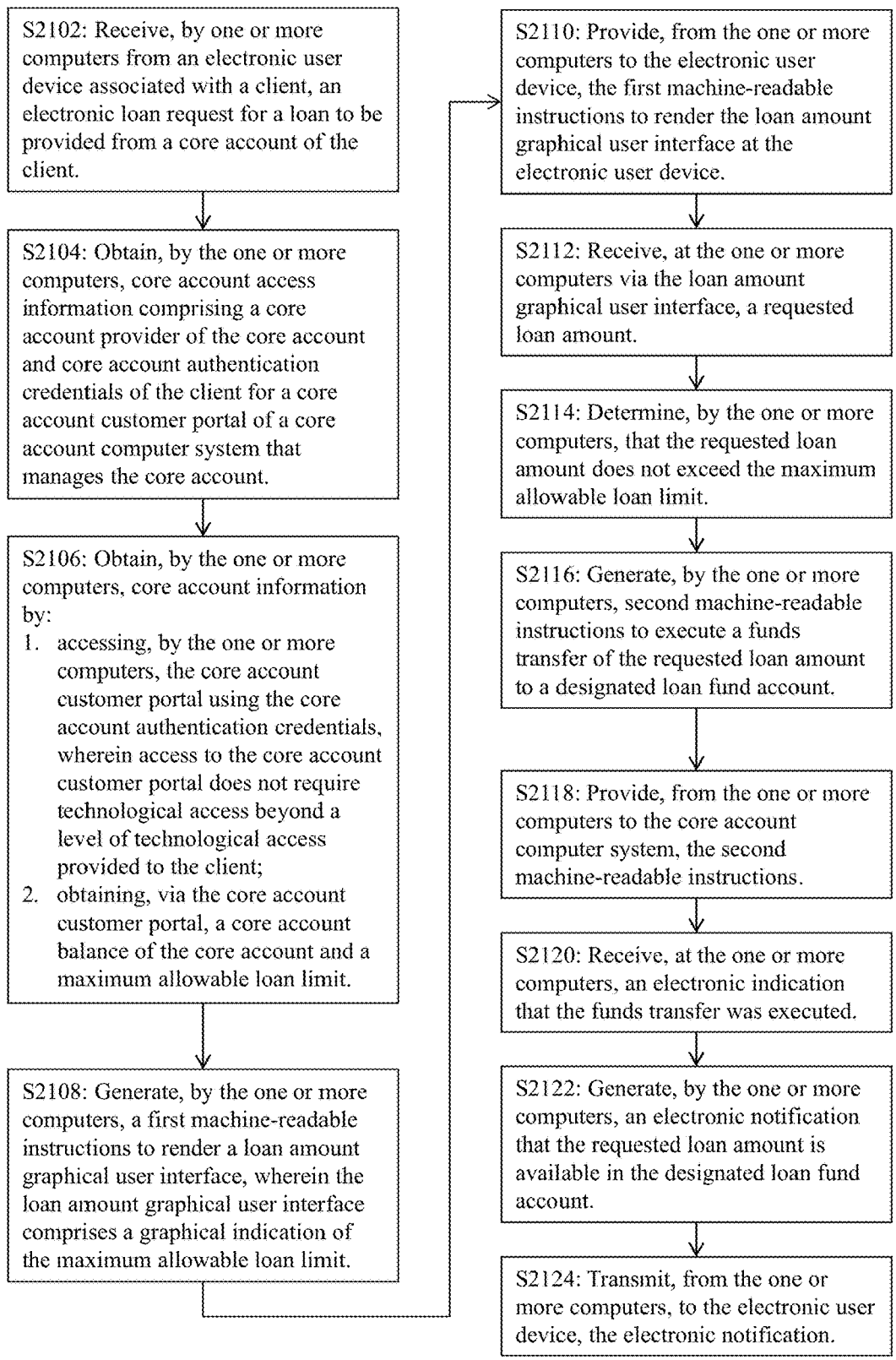
FIGS. 21A-C are flowcharts of methods for creating loan accounts according to exemplary embodiments of the present invention.

The method for creating a loan account is shown in FIG. 21A. The method consists of, in Step S2102, receiving, by one or more computers from an electronic user device associated with a client, an electronic loan request for a loan to be provided from a core account of the client. In Step 2104, obtaining, by the one or more computers, core account access information comprising a core account provider of the core account and core account authentication credentials of the client for a core account customer portal of a core account computer system that manages the core account. In Step S2106, obtaining, by the one or more computers, core account information by: (1) accessing, by the one or more computers, the core account customer portal using the core account authentication credentials, wherein access to the core account customer portal does not require technological access beyond a level of technological access provided to the client; (2) obtaining, via the core account customer portal, a core account balance of the core account and a maximum allowable loan limit. In Step S2108, generating, by the one or more computers, a first machine-readable instructions to render a loan amount graphical user interface, wherein the loan amount graphical user interface comprises a graphical indication of the maximum allowable loan limit. In Step S2110, providing, from the one or more computers to the electronic user device, the first machine-readable instructions to render the loan amount graphical user interface at the electronic user device. In Step S2112, receiving, at the one or more computers via the loan amount graphical user interface, a requested loan amount. In Step S2114, determining, by the one or more computers, that the requested loan amount does not exceed the maximum allowable loan limit. In Step S2116, generating, by the one or more computers, second machine-readable instructions to execute a funds transfer of the requested loan amount to a designated loan fund account. In Step S2118, providing, from the one or more computers to the core account computer system, the second machine-readable instructions. In Step S2120, receiving, at the one or more computers, an electronic indication that the funds transfer was executed. In Step S2122, generating by the one or more computers, an electronic notification that the requested loan amount is available in the designated loan fund account. In Step S2124, transmitting, from the one or more computers, to the electronic user device, the electronic notification.

Figure 21B:
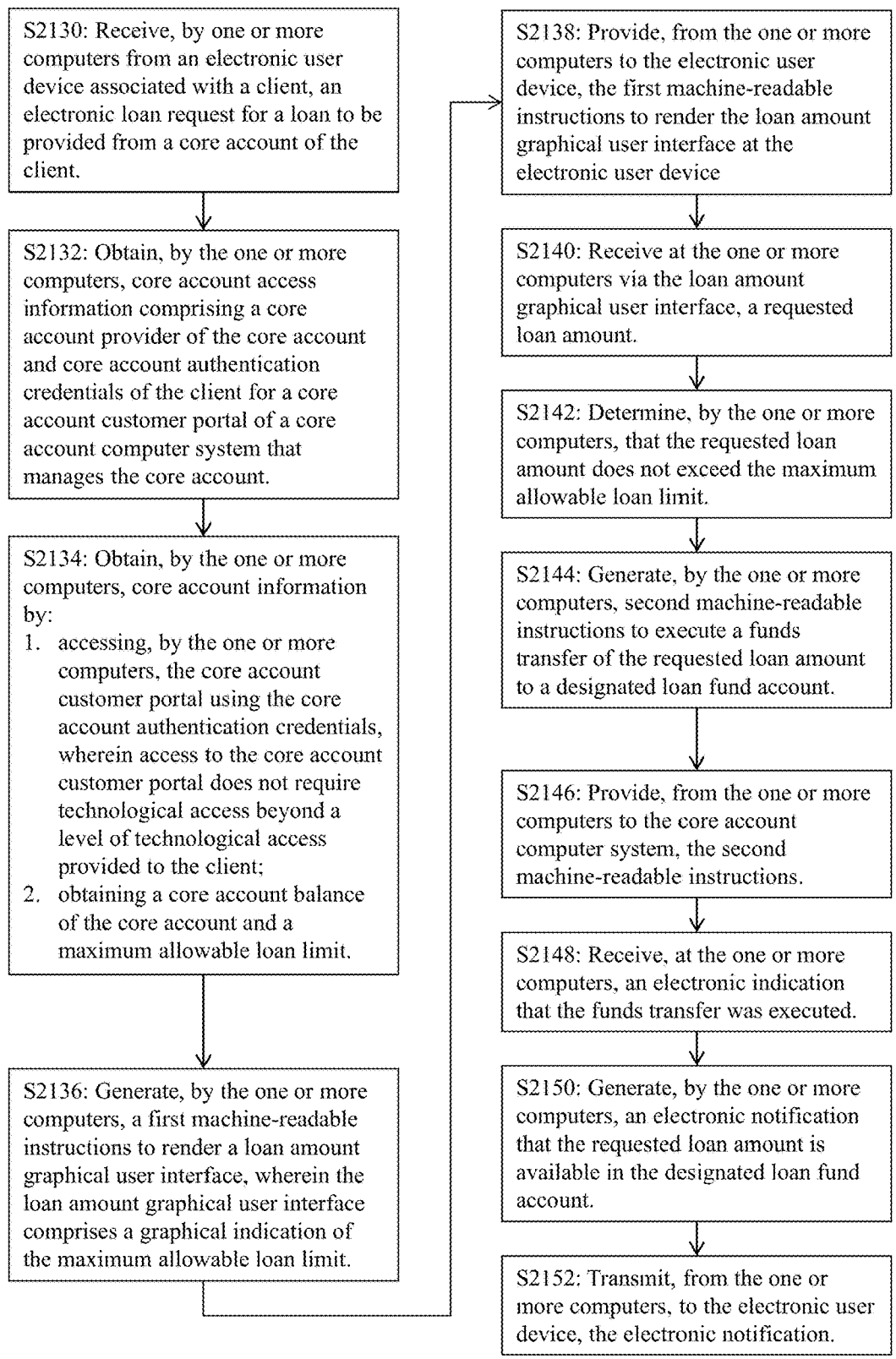
Figure 21C:
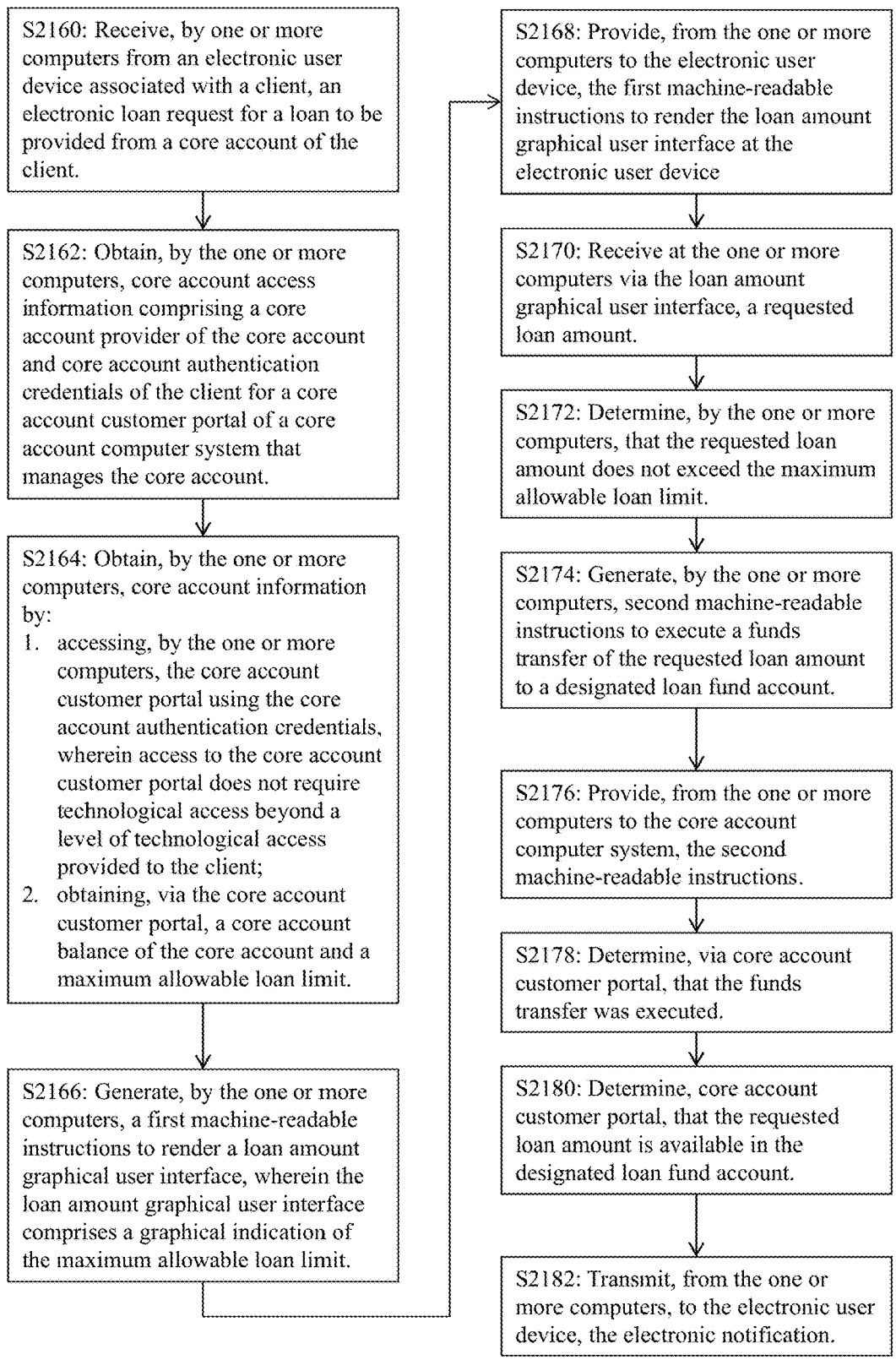

The method shown in FIG. 21A can be modified. As shown in FIG. 21B Step S2134, the core account balance or the maximum allowable loan limit can be obtained in many ways including receiving from the recordkeeping computer system or retrieving from other computer systems. As shown in FIG. 21C Step S2178, that the funds transfer was executed can be determined via the core account customer portal. As shown in FIG. 21C Step S2180, that the requested loan amount is available in the designated loan fund account can be determined via the core account customer portal. The method can also be linked to a debit card. The method can also be linked to a checking account.

Systems, methods, and program products for use with automatically funded loan fund accounts using a remainder amount are disclosed. In embodiments, a system for generating loan data consistent with the present invention comprises: a network communications module; one or more computers configured with the following components: a loan request reception component configured in the one or more computers to receive a loan request with a requested loan amount; a database access component configured in the one or more computers to access a database held on one or more non-transitory computer-readable media, comprising: core account transfer data for a core account; an initial loan fund remainder amount; a current loan fund remainder amount; an initial funded loan fund amount held in a funded loan fund account; and a current funded loan fund amount held in the funded loan fund account, wherein the initial loan fund remainder amount is greater than the initial funded loan fund amount; a loan approval component configured in the one or more computers to access the requested loan amount and the current loan fund remainder amount to determine if the requested loan amount exceeds or does not exceed the current loan fund remainder amount and to approve or not to approve based at least in part on the determine operation; a funded loan fund calculator configured in the one or more computers to calculate an amount to be transferred from the funded loan fund to service the loan request and to calculate any deficiency amount when the respective requested loan amount exceeds the current funded loan fund amount; a funded loan fund transfer component configured in the one or more computers to transfer or have transferred funds to service the requested loan amount based at least in part on loan approval data from the loan approval component; a core account transfer component configured in the one or more computers to transfer or have transferred the any deficiency amount from a core account to service the loan request but with the amount from the funded loan fund account and the core account transferred not to exceed the current loan fund remainder amount, and to automatically replenish the funded loan fund account up to the initial funded loan fund amount, but with the replenishment amount transferred not to exceed the current loan fund remainder amount; a current loan fund remainder amount calculator configured in the one or more computers to reduce the current loan fund remainder amount by any amounts transferred from the funded loan fund account and from the core account to service the loan request, and configured to increase the current loan fund remainder amount based at least in part on a repayment amount; a repayment component configured in the one or more computers to transfer or have transferred the repayment amount to replenish the funded loan fund account up to the initial funded loan fund amount and, to replenish funds to the core account for loan transfers therefrom, and to trigger operation of the current loan fund remainder amount calculator to perform the increase, the repayment amount to the current loan fund remainder amount; and an update component configured in the one or more computers to update the current loan fund remainder amount and the current funded loan fund amount in the one or more databases based on transfer operations of the funded loan fund transfer component and the core account transfer component and the repayment component.

In embodiments, the system may further comprise: an interest calculator configured in the one or more computers to calculate an interest amount based at least in part on a first interest rate for funds held in the core account and based at least in part on a second lower interest rate for funds held in the funded loan account.

In embodiments, the network communications module may be configured to transmit a message that the requested loan amount exceeds the current loan fund remainder amount when it is determined that the requested loan amount exceeds the current loan fund remainder amount.

In embodiments, the funded loan fund transfer component and the core account transfer component may be configured to transfer, via the one or more computers, funds from the funded loan fund and/or the core account only up to an amount that will reduce the current loan fund remainder amount to zero.

In embodiments, the core account transfer component may be configured to only replenish the funded loan fund account when the current loan fund remainder amount is equal to or greater than a predetermined amount.

In embodiments, the one or more computers may be further configured to provide an electronic interface generator for providing an electronic interface accessible over the one or more networks via the network communications module, with the electronic interface generator configured to provide one or more investment designation fields for receiving a designation of one or more investments to be liquidated in part in the core account to fund the funded loan fund account.

In embodiments, the electronic interface generator may be further configured to provide a field, associated with a respective one of the investment designation fields, for designating a monetary amount or a loan fund percentage to be funded by an investment designated in the respective investment designation field.

In embodiments, the one or more computers may be configured to provide a plurality of the funded loan funds, with a different one or more of the investment designation fields associated with each different loan fund.

In embodiments, a program product consistent with the invention comprises: one or more non-transitory computer-readable media, comprising computer-readable code for execution by one or more computers, to perform the steps: receive, by the one or more computers, a loan request comprising a requested loan amount; access, by the one or more computers, a database stored on one or more non-transitory computer-readable media, storing data comprising: core account transfer data for a core account; an initial loan fund remainder amount; a current loan fund remainder amount; an initial funded loan fund amount held in a funded loan fund account; a current funded loan fund amount held in the funded loan fund account, wherein the initial loan fund remainder amount is greater than the initial funded loan fund amount; compare, by the one or more computers, the requested loan amount to the current loan fund remainder amount to determine if the requested loan amount exceeds or does not exceed the current loan fund remainder amount; when the requested loan amount does not exceed the current loan fund remainder amount, then transfer or have transferred, by the one or more computers, funds from the funded loan fund account to service the loan request; when the requested loan amount does not exceed the current loan fund remainder amount, then determine, by the one or more computers, if the requested loan amount exceeds or does not exceed the current funded loan fund amount; when it is determined that the requested loan amount does exceed the current funded loan fund amount, then determine a deficiency amount by which the requested loan amount exceeds the current funded loan fund amount; when the requested loan amount does not exceed the current loan fund remainder amount and the requested loan amount does exceed the current funded loan fund amount, then transfer or have transferred, by the one or more computers, the deficiency amount from the core account to service the loan request but with the amount from the funded loan fund account and the core account transferred not to exceed the current loan fund remainder amount; subtract or have subtracted, by the one or more computers, the amount transferred to service the loan request from the current loan fund remainder amount held in the database; when the current loan fund remainder amount is greater than a predetermined amount, e.g., zero, then transfer or have transferred, by the one or more computers, replenishment funds from the core account to the funded loan fund account to replenish the funded loan fund up to the initial funded loan fund amount but with the replenishment amount transferred not to exceed the current loan fund remainder amount; when repayment amount data for a repayment amount is received, then: transfer or have transferred, by the one or more computers, the repayment amount to the core account to replenish the core account for any loan transfers therefrom; add, by the one or more computers, the repayment amount to the current loan fund remainder amount; and update, by the one or more computers, core account information and the current loan fund remainder amount in the database based on the transfer step and the add step.

In embodiments, the program product may further comprise computer-readable code to: calculate or have calculated, by the one or more computers, an interest amount based at least in part on a first interest rate for funds held in the core account and based at least in part on a second lower interest rate for funds held in the funded loan account.

In embodiments, the program product may further comprise computer-readable code to transmit or have transmitted, by the one or more computers and one or more communications networks, a message that the requested loan amount exceeds the current loan fund remainder amount, when it is determined that the requested loan amount exceeds the current loan fund remainder amount.

In embodiments, the program product may further comprise computer-readable code to transfer or have transferred, by the one or more computers, funds from the funded loan fund and/or the core account only up to an amount that will reduce the current loan fund remainder amount to zero, when it is determined that the requested loan amount exceeds the current loan fund remainder amount.

In embodiments, a method consistent with the invention may comprise: receiving, by one or more computers, a loan request comprising a requested loan amount; accessing, by the one or more computers, a database stored on one or more non-transitory computer-readable media, storing data comprising: core account transfer data for a core account; an initial loan fund remainder amount; a current loan fund remainder amount; an initial funded loan fund amount held in a funded loan fund account; a current funded loan fund amount held in the funded loan fund account, wherein the initial loan fund remainder amount is greater than the initial funded loan fund amount; comparing, by the one or more computers, the requested loan amount to the current loan fund remainder amount to determine if the requested loan amount exceeds or does not exceed the current loan fund remainder amount; when the requested loan amount does not exceed the current loan fund remainder amount, then transferring or having transferred, by the one or more computers, funds from the funded loan fund account to service the loan request; when the requested loan amount does not exceed the current loan fund remainder amount, then determining, by the one or more computers, if the requested loan amount exceeds or does not exceed the current funded loan fund amount; when it is determined that the requested loan amount does exceed the current funded loan fund amount, then determining a deficiency amount by which the requested loan amount exceeds the current funded loan fund amount; when the requested loan amount does not exceed the current loan fund remainder amount and the requested loan amount does exceed the current funded loan fund amount, then transferring or having transferred, by the one or more computers, the deficiency amount from the core account to service the loan request but with the amount from the funded loan fund account and the core account transferred not to exceed the current loan fund remainder amount; subtracting or having subtracted, by the one or more computers, the amount transferred to service the loan request from the current loan fund remainder amount held in the database; when the current loan fund remainder amount is greater than a predetermined amount, then transferring or having transferred, by the one or more computers, replenishment funds from the core account to the funded loan fund account to replenish the funded loan fund up to the initial funded loan fund amount but with the replenishment amount transferred not to exceed the current loan fund remainder amount; when repayment amount data for a repayment amount is received, then: transferring or having transferred, by the one or more computers, the repayment amount to the core account to replenish the core account for any loan transfers therefrom; adding, by the one or more computers, the repayment amount to the current loan fund remainder amount; and updating, by the one or more computers, core account information and the current loan fund remainder amount in the database based on the transfer step and the adding step.

In embodiments, a system may comprise one or more processors and non-transitory computer-readable memory operatively connected to the one or more processors and having stored thereon machine-readable instructions to perform the following steps: receiving, by one or more computers from an electronic user device associated with a client, an electronic loan request for a loan to be provided from a core account of the client; obtaining, by the one or more computers, core account access information comprising a core account provider identifier indicating a provider of the core account and core account authentication credentials of the client for a core account customer portal of a core account computer system that manages the core account; and obtaining, by the one or more computers, core account information.

In embodiments, the one or more computers may obtain the core account information by accessing, by the one or more computers, the core account customer portal using the core account authentication credentials, wherein access to the core account customer portal does not require technological access beyond a level of technological access provided to the client, and obtaining, via the core account customer portal, a core account balance of the core account and a maximum allowable loan limit. In embodiments, the core account customer portal may comprise an application programming interface. In embodiments, the core account customer portal may comprise a website accessible at a URL via the Internet. Obtaining the core account balance of the core account and the maximum allowable loan limit may comprise screen scraping, such as parsing HTML data and/or parsing webpage text, to name a few.

In embodiments, the system may be further configured to perform the steps of generating, by the one or more computers, first machine-readable instructions to render a loan amount graphical user interface, wherein the loan amount graphical user interface comprises a graphical indication of the maximum allowable loan limit; providing, from the one or more computers to the electronic user device, the first machine-readable instructions to render the loan amount graphical user interface at the electronic user device; receiving, at the one or more computers via the loan amount graphical user interface, a requested loan amount; determining, by the one or more computers, that the requested loan amount does not exceed the maximum allowable loan limit; generating, by the one or more computers, second machine-readable instructions to execute a funds transfer of the requested loan amount to a designated loan fund account; providing, from the one or more computers to the core account computer system, the second machine-readable instructions; receiving, at the one or more computers, an electronic indication that the funds transfer was executed; generating, by the one or more computers, an electronic notification that the requested loan amount is available in the designated loan fund account; and transmitting, from the one or more computers, to the electronic user device, the electronic notification.

In embodiments, the core fund may be a retirement account. In embodiments, the designated loan fund account may be linked to a debit card. In embodiments, the designated loan fund account may be linked to a checking account.

In embodiments, one or more computers, which may comprise a loan computer system or administrator computer system, may received from an electronic user device associated with a client an electronic loan request for a loan to be provided from a core account of the client. The one or more computers may obtain core account access information comprising a core account provider identifier indicating a provider of the core account and core account authentication credentials of the client for a core account customer portal of a core account computer system that manages the core account. In embodiments, the core account provider identifier may comprise a provider name or other alphanumeric identifier, which may be input my a user into a graphical user interface (GUI) and/or selected from a list of predefined providers, to name a few. In embodiments, the core account authentication credentials may comprise a username and password and/or contact information (e.g., an email address), to name a few.

The one or more computers may obtain core account information by accessing the core account customer portal using the core account authentication credentials, wherein access to the core account customer portal does not require technological access beyond a level of technological access provided to the client and obtaining, via the core account customer portal, a core account balance of the core account and a maximum allowable loan limit. In embodiments, the core account customer portal may comprise an application programming interface. In embodiments, the core account customer portal may comprise a website accessible at a URL via the Internet. Obtaining the core account balance of the core account and the maximum allowable loan limit may comprise screen scraping, such as parsing HTML data and/or parsing webpage text, to name a few.

In embodiments, the one or more computer may generate first machine-readable instructions to render a loan amount graphical user interface, wherein the loan amount graphical user interface comprises a graphical indication of the maximum allowable loan limit. The one or more computers may provide to the electronic user device the first machine-readable instructions to render the loan amount graphical user interface at the electronic user device. The one or more computers may receive via the loan amount graphical user interface a requested loan amount. In embodiments, the one or more computers may determine that the requested loan amount does not exceed the maximum allowable loan limit; generate second machine-readable instructions to execute a funds transfer of the requested loan amount to a designated loan fund account; and provide to the core account computer system the second machine-readable instructions.

In embodiments, the one or more computers may receive an electronic indication that the funds transfer was executed. The one or more computers may generate an electronic notification that the requested loan amount is available in the designated loan fund account, and the one or more computers may transmit to the electronic user device the electronic notification.

In embodiments, the core fund may be a retirement account. The designated loan fund account may be linked to a debit card. In embodiments, the designated loan fund account may be linked to a checking account.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A loan computer system comprising:
   (a) one or more processors;
   (b) a non-transitory computer-readable memory operatively connected to the one or more processors and having stored thereon machine-readable instructions to perform the following steps:
      (1) receiving, by the loan computer system from an electronic user device associated with a client, an electronic loan request for a loan to be provided from a core account of the client, wherein the core account is a retirement account;
      (2) obtaining, by the loan computer system, core account access information comprising a core account provider identifier indicating a provider of the core account and core account authentication credentials of the client for a core account customer portal of a recordkeeping computer system that manages the core account;
      (3) obtaining, by the loan computer system, core account information by performing a screen scraping operation, the screen scraping operation comprising:
         (i) providing, by the loan computer system, the core account authentication credentials to a URL associated with the core account customer portal via the Internet;
         (ii) accessing, by the loan computer system, the core account customer portal using the core account authentication credentials, wherein access to the core account customer portal does not require technological access beyond a level of technological access provided to the client and does not require the client to interact with the loan computer system;
         (iii) obtaining, by the loan computer system via the accessed core account customer portal, website page source information that includes core account data associated with the core account; and
         (iv) at least one of parsing, searching or regular expression matching, by the loan computer system, of the website page source information to determine a core account balance and a maximum allowable loan limit associated with the core account; and
      (4) generating, by the loan computer system, first machine-readable instructions to render a loan amount graphical user interface, wherein the loan amount graphical user interface comprises a graphical indication of the maximum allowable loan limit;
      (5) providing, from the loan computer system to the electronic user device, the first machine-readable instructions to render the loan amount graphical user interface at the electronic user device;
      (6) receiving, at the loan computer system via the loan amount graphical user interface, a requested loan amount;
      (7) determining, by the loan computer system, that the requested loan amount does not exceed the determined maximum allowable loan limit;
      (8) generating, by the loan computer system, second machine-readable instructions to execute a funds transfer of the requested loan amount to a designated loan fund account;
      (9) providing, from the loan computer system to the recordkeeping computer system, the second machine-readable instructions;
      (10) receiving, at the loan computer system, an electronic indication that the funds transfer was executed;
      (11) generating, by the loan computer system, an electronic notification that the requested loan amount is available in the designated loan fund account; and
      (12) transmitting, from the loan computer system, to the electronic user device, the electronic notification,
   wherein the loan computer system bypasses technological cooperation of the recordkeeping computer system to obtain the core account data without requiring custom integration with the recordkeeping computer system.

2. The loan computer system of claim 1, wherein the designated loan fund account is linked to a debit card.

3. The loan computer system of claim 1, wherein the designated loan fund account is linked to a checking account.

4. The loan computer system of claim 1, wherein the core account customer portal comprises an application programming interface.

5. A method comprising:
(a) receiving, by a loan computer system from an electronic user device associated with a client, an electronic loan request for a loan to be provided from a core account of the client, wherein the core account is a retirement account;
(b) obtaining, by the loan computer system, core account access information comprising a core account provider identifier indicating a provider of the core account and core account authentication credentials of the client for a core account customer portal of a recordkeeping computer system that manages the core account;
(c) obtaining, by the loan computer system, core account information by performing a screen scraping operation, the screen scraping operation comprising:
  (1) providing, by the loan computer system, the core account authentication credentials to a URL associated with the core account customer portal via the Internet;
  (2) accessing, by the loan computer system, the core account customer portal using the core account authentication credentials, wherein access to the core account customer portal does not require technological access beyond a level of technological access provided to the client and does not require the client to interact with the loan computer system;
  (3) obtaining, by the loan computer system via the accessed core account customer portal, website page source information that includes core account data associated with the core account; and
  (4) at least one of parsing, searching or regular expression matching, by the loan computer system, of the website page source information to determine a core account balance and a maximum allowable loan limit associated with the core account; and
(d) generating, by the loan computer system, first machine-readable instructions to render a loan amount graphical user interface, wherein the loan amount graphical user interface comprises a graphical indication of the maximum allowable loan limit;
(e) providing, from the loan computer system to the electronic user device, the first machine-readable instructions to render the loan amount graphical user interface at the electronic user device;
(f) receiving, at the loan computer system via the loan amount graphical user interface, a requested loan amount;
(g) determining, by the loan computer system, that the requested loan amount does not exceed the maximum allowable loan limit;
(h) generating, by the loan computer system, second machine-readable instructions to execute a funds transfer of the requested loan amount to a designated loan fund account;
(i) providing, from the loan computer system to the recordkeeping computer system, the second machine-readable instructions;
(j) receiving, at the loan computer system, an electronic indication that the funds transfer was executed;
(k) generating, by the loan computer system, an electronic notification that the requested loan amount is available in the designated loan fund account; and
(l) transmitting, from the loan computer system, to the electronic user device, the electronic notification,
wherein the loan computer system bypasses technological cooperation of the recordkeeping computer system to obtain the core account data without requiring custom integration with the recordkeeping computer system.

6. The method of claim 5, wherein the designated loan fund account is linked to a debit card.

7. The method of claim 5, wherein the designated loan fund account is linked to a checking account.

8. The method of claim 5, wherein the core account customer portal comprises an application programming interface.

* * * * *